US007922923B2

(12) United States Patent
Tang et al.

(10) Patent No.: US 7,922,923 B2
(45) Date of Patent: Apr. 12, 2011

(54) ANTI-SCATTER GRID AND COLLIMATOR DESIGNS, AND THEIR MOTION, FABRICATION AND ASSEMBLY

(75) Inventors: Cha-Mei Tang, Potomac, MD (US); Olga V. Makarova, Naperville, IL (US); Platte T. Amstutz, III, Vienna, VA (US); Guohua Yang, Westmont, IL (US)

(73) Assignee: Creatv Microtech, Inc., Potomac, MD (US)

( * ) Notice: Subject to any disclaimer, the term of this patent is extended or adjusted under 35 U.S.C. 154(b) by 812 days.

(21) Appl. No.: 11/984,634

(22) Filed: Nov. 20, 2007

(65) Prior Publication Data

US 2008/0088059 A1 Apr. 17, 2008

Related U.S. Application Data

(63) Continuation-in-part of application No. 11/188,210, filed on Jul. 25, 2005, now Pat. No. 7,310,411, which is a continuation of application No. 10/060,399, filed on Feb. 1, 2002, now Pat. No. 6,987,836.

(60) Provisional application No. 60/265,353, filed on Feb. 1, 2001, provisional application No. 60/265,354, filed on Feb. 1, 2001.

(51) Int. Cl.
*B44C 1/22* (2006.01)
*C03C 15/00* (2006.01)
*C03C 25/68* (2006.01)

(52) U.S. Cl. ............................... 216/36; 216/12; 216/24

(58) Field of Classification Search .................... 216/12, 216/24, 36

See application file for complete search history.

(56) References Cited

U.S. PATENT DOCUMENTS 3,770,956 A 11/1973 Johnson
4,329,410 A 5/1982 Buckley
(Continued)

FOREIGN PATENT DOCUMENTS

EP 0316111 5/1989

OTHER PUBLICATIONS

H.E. Johns et al., "The Physics of Radiology", Charles C. Thomas, Springfield, Illinois, 1983, pp. 134-166, 734-736.

(Continued)

*Primary Examiner* — Roberts Culbert

(74) *Attorney, Agent, or Firm* — Roylance, Abrams, Berdo and Goodman, L.L.P.

(57) ABSTRACT

Grids and collimators, for use with electromagnetic energy emitting devices, include at least a metal layer that is formed, for example, by electroplating/electroforming or casting. The metal layer includes top and bottom surfaces, and a plurality of solid integrated walls. Each of the solid integrated walls extends from the top to bottom surface and has a plurality of side surfaces. The side surfaces of the solid integrated walls are arranged to define a plurality of openings extending entirely through the layer. At least some of the walls also can include projections extending into the respective openings formed by the walls. The projections can be of various shapes and sizes, and are arranged so that a total amount of wall material intersected by a line propagating in a direction along an edge of the grid is substantially the same as another total amount of wall material intersected by another line propagating in another direction substantially parallel to the edge of the grid at any distance from the edge. Methods to fabricate these grids using copper, lead, nickel, gold, any other electroplating/electroforming materials, metal composites or low melting temperature metals are described.

27 Claims, 50 Drawing Sheets

U.S. PATENT DOCUMENTS

| | | | |
|---|---|---|---|
| 4,433,427 | A | 2/1984 | Barnea |
| 4,688,242 | A | 8/1987 | Ema |
| 5,190,637 | A | 3/1993 | Guckel |
| 5,206,983 | A | 5/1993 | Guckel et al. |
| 5,231,654 | A | 7/1993 | Kwasnick et al. |
| 5,263,075 | A | 11/1993 | McGann et al. |
| 5,303,282 | A | 4/1994 | Kwasnick et al. |
| 5,378,583 | A | 1/1995 | Guckel et al. |
| 5,379,336 | A | 1/1995 | Kramer et al. |
| 5,418,833 | A | 5/1995 | Logan |
| 5,496,668 | A | 3/1996 | Guckel et al. |
| 5,524,041 | A | 6/1996 | Grenier |
| 5,576,147 | A | 11/1996 | Guckel et al. |
| 5,581,592 | A | 12/1996 | Zarnoch et al. |
| 5,606,589 | A | 2/1997 | Pellegrino et al. |
| 5,625,192 | A | 4/1997 | Oda et al. |
| 5,729,585 | A | 3/1998 | Pellegrino et al. |
| 5,814,235 | A | 9/1998 | Pellegrino et al. |
| 5,847,398 | A | 12/1998 | Shahar et al. |
| 5,949,850 | A | 9/1999 | Tang |
| 5,966,424 | A | 10/1999 | Liu |
| 6,075,840 | A | 6/2000 | Pellegrino et al. |
| 6,252,938 | B1 | 6/2001 | Tang |
| 6,459,771 | B1 | 10/2002 | Mancini |
| 6,987,836 | B2 | 1/2006 | Tang et al. |

OTHER PUBLICATIONS

R.E. Henkin et al., "Nuclear Medicine", Mosby, St. Louis, Missouri, 1996.

Olga V. Makarova et al., "Microfabrication of Freestanding Metal Structures Released from Graphite Substrates", *IEEE*, pp. 400-402.

Cha-Mei Tang et al., "Experimental and Simulation Results of Two-Dimensional Prototype Anti-Scatter Grids for Mammography", World Congress on Medical Physics and Biomedical Engineering, Chicago, 2000.

Kevin Fischer et al., "Fabrication of Two-Dimensional X-Ray Anti-Scatter Grids for Mammography", Advances in X-Ray Opticas, Andreas K. Freund et al., editors *Proceedings of SPIE* vol. 4145, 2001, pp. 227-234.

John M. Boon, Ph.D. et al., "Grid and Slot Scan Scatter Reduction in Mammography: Comparison by Using Monte Carlo Techniques", *Radiology*, vol. 222, Feb. 2002, pp. 519-527.

Cha-Mei Tang et al., "Precision Fabrication of Two-Dimensional Anti-Scatter Grids, In Medical Imagining 2000: Physics of Medical Imagining", James T. Dobbins III and John M. Boone, editors; *Proceedings of SPIE*, vol. 3977, 2000, pp. 647-657.

R. Fahrig et al., "Performance of Glass Fiber Antiscatter Devices at Mammographic Energies", *Med. Phys.*, vol. 21 (8), pp. 1277-1282 (1994). E. P. Muntz et al., "On the Significance of Very Small Angle Scattered Radiation to Radiographic Imaging at Low Energies" *Med. Phys.* vol. 10 (6), pp. 819-823 (1983).

L. E. Antonuk et al., "Large Area, Flat-Panel, Amorphous Silicon Imagers", *SPIE* vol. 2432, pp. 216-227 (1995). Henry Guckel et al., of the University of Wisconsin, "Micromechanics via X-Ray Assisted Processing", *J. Vac. Sci. Technol.* A 12, p. 2559 (1994).

E. W. Becker et al., "Fabrication of Microstructures with High Aspect Ratios and Great Structural Heights by Synchrotron Radiation Lithography, Galvanoforming, and Plastic Molding (LIGA Process)", *Microelectron. Eng.* vol. 4, pp. 35-56 (1986).

H. Guckel et al., "Micro Electromagnetic Actuators Based on Deep X-Ray Lithography" *International Symposium on Microsystems, Intelligent Materials and Robots, Sendai, Japan*, Sep. 27-29, 1995. C. M. Tang et al., "Anti-Scattering X-ray Grid", Microsystem Technologies vol. 4, pp. 187-192, (1998).

Olga V. Makarova et al., "Development of Freestanding Copper Anti-scatter Grid Using Deep X-ray Lithography".

C.M. Tang, Small Business Innovation Research Solicitation No. DOE/ER-0686, (Mar. 1, 1997).

Larry E. Antonuk et al., "A Large-Area, 97 µm Pitch, Indirect-Detection, Active Matrix, Flat-Panel Imager (AMFPI)", *Part of the SPIE Conference of Medical Imaging. San Diego. CA*, SPIE vol. 3336, pp. 2-13, (Feb. 1998).

Radiological Society of North America, 80$^{th}$ Scientific Assembly and Annual Meeting, Nov. 27-Dec. 2, 1994, p. 253.

Denny L. Lee et al., "Improved Imaging Performance of a 14×17-inch Direct Radiography™ System Using Se/TFT Detector", *Part of the SPIE Conference on Physics of Medical Imaging, San Diego, CA, SPIE* vol. 3336, pp. 14-23 (Feb. 1998).

Robert Street et al., "Large Area X-ray Image Sensing Using a Pbl2 Photoconductor", *Part of the SPIE Conference on Physics of Medical Imaging, San Diego, CA, SPIE* vol. 3336, pp. 24-32 (Feb. 1998).

Tom J.C. Bruijns et al., "Technical and Clinical Results of an Experimental Flat Dynamic (Digital) X-ray Image Detector (FDXD) System with Real-Time Corrections", *Part of the SPIE Conference on Physics of Medical Imaging. San Diego. CA, SPIE* vol. 3336, pp. 33-44, (Feb. 1998).

Christophe Chaussat et al., "New Csl/a-Si 17"×17" X-Ray Flat Panel Detector Provides Superior Detectivity and Immediate Direct Digital Output for General Radiography Systems", *Part of the SPIE Conference on Physics of Medical Imaging, San Diego, CA, SPIE* vol. 3336, pp. 45-56 (Feb. 1998).

Hans Roehrig et al., "Flat-Panel Detector, CCD Cameras and Electron Beam Tube Based Video Camera for Use in Portal Imaging" *Part of the SPIE Conference on Physics of Medical Imaging, San Diego, CA, SPIE* vol. 3336, pp. 163-174 (Feb. 1998).

Herbert D. Zeman et al., "Portal Imaging with a Csl(TI) Transparent Scintillator X-Ray Detector", *Part of the SPIE Conference on Physics of Medical Imaging, San Diego, CA, SPIE* vol. 3336, pp. 175-186 (Feb. 1998).

Jean-Pierre Moy, "Image Quality of Scintillator Based X-ray Electronic Imagers", *Part of the SPIE Conference on Physics of Medical Imaging, San Diego, CA, SPIE* vol. 3336, pp. 187-194 (Feb. 1998).

G. Pang et al., "Electronic Portal Imaging Device (EPID) Based on a Novel Camera with Avalanche Multiplication", *Part of the SPIE Conference on Physics of Medical Imaging. San Diego, CA, SPIE* vol. 3336, pp. 195-203 (Feb. 1998).

Michael P. André et al., "An Integrated CMOS-Selenium X-ray Detector for Digital Mammography", *Part of the SPIE Conference on Physics of Medical Imaging, San Diego, CA, SPIE* vol. 3336, pp. 204-209 (Feb. 1998).

Nicholas Petrick et al., "A Technique to Improve the Effective Fill Factor of Digital Mammographic Imagers", *Part of the SPIE Conference on Physics of Medical Imaging, San Diego, CA SPIE* vol. 3336, pp. 210-217 (Feb. 1998).

Richard E. Colbeth et al., "Flat Panel Imaging System for Fluoroscopy Applications" *Part of the SPIE Conference on Physics of Medical Imaging, San Diego, CA, SPIE* vol. 3336, pp. 376-387 (Feb. 1998).

Akira Tsukamoto et al., "Development of a Selenium-Based Flat-Panel Detector for Real-Time Radiography and Fluoroscopy", *Part of the SPIE Conference on Physics of Medical Imaging, San Diego, CA, SPIE* vol. 3336, pp. 388-395 (Feb. 1998).

N. Jung et al., "Dynamic X-Ray Imaging System Based on an Amorphous Silicon Thin-Film Array", *Part of the SPIE Conference on Physics of Medical Imaging, San Diego, CA, SPIE* vol. 3336, pp. 396-407 (Feb. 1998).

Dylan C. Hunt et al., "Detective Quantum Efficiency of Direct, Flat Panel X-ray Imaging Detectors for Fluoroscopy" *Part of the SPIE Conference on Physics of Medical Imaging, San Diego, CA, SPIE* vol. 3336, pp. 408-417 (Feb. 1998).

Cornelis H. Slump et al., "Real-Time Diagnostic Imaging with a Novel X-ray Detector with Multiple Screen—CCD Sensors" *Part of the SPIE Conference on Physics of Medical Imaging, San Diego, CA, SPIE* vol. 3336, pp. 418-429 (Feb. 1998).

Edmund L. Baker et al., "A Physical Image Quality Evaluation of a CCD-Based X-ray Image Intensifier Digital Fluorography System for Cardiac Applications" *Part of the SPIE Conference on Physics of Medical Imaging, San Diego, CA, SPIE* vol. 3336, pp. 430-441 (Feb. 1998).

Richard L. Weisfield et al., "New Amorphous-Silicon Image Sensor for X-Ray Diagnostic Medical Imaging Applications" *Part of the SPIE Conference on Physics of Medical Imaging, San Diego, CA, SPIE* vol. 3336, pp. 444-452 (Feb. 1998).

Toshio Kameshima et al., "Novel Large Area MIS-Type X-Ray Image Sensor for Digital Radiography", *Part of the SPIE Conference on Physics of Medical Imaging, San Diego, CA, SPIE* vol. 3336, pp. 453- 462 (Feb. 1998).
Gary S. Shaber et al., "Clinical Evaluation of a Full Field Digital Projection Radiography Detector", *Part of the SPIE Conference on Physics of Medical Imaging*, San Diego, CA, SPIE vol. 3336, pp. 463- 469 (Feb. 1998).
Donald R. Quimette et al., "A New Large Area X-Ray Image Sensor", *Part of the SPIE Conference on Physics of Medical Imaging, San Diego, CA, SPIE* vol. 3336, pp. 470-476 (Feb. 1998).
David P. Trauernicht et al., "Screen Design for Flat-Panel Imagers in Diagnostic Radiology", *Part of the SPIE Conference on Physics of Medical Imaging, San Diego, CA*, pp. 477-485 (Feb. 1998).
John Rowlands et al., "Amorphous Semiconductors Usher in Digital X-ray Imaging", *Physics Today*, pp. 24-30 (Nov. 1997).
N.M. Allinson, "Development of Non-Intensified Charge-Coupled Device Area X-Ray Detectors", *Journal of Synchrotron Radiation*, pp. 54-62 (1994).
I.M. Blevis et al., "Digital Radiology Using Amorphous Selenium and Active Matrix Flat Panel Readout: Photoconductive Gain and Gain Fluctuations".
Justin M. Henry et al., "Noise in Hybrid Photodiode Array—CCD X-Ray Image Detectors for Digital Mammography", *SPIE* vol. 2708, pp. 106-115 (Feb. 1998).
Jack Adams et al., "DpiX Digital X-Rays for Diagnosis and Treatment", *The Clock*, pp. 3, 5 and 19-21 (Dec. '97/Jan. '98).
Russell C. Hardie et al., "Joint MAP Registration and High-Resolution Image Estimation Using a Sequence of Undersampled Images", *IFEE Transactions on Image Processing*, vol. 6 No. 12, pp. 1621-1632 (Dec. 1997).
Joseph C. Gillette et al., "Aliasing Reduction in Staring Infrared Imagers Utilizing Subpixel Techniques", *Optical Engineering*, vol. 34, No. 11, pp. 3130-3137 (Nov. 1995).
Russell C. Hardie et al., "High-Resolution Image Reconstruction from a Sequence of Rotated and Translated Frames and its Application to an Infrared Imaging System", *Optical Engineering*, vol. 37, No. 1, pp. 247-260, (Jan. 1998).
Kai M. Hock, "Effect of Oversampling in Pixel Arrays", *Optical Engineering*, vol. 34, No. 5, pp. 1281-1288 (May 1995).
Kenneth J. Barnard et al. "Effects of Image Noise on Submicroscan Interpolation" *Optical Engineering*, vol. 34, No. 11, pp. 3165-3173 (Nov. 1995).
Kenneth J. Barnard et al., "Nonmechanical Microscanning Using Optical Space-Fed Phased Arrays", *Optical Engineering*, vol. 33, No. 9, pp. 3063-3071 (Sep. 1994).
Gerald C. Hoist, "Sampling, Aliasing, and Data Fidelity", *JCD Publishing, Winter Park, FL; and SPIE Optical Engineering Press, Bellingham, WA*, pp. 98-130 (published prior to Feb. 18, 1999).
Larry E. Antonuk et al., "Demonstration of Megavoltage and Diagnostic X-Ray Imaging with Hydrogenated Amorphous Silicon Arrays", *Am. Assoc. Phys. Med.*, vol. 19, No. 6, pp. 1455-1466 (Nov./Dec. 1992).
Dr. P. Bley, "The Liga Process for Fabrication of Three-Dimensional Microscale Structures", *Interdisciplinary Sci. Rev.*, vol. 18, No. 3, pp. 267-272 (1993).
"DARPA Awards Contract for X-Ray Lithography System", *Micromachine Devices*, vol. 2, No. 3, p. 2 (1997).
R.L. Egan, "Intramammary Calcifications Without an Associated Mass in Benign and Malignant Diseases", *Radiology*, vol. 137, pp. 1-7 (Oct. 1980).
H. Guckel, program and notes describing his "Invited talk at the American Vacuum Society Symposium", Philadelphia, PA, (Oct. 1996).
"IBM Team Develops Ultrathick Negative Resist for MEMs Users", *Micromachine Devices*, vol. 2, No. 3, p. 1 (Mar. 1997).
"X-ray Lithography Scanners for LIGA", *Micromachine Devices*, vol. 1, No. 2, p. 8 (1996).
M.J. Yaffe et al., "X-ray Detectors for Digital Radiography", *Phys. Med. Biol.*, vol. 42, pp. 1-39 (1997).
D.P. Siddons et al., "Precision Machining using Hard X-Rays", *Syncrotron Radiation News*, vol. 7, No. 2, pp. 16-18 (1994).
Computer printout of University of Wisconsin Web Site "http://mems.engr.wisc.edu/liga.html", entitled "UW-MEMS-Research-Deep X-ray Lithography" (web site information available to public prior to Jun. 19, 1987 filing date of present application).
Computer printout of University of Wisconsin Web Site "http://mems.engr.wisc.edu/pc.html" entitled "UW-MEMS-Research-Precision Engineering" (web site information available to public prior to Jun. 19, 1987 filing date of present application).
Computer printout of University of Wisconsin Web Site "http://mems.engr.wisc.edu/~guckel/homepage.html" (web site information available to public prior to Jun. 19, 1987 filing date of present application).
H. Guckel, "NATO Advanced Research Workshop on the Ultimate Limits of Fabrication and Measurement", *Proceedings of the Royal Society* (*Invited Talk/Paper*) pp. 1-15 (Apr. 1994).
W. Ehrfeld, "Coming to Terms with the Past and the Future" *LIGA News*, pp. 1-3 (Jan. 1995).
H. Guckel et al., "Micromechanics for Actuators Via Deep X-ray Lithography" *Proceedings of SPIE*, Orlando, Florida, pp. 39-47 (Apr. 1994).
Z. Jing et al., "Imaging Characteristics of Plastic Scintillating Fiber Screens for Mammography", *SPIE*, vol. 2708, pp. 633-644 (Feb. 1996).
N. Nakamori et al., "Computer Simulation on Scatter Removing Characteristics by Grid" *SPIE* vol. 2708, pp. 617-625 (Feb. 1996).
P. A. Tompkins et al., "Use of Capillary Optics as a Beam Intensifier for a Compton X-ray Source", *Medical Physics*, vol. 21, No. 11, pp. 1777-1784 (Nov. 1994).
H.E. Johns, OC, Ph.D., F.R.S.C., LL.D., D.Sc., F.C.C.P.M., *The Physics of Radiology*, Fourth Edition (Charles C. Thomas: Springfield, Illinois, 1983), p. 734.
Collimated Holes, Inc. Products Manual, pages entitled "Rectangular and Square Fibers/Fiber Arrays" (Apr. 1995) and "Scintillating Fiberoptic Faceplate Price List Type LKH-6" (Dec. 1995).
H. Guckel et al., "LIGA and LIGA-Like Processing with High Energy Photons", *Microsystems Technologies*, vol. 2, No. 3, pp. 153-156 (Aug. 1996).
H. Guckel et al., "Deep X-Ray Lithography for Micromechanics and Precision Engineering", *Synchrotron Radiation Instrumentation* (*Invited*), *Advanced Photon Source Argonne*, pp. 1-8 (Oct. 1995).

ANTI-SCATTER GRID AND COLLIMATOR DESIGNS, AND THEIR MOTION, FABRICATION AND ASSEMBLY

This application is a continuation in part of U.S. patent application Ser. No. 11/188,210 filed Jul. 25, 2005 now U.S. Pat. No. 7,310,411 which is a continuation of U.S. patent application Ser. No. 10/060,399 filed Feb. 1, 2002 now U.S. Pat. No. 6,987,836, which_claims benefit under 35 U.S.C. §119(e) from U.S. Provisional Patent Application Ser. Nos. 60/265,353 and 60/265,354, both filed on Feb. 1, 2001, the entire contents of all of these documents being incorporated herein by reference.

CROSS-REFERENCE TO RELATED APPLICATIONS AND PATENT

Related subject matter is disclosed in U.S. patent application Ser. No. 09/459,597, filed on Dec. 13, 1999, in U.S. patent application Ser. No. 09/734,761, filed Dec. 13, 2000, and in U.S. Pat. No. 5,949,850, the entire contents of all of these documents are expressly incorporated herein by reference.

BACKGROUND OF THE INVENTION

1. Field of the Invention

The present invention relates to a method and apparatus for making focused and unfocused grids and collimators that are stationary or movable to avoid grid shadows on an imager and which are adaptable for use in a wide range of electromagnetic radiation applications, such as x-ray and gamma-ray (γ-ray) imaging devices and the like. More particularly, the present invention relates to a method and apparatus for making focused and unfocused grids and collimators, such as air core grids and collimators, that can be constructed with a very high aspect ratio, defined as the ratio between the height of each absorbing grid or collimator wall and the thickness of the absorbing grid or collimator wall, and that are capable of permitting large primary radiation transmission there through.

The present invention relates to a method and apparatus for making large area grids and collimators from a single piece or assembled from two or more pieces, For example, the grid and collimator can be assembled from two or more pieces in one layer, and there can be a plurality of layers, each of which includes thin metal walls defining the openings, and which can be stacked on top of each other to increase the overall thickness of the grid or collimator 2. Description of the Related Art Grids and collimators are used to let through the desirable electromagnetic radiation while eliminate the undesirable ones by absorption. Radiation can penetrate through thicker material as the radiation wavelength decreases or energy increases. The radiation decay length in the material decreases as the atomic number and the density of the materials increase, and according to other properties of the grid or collimator material. Grid and collimator walls, called the septa and/or lamellae, are usually made of metal because of their atomic number and density. Grids and collimators are used extensively in medical x-ray diagnostics, nuclear medicine, non-destructive testing, airport security, a variety of scientific and research applications, industrial instruments, x-ray astronomy and other devices to control, shape or otherwise manipulate beams of radiation. For the description below, the application related to medical diagnostics will be outlined, first for grids for x-ray and then collimators for γ-ray imaging.

X-Ray Imaging:

Conventional medical x-ray imaging systems consist of a point x-ray source and an image recording device (the imager). As x-rays pass through the object on the way to the imager, its intensity is reduced as the result of the internal structure of the object. Thus, x-rays are used in medical applications to differentiate healthy tissue, diseased tissue, bone, and organs from each other.

As x-rays interact with tissue, the x-rays become attenuated as well as scattered by the tissue. X-rays propagating in a direct line from the x-ray source to the imager are desired. Contrast and the signal-to-noise ratio of image details are reduced by scatter. Anti-scatter grids are applied to most diagnostic x-ray imaging modality. For the description below, mammography is used as an example.

Without intervention, both scattered and primary radiations from the subject are recorded in a radiographic image. For mammography, the typical scatter-to-primary ratios (S/P) at the imager range from 0.3 to 1.0. The presence of scatter can cause up to a 50% reduction in contrast, and up to a 55% reduction (for constant total light output from the screen) in signal-to-noise ratio as described in an article by R. Fahrig, J. Mainprize, N. Robert, A. Rogers and M. J. Yaffe entitled, "Performance of Glass Fiber Antiscatter Devices at Mammographic Energies", Med. Phys. 21, 1277 (1994), the entire contents of both being incorporated herein by reference.

The most common anti-scatter grids, called "one-dimensional" grid, or linear grid meaning that the projection of the lamellae walls on the imager are lines, are made by strips of lead lamella, sandwiched between more x-ray transparent spacer materials such as aluminum, carbon fiber or wood (see, e.g., the Fahrig et al article). This type of grid reduces scattered radiation by reducing scatter in one direction, the axis parallel to the strips. The typical grid ratio (height of grid wall divided by interspace length of the hole) is 4 to 5. The disadvantages associated with this type of one-dimensional grid are that it only reduces scattered x-rays parallel to the strips and that it requires an increase in x-ray dose because of absorption and scatter from the spacer materials.

For scatter reduction applications, the grid walls preferably should be "two-dimensional," meaning that the projection of the lamellae walls on the imager are not lines but two-dimensional patterns such as squares, rectangles, triangles or hexagonals, to eliminate scatter from all directions. For medical applications, the x-ray source is a point source close to the imager. In order to maximize the transmission of the primary radiation, all the grid openings have to point to the x-ray source. This kind of lamella geometry is called "focused." Methods for fabricating and assembling focused and unfocused two-dimensional grids are described in U.S. Pat. No. 5,949,850, entitled "A Method and Apparatus for Making Large Area Two-dimensional Grids", the entire content of which is incorporated herein by reference.

When an anti-scatter grid is stationary during the acquisition of the image, the anti-scatter grid will cast a shadow on the imager. It is undesirable, since it can obstruct the image and make interpretation more difficult.

The typical solution to eliminate the shadow of the grid is to move the grid during the period of exposure. The ideal anti-scatter grid with motion will produce uniform exposure on the imager, in the absence of an object being imaged.

One-dimensional grids can be moved in a steady manner in one direction or in an oscillatory manner in the plane of the grid in the direction perpendicular to the parallel strips of highly absorbing lamellae. For two-dimensional grids, the motion can either be in one direction or oscillatory in the plane of the grid, but the grid shape needs to be chosen based on specific criteria.

The following discussion pertains to a two-dimensional grid with regular square or rectangular patterns in the x-y plane, with the grid walls lined up in the x-direction and y-direction. If the grid is moving at a uniform speed in the x-direction, the film will show unexposed stripes along the x-direction, which repeat periodically in the y-direction. The width of the unexposed stripes is the same or essentially the same as the thickness of the grid walls. This grid pattern and associated motion are unacceptable.

If the grid is moving at a uniform speed in the plane of the grid, but at a 45 degree angle from the x-axis, the image on the film or imager is significantly improved. However, strips of slightly overexposed images parallel to the direction of the motion at the intersection of the grid walls will still be present. As the grid moves in the x-direction at a uniform speed, the grid walls block the x-rays everywhere, except at the wall intersection, for the fraction of the time $$2d/D,$$

where d is the thickness of the grid walls and D is the periodicity of the grid walls. At the wall intersection, the grid walls blocks the x-rays for the fraction of the time $$2d/D \leqq t \leqq d/D,$$

depending on the location. Thus, stripes of slightly overexposed x-ray film are produced.

Methods for attempting to eliminate the overexposed strips discussed above are disclosed in U.S. Pat. Nos. 5,606,589, 5,729,585 and 5,814,235 to Pellegrino et al., the entire contents of each patent being incorporated herein by reference. These methods attempt to eliminate the overexposed strips by rotating the grid by an angle A, where A=a tan(n/m), and m and n are integers. However, these methods are unacceptable or not ideal for many applications.

Not all x-ray imaging applications require focused grids. For example, the desirable x-rays for x-ray astronomy is from sources far away and they approach the detector as parallel rays. Anti-scatter grids are required to eliminate x-rays from different sources at different location in the sky. Thus, the walls of the grid should be parallel so that only x-ray from a very narrow angle can be detected. A grid with parallel walls is known as an unfocused grid. Also, there are variations of focused and unfocused grids, such as a) grids focused in one direction, but unfocused in the other direction; b) grids that are piecewise focused, and variations of these characteristic.

Accordingly, the need exists for a method and apparatus to eliminate the overexposed strips associated with two-dimensional focused or unfocused grid intersections.

γ-Ray Imaging:

Nuclear medicine utilizes radiotracers to diagnose disease in terms of physiology and biochemistry, rather than primarily in terms of anatomy, emphasizing function and chemistry rather than structure. Radiotracer studies usually measure three types of physiological activities:

regional blood flow and other aspects of transport of matter through the body, bioenergetics, the provision of energy to body cells, cancer, effect of drugs, and intracellular and intercellular communication, the process by which molecular reactions are regulated.

The typical γ-ray emissions are in the 80-500 keV energy range. These γ-rays can originate inside the body and emerge at the surface to be recorded by external radiation detectors. Nuclear imaging is able to examine the interactions for picomolar and lower quantities of molecules involved in biochemical interactions with macromolecular structures, such as recognition sites, enzymes, and substrates within different parts of the living body.

Gamma cameras (γ-cameras) are used with collimators to capture the γ-rays emitted by the radionuclides. Unlike x-ray applications, γ-rays are emitted in all directions by the radioactive atoms, and they are distributed throughout large are of the body. Collimators are needed between the patient and the γ-camera to filter the γ-rays emitted from desirable locations, by selectively absorbing all but a few of the incident radiation. Gamma-rays that pass through the collimator have radiation propagation directions restricted to a small solid angle. In the absence of scattering within the patient, the photons propagate in a straight line from the point of emission to the point of detection in the γ-camera. Consequently, the collimator imposes a strong correlation between the position in the image and the point of origin of the photon within the patient. Because the collimator restricts the direction of the γ-ray propagation to a very small solid angle, the vast majority of the photons are absorbed by the collimator. This means that even minor improvements in collimator performance can significantly affect the number of detected events and reduce the statistical noise in the images.

Collimators are typically made of lead. The conventional fabrication methods are pressing of thin lead foils and casting. Foil collimators can be mad from foil as thin as 100 μm, but they are more susceptible to defects in foil misalignment, resulting in reduced resolution and uniformity of the image. Micro-cast collimators have more uniform septa thickness and good septa alignment, and are structurally stronger than foil collimators. However, micro-casting manufactures, such as Nuclear Fields, cannot make septa thinner than 150 μm. For small animal imaging, the main competitive technology is Tecomet's photochemically etched, stacked tungsten. This technology, however, is (a) limited in the septa thickness, (b) unable to fabricate focused cone beam collimators with smooth walls, and unable to fabricate collimators requiring large slant septa.

Two-dimensional (2D) planar scintigraphy and three-dimensional (3D) single photon emission computed tomography (SPECT) imaging systems are used for visualization of in vivo biochemical processes, localization of disease, classification of disease, etc. SPECT provides information on three-dimensional in vivo distribution of radiotracers within the body, calculated from a set of 2D projectional images acquired from a number of γ-cameras surrounding the patient.

SUMMARY OF THE INVENTION

An object of the present invention is to provide grids and collimators made from a variety of metals, where the walls focus to a point, where the walls focus to a line, the walls have varying focus, where the walls diverge from a point, where the walls diverge from a line, or where the walls are parallel (unfocused), that can be freestanding, released from substrate with hollow core or filled with scintillators, transparent, opaque, or other useful materials.

Another objective of the present invention is to configure the grids to minimize shadow when the grid is moved during imaging.

A further object of the present invention is to provide a method and apparatus for moving a focused or unfocused grid so that no perceptible shadow or area of variable density is cast by the grid onto the imager.

Another objective of the present invention is to provide methods and apparatus for manufacturing grids and collimators.

Another object of the present invention is to provide a method and apparatus for manufacturing focused and unfocused grids that are configured to minimize overexposure at wall intersections when a grid is moved during imaging.

Grids and collimators can be made in one piece or by a plurality of pieces that can be combined to form an individual device. Tall grids and collimators can be made by stacking shorter pieces with precisely aligned walls. Large area grids and collimators can be made by assembling precisely matched pieces for each layer.

These and other objects of the present invention are substantially achieved by providing a grid or collimator, adaptable for use with electromagnetic energy emitting devices. The grid or collimator comprises at least one solid metal layer. The solid metal layer comprises top and bottom surfaces, and a plurality of solid integrated intersecting walls, each of which extends from the top to the bottom surface, and having a plurality of side surfaces. The side surfaces of the walls are arranged to define a plurality of openings extending entirely through the layer, and at least some of the side surfaces have projections extending into the respective openings. The projections can be of various shapes and sizes, and are arranged so that a total amount of wall material intersected by a line propagating in a direction, for example, along an edge of the grid, for each period along the grid is substantially the same and is also substantially the same as another total amount of wall material intersected by another line for each period propagating in another direction substantially parallel to the edge of the grid at any distance from the edge.

These and other objects are further substantially achieved by providing a method for minimizing scattering of radiation in a device to obtain an image of an object on an imager. The method includes placing a grid between radiation emitting source of the electromagnetic imaging device and the imager. The grid comprises at least one metal layer including top and bottom surfaces and a plurality of solid integrated, intersecting walls, each of which extending from the top to bottom surface and having a plurality of side surfaces, the side surfaces of the walls being arranged to define a plurality of openings extending entirely through the layer, and at least some of the side surface having projections extending into respective ones of the openings. The method further includes moving the grid in a grid moving pattern while the radiation source is emitting radiation toward the imager.

In addition, the holes of one or more layers of a grid or collimator produced by the present invention can be filled with various materials that are transparent, opaque, or have other properties, such as scintillators. Examples of scintillator are phosphors, CsI, or the like. Since grids and collimators can be reproduced exactly, an air-core grid or collimator can be aligned precisely with the filled-core grid or collimator counterpart. The desired thickness of the filling can also be achieved precisely. This type of grid/scintillator or collimator/scintillator, therefore, can performs the functions of (1) eliminating detection of undesirable radiation, (2) conversion of x-rays or γ-rays to optical or UV signals or other forms of signals and (3) improving resolution of the image or (4) improve the structural strength or other properties of the device.

Grid and collimator walls can be 5 μm or thicker. There is no inherent limitation on their height by stacking or their area by assembly.

Methods to fabricate grids and collimators for a wide variety of materials and geometry are described in this patent. One method is to use ultra violet (UV) or x-ray lithography followed by electroplating/electroforming or micro casting methods. The UV or x-ray lithography/electroforming technology:

Can produce metal septa as thin as 20 μm.

Can make unfocused and focused grids and collimators that have parallel, converging fan-beam, cone-beam, diverging, or spatially varying focus walls, Allows septal thickness and opening geometry to vary with location in the horizontal plane, Allows grids and collimators to have non-uniform thickness in the vertical direction.

Methods to fabricate grids and collimators for a wide variety of materials and geometry are described in this patent. One method is to use energetic neutral atom lithography followed by using electroplating/electroforming or microcasting methods. The energetic neutral atom lithography/electroforming or casting technology:

Can produce metal septa from 0.1 μm and larger.

Can produce septa height with aspect ratio greater than 100.

Can make unfocused and focused grids and collimators that have parallel, converging fan-beam, cone-beam, diverging, or spatially varying focus walls, Allows septal thickness and opening geometry to vary with location in the horizontal plane, Allows grids and collimators to have non-uniform thickness in the vertical direction.

BRIEF DESCRIPTION OF THE DRAWINGS

These and other features and advantages of the present invention will be more readily understood from the following detailed description, when read in connection with the appended drawings, in which:

FIG. 27*a* shows the cross-section in the plane of the sheet x-ray beam. FIG. 27*b* shows the cross-section perpendicular to the sheet x-ray beam, in which the x-ray mask and the substrate are tilted with respect to the sheet x-ray beam to form the focusing effect of the grid or collimator;

DETAILED DESCRIPTION OF EXEMPLARY EMBODIMENTS

Figure 1:
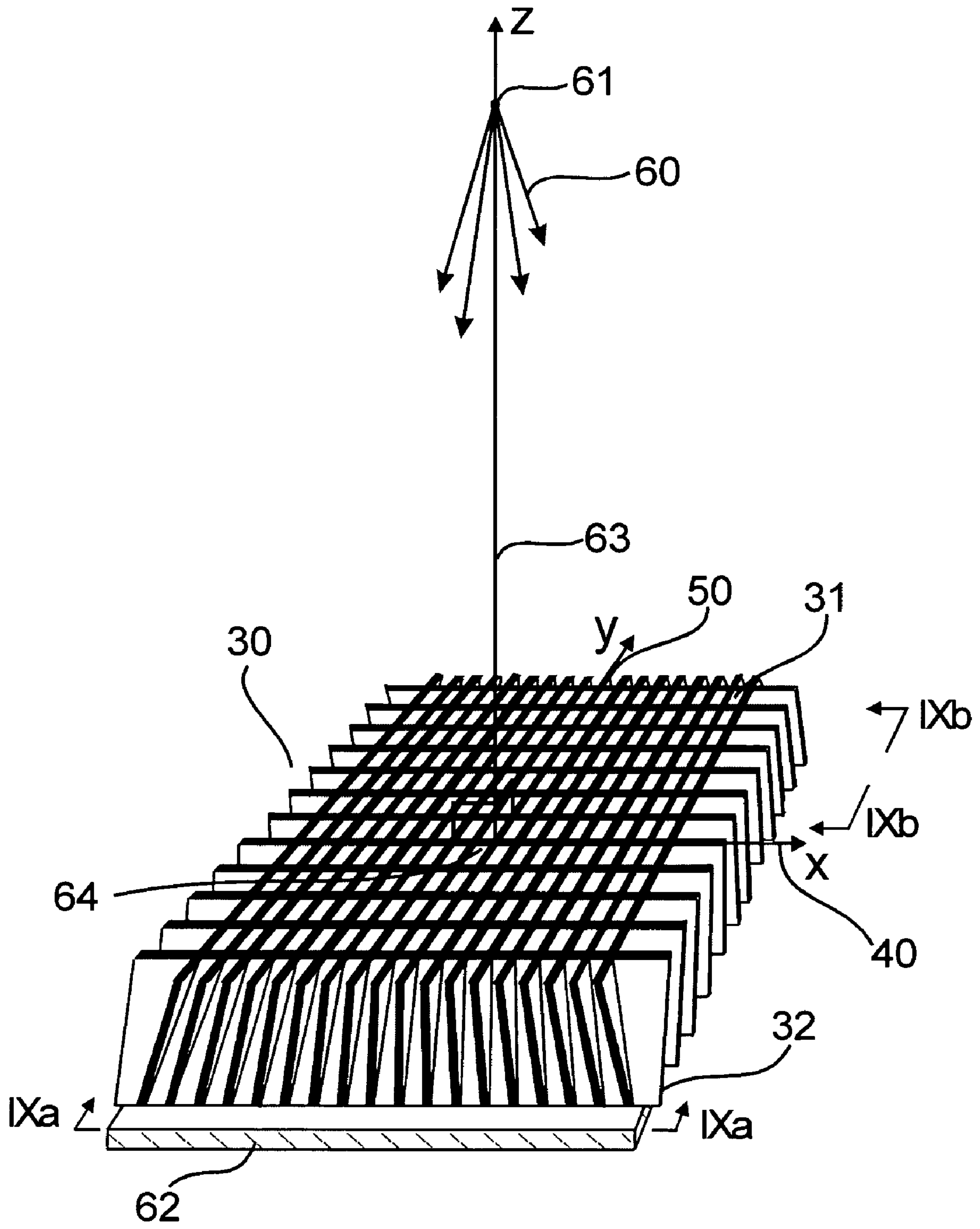
FIG. 1 is a schematic of a perspective view of a section of a two-dimensional anti-scatter grid made by a method according to an embodiment of the present invention.

The present invention provides designs, methods and apparatuses for making large area, two-dimensional, high aspect ratio, grids, collimators, grid/scintillators, collimator/scintillators, x-ray filters and other such devices, with focused walls, defocused walls, variable focus walls, parallel walls and other such orientations, as well as similar designs, methods and apparatuses for all electromagnetic radiation applications. Referring now to the drawings, FIG. 1 shows a schematic of a section of an example of a two-dimensional grid or collimator 30 produced in accordance with an embodiment of a method of the present invention. The method of grid manufacture described here is different from the embodiment of the invention, as described in more detail in U.S. Pat. Nos. 5,949,850 and 6,252,938 referenced above, the entire contents of both being incorporated herein by reference

A. X-Ray Imaging

In FIG. 1, the x-ray propagates out of a point source 61 with a conical spread 60. The x-ray imager 62, which may be an electronic detector or x-ray film, for example, is placed adjacent and parallel or substantially parallel to the bottom surface of the x-ray grid 30 with the object to be imaged (not shown) positioned between the x-ray source 61 and the x-ray grid 30. Typically, the top surface of the x-ray grid 30 is perpendicular or substantially perpendicular to the line 63 that extends between the x-ray source and the x-ray grid 30.

The grid openings 31 that are defined by walls 32 are square in this example. However, the grid openings can be any practical shape as would be appreciated by one skilled in the methods of grid construction. The walls 32 are uniformly thick or substantially uniformly thick around each opening in this figure, but can vary in thickness as desired. The walls 32 are slanted at the same angle as the angle of the x-rays emanating from the point source, in order for the direct radiation to propagate through the holes to the imager without significant loss. This angle increases for grid walls further away from the x-ray point source. In other words, an imaginary line extending from each grid wall 32 along the x-axis 40 could intersect the x-ray point source 61. A similar scenario exists for the grid walls 32 along the y-axis 50.

To facilitate the description below, a coordinate system in which the grid 30 is omitted will now be defined. The z-axis is line 63, which is perpendicular or substantially perpendicular to the anti-scatter grid, and intersects the point x-ray source 61. The z=0 coordinate is defined as the top surface of the anti-scatter grid. As further shown, the central ray 63 propagates to the center of the grid 30, which is marked by a virtual "+" sign 64.

The grid openings 31 that are defined by walls 32 are square in this example. However, the grid openings can be any practical shape as would be appreciated by one skilled in the art of grid design and fabrication. The walls 32 are uniformly thick or substantially uniformly thick around each opening in this figure, but can vary in thickness as desired. The walls 32 are slanted at the angle that allows the x-rays from the point source to propagate through the holes to the imager without significant loss. That is, the directions in which the walls extend converge or substantially converge at the point source 61 of the x-ray. The angle at which each wall is slanted in the z direction is different from its adjacent wall as taken along the directions x and y.

The desirable dimensions of the x-ray grids depend on the application in which the grid is used. For typical medical imaging applications, the area of the top view is large and the height of the grid is no more than a few millimeters. The variation in area and thickness depends on the x-ray energy, resolution, image size and the angle of the typical scattered radiation.

For mammographic imaging, for example, the x-ray energy is in the range of about 17 kVp to about 35 kVp, but can be any level as would be necessary to form a suitable image. The distance between the x-ray source and the grid plane is usually in the range of 60 cm for mammography but, of course, could be different for other applications as would be appreciated by one skilled in the art. Without the grid, scatter blurs the image, reducing contrast and makes it difficult to distinguish between healthy and diseased tissues. Only the x-rays propagating in the line from the x-ray source to the detector are desired to produce a sharp image.

For mammographic imaging, the dimensions of the grid are determined in the following manner.

The field size is determined by the object to be imaged. Two field sizes are used for mammographies: 18 cm by 24 cm and 24 cm by 30 cm, but any suitable field size can be used. The field size depends on the imaging system in use and the medical procedure. For example, some procedures require only images over small areas as small as few $cm^2$.

The wall height is usually defined in terms of the grid ratio (grid height divided by the interspace length of the hole). Grid ratios in the range of 3.5 to 5.5 are typical for mammography. For the interspace length of 525 μm and a grid ratio of 5, the wall height is 2,625 μm.

The wall thickness is determined by the x-ray energy and the material used to form the wall. The linear attenuation coefficients μ of copper (atomic number Z=29) is $\mu=303\ cm^{-1}$ at 20 keV, as described in a book by H. E. Johns and J. R. Cunningham, *The Physics of Radiology*, Charles C. Thomas Publisher, Springfield, Ill., 1983, the entire contents being incorporated herein by reference. This means that the intensity of the x-rays decay by a factor of e in a distance of $\delta=1/\mu=33$ μm, and that scattered x-rays strike the grid walls will be absorbed.

The interspace dimensions are to be determined by considerations such as the percentage of open area and the method of x-ray detection. The ratio of the open area is determined by (open area)/(open area+wall area). The percentage of open area should be as large as possible, in order to achieve the minimal practical Bucky factor. For interspace distance of 525 μm, and wall thickness of 25 μm, the percentage of the open area is 91%. For mammographic applications, the percentage of the ratio of the open area should be as close to 100% as possible, in order to produce a suitable image with the lowest possible radiation dose.

For other medical x-ray imaging applications, the imaging systems are different, such as chest, heart and brain x-rays, computed tomography (CT) scans, etc.

Anti-scatter grids for medical applications thus cover a wide range of sizes. The grid thickness can range from as little as 5 μm to any desirable thickness. The lower limit of the interspace length of the hole is on the order of a few μm and the upper limit is the size of substrates. However, there is a necessary relationship between wall thickness and hole sizes, the grid height and the absorption properties of the gold material. When the grid is made of copper, the following dimensions can significantly reduce scatter and improve mammography imaging: 550 μm holes, 25 μm thick walls, a grid height of 2000-3000 μm. As the hole size or wall thickness decreases, the layer height will have to be reduced.

As stated, wall thickness can be varied, depending on the application in which the grid is used, and the walls do not need to be of uniform thickness. Also, the shape of the hole can be varied as long as it does not result in walls having extended sections thinner than about 5 μm. The shape of the holes does not have to be regular. Some hole shapes that may be practical for anti-scatter applications are rectangular, hexagonal, circular and so on.

The walls can be made of any suitable absorbent material that can be fabricated in the desired structure, such as electroplating/electroforming, casting, injection molding, or other fabricating techniques. Materials with high atomic number Z and high density are desirable. For instance, the walls can include nickel, nickel-iron, copper, silver, gold, lead, tungsten, uranium, or any other common electroplating/electroforming or casting materials.

Figure 2A:
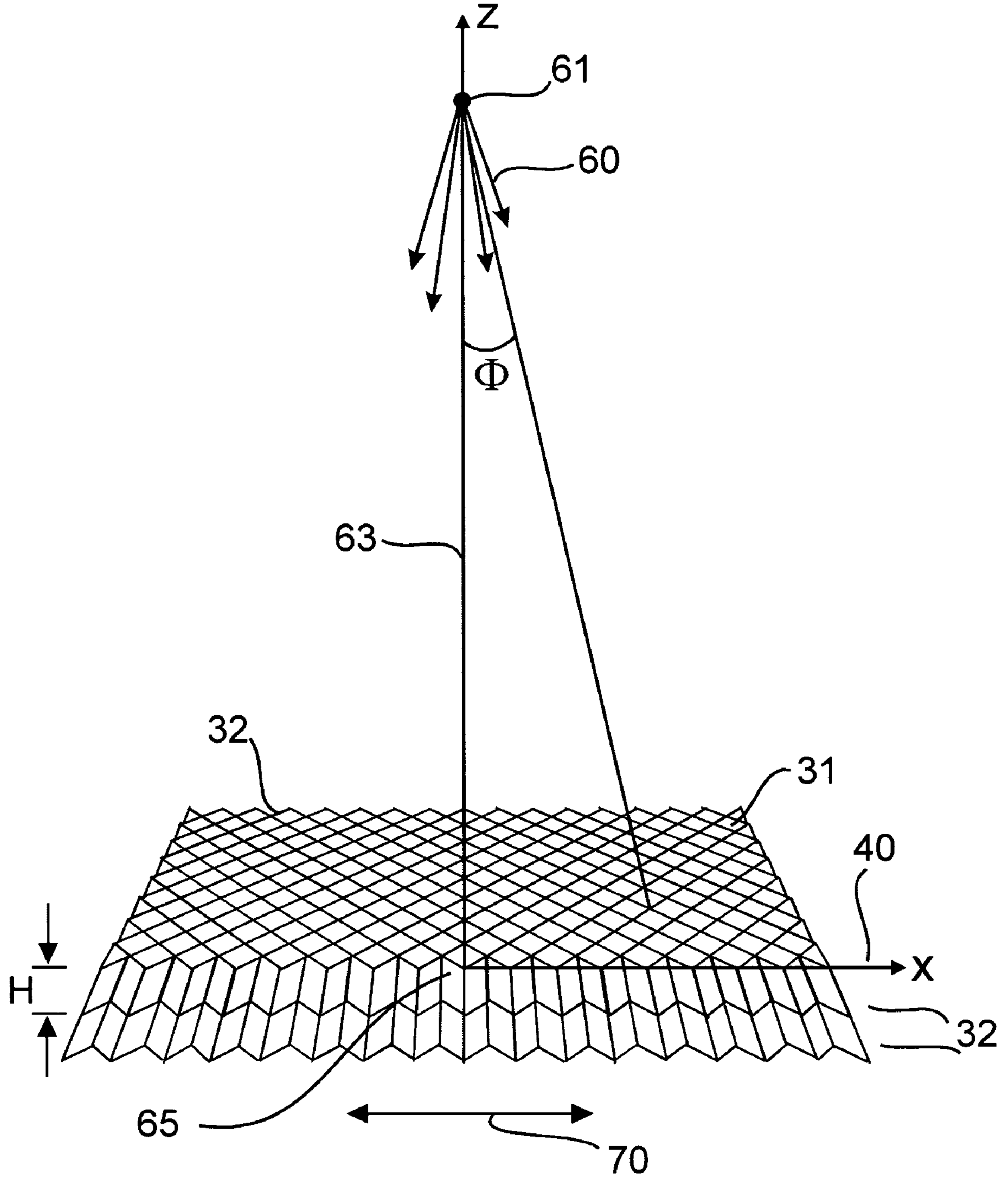
FIG. 2*a* is a schematic of the grid shown in FIG. 1 rotated an angle of 45 degrees with respect to the x and y axes, and being positioned so that the central ray emanates from point x-ray source onto the edge of the grid.
Figure 2B:
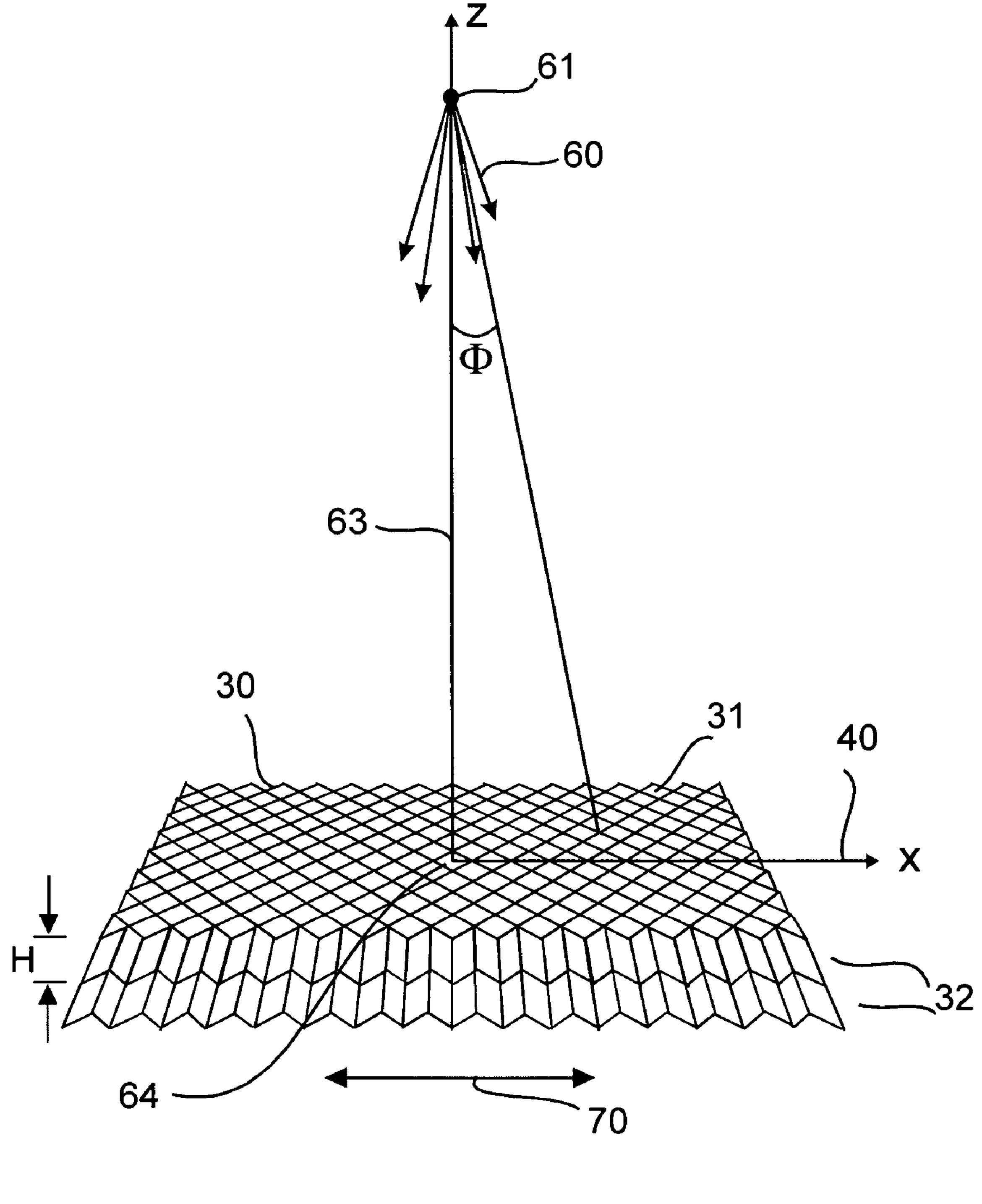
FIG. 2*b* is a schematic of the grid shown in FIG. 1 rotated at an angle of 45 degrees with respect to the x and y axes, and being positioned so that the central ray emanates from point x-ray source onto the center of the grid.

FIGS. 2*a* and 2*b* show schematics of two air-core x-ray anti-scatter grids, such as grid 30 shown in FIG. 1, that are stacked on top of each other in a manner described in more detail below to form a grid assembly. These layers of the grid walls can achieve high aspect ratio such that they are structurally rigid.

The stacked grids 30 or a grid made in a single layer can be moved steadily along a straight line (e.g., the x-axis 40) during imaging. As shown in these figures, the grids 30 have been oriented so that their walls extend at an angle of 45° or about 45° with respect to the x-axis 40. The top surface of the top grid 30 is in the x-y plane.

The central ray 63 from the x-ray source 61 is perpendicular or substantially perpendicular to the top surface of the top grid 30. For mammographic applications, the central ray 63 propagates to the top grid 30 next to the chest wall at the edge or close to the edge of the grid on the x-axis 40, which is marked as location 65 in FIG. 2*a*. For general radiology, the central ray 63 is usually at the center of the top grid 30, which is marked as location 64 in FIG. 2*b*. In this example, the line of motion 70 of the grid assembly is parallel or substantially parallel to the x-axis 40. In the x-y plane, one set of the walls 32 (i.e., the septa) is at 45° with respect to the line of motion 70, and the shape of the grid openings 31 is nearly square. The grid assembly can move in a linear motion in one direction along the x-axis or it can oscillate along the x-axis in the x-y plane. During motion, the speed at which the grid moves should be constant or substantially constant.

Two categories of grid patterns can be used with linear grid motion to eliminate non-uniform shadow of the grid. The description below pertains to portions of the grid not at the edges of the grid, so the border is not shown. For illustration purposes only, the dimensions of the drawings are not to scale, nor have they been optimized for specific applications.

A.1. Grid Design Type I for Linear Motion

As discussed above, the present invention provides a two-dimensional grid design and a method for moving the grid so that the image taken will leave no substantial artificial images for either focused or unfocused grids for some applications. In particular, as will now be described, the present invention provides methods for constructing grid designs that do not have square patterns. The rules of construction for these grids are discussed below.

Essentially, Type 1 methods for eliminating grid shadows produced by the intersection of the grid walls are based on the assumptions that: (1) there is image blurring during the conversion of x-rays to visible photons or to electrical charge; and/or (2) the resolution of the imaging device is not perfect. A general method of grid design provides a grid pattern that is periodic in both parallel and perpendicular (or substantially parallel and perpendicular) directions to the direction of motion. The construction rules for the different grid variations are discussed below.

Figure 3:
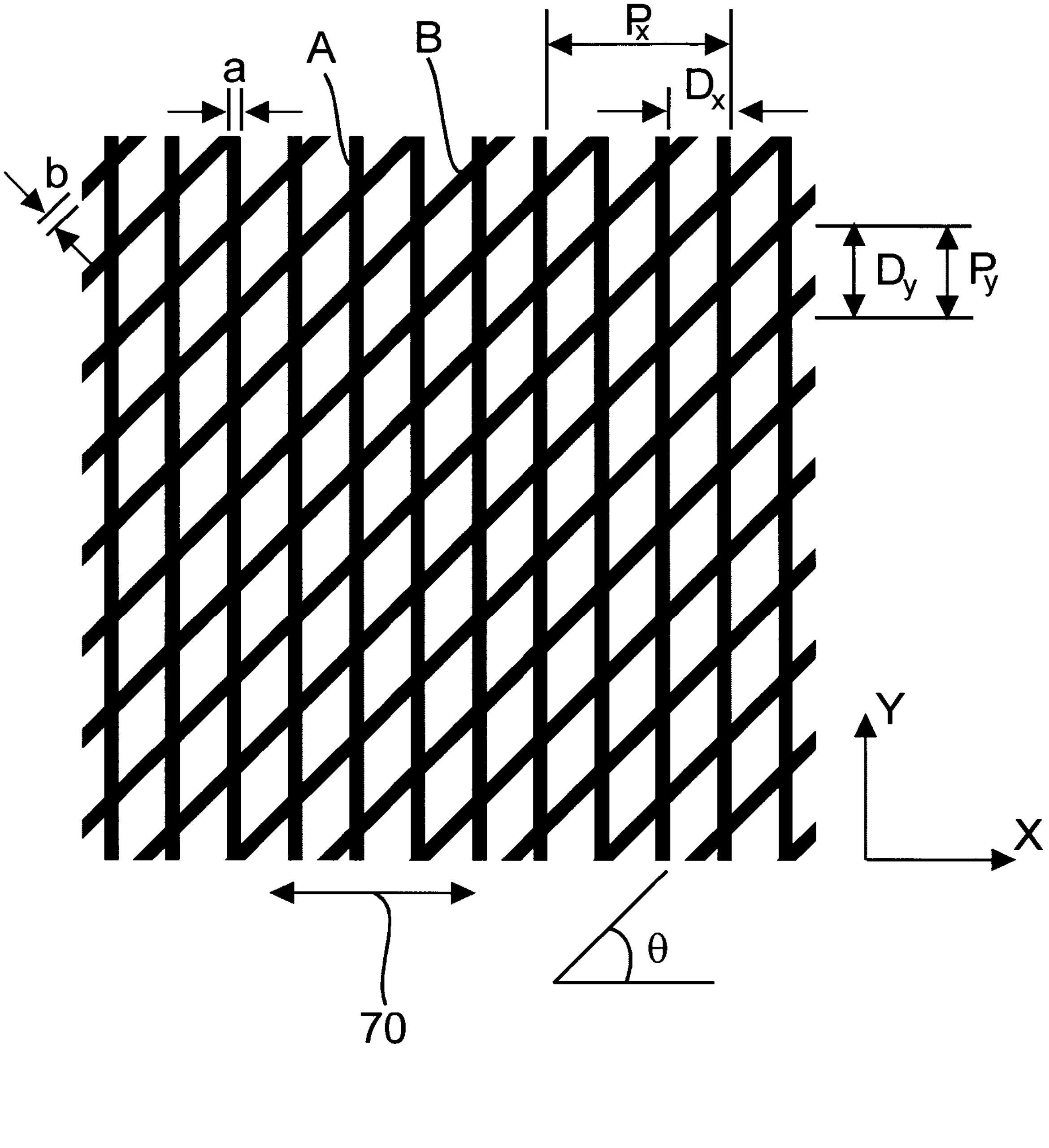
FIG. 3 is an example of a top view of a grid layout as shown in FIG. 1, modified and positioned so that one set of grid walls is perpendicular to the direction of motion along the x-axis and the other set of grid walls is at an angle θ with respect to the direction of motion, thus forming a parallelogram grid pattern applicable for linear grid motion.

A.1.a. Grid Design Variation I.1: A Set of Parallel Grid Walls Perpendicular to the Line of Motion FIG. 3 shows a top view of an exemplary grid layout that can be employed in a grid 30 as discussed above. The grid layout consists of a set of grid walls, A, that are perpendicular or substantially perpendicular to the direction of motion, and a set of grid walls, B, intersecting A. The thicknesses of grid walls A and B are a and b, respectively. The thicknesses a and b are equal in this figure, but they are not required to be equal. The angle θ is defined as the angle of the grid wall B with respect to the x-axis. The grid moves in the x-direction as indicated by 70. $P_x$ and $P_y$ are the periodicities of the intercepting grid wall pattern in the x- and y-directions, respectively. $D_x$ and $D_y$ represent the pitch of grid cells in the x- and y-directions, respectively.

The periodicity of the grid pattern in the x-direction is $P_x=MD_x$, where M is a positive integer greater than 1. The periodicity of the grid pattern in the y-direction is $P_y=M(D_y/N)$, where N is a positive integer greater than or equal to 1, M≠N and $P_y=|\tan(\theta)|P_x$. For linear motion, the grid pattern can be generated given $D_x$, (θ or $D_y$), (M or $P_x$) and (N or $P_y$). The parameter range for the angle θ is 0°<|θ|<90°. The best values for the angle θ are away from the two end limits, 0° and 90°. The grid intersections are spaced at intervals of $P_y/M$ in the y-direction. If $D_x$, θ, M and N are given, the parameters $P_x$, $P_y$, and $D_y$ can be calculated FIG. 3 is a plot of a section of the grid for the following chosen parameters: θ=45°, M=3 and N=1.

Figure 4:
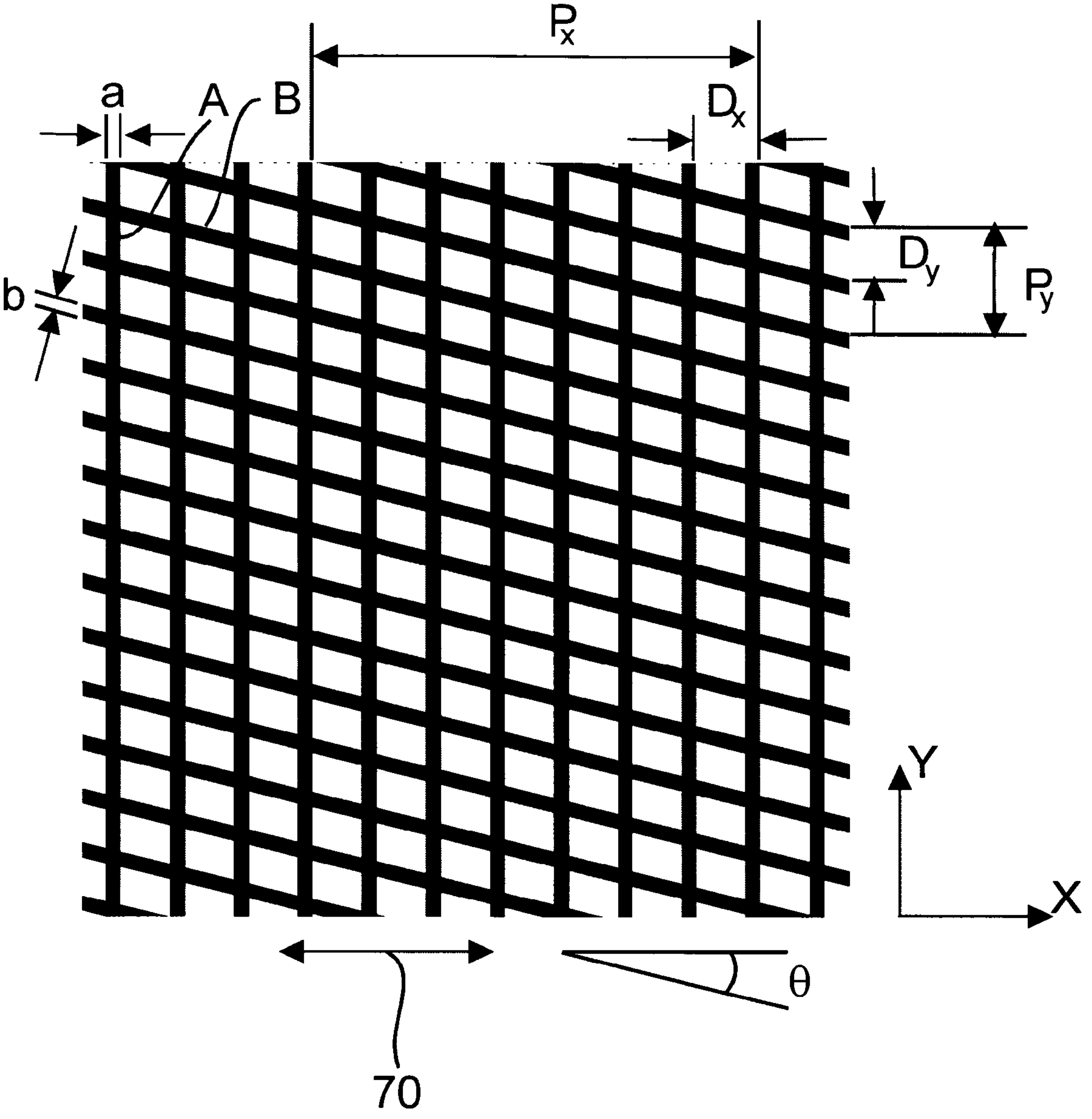
FIG. 4 is an example of a top view of a grid layout as shown in FIG. 1, modified and positioned so that one set of grid walls is perpendicular to the direction of motion along the x-axis and the other set of grid walls is at an angle θ with respect to the direction of motion, thus forming a different parallelogram grid pattern applicable for linear grid motion.

If the parameters $D_x$, $D_y$, M and N are chosen, the angle θ, $P_x$ and $P_y$ can be calculated: $P_x=MD_x$, $P_y=ND_y$ and θ=±a tan($P_y/P_x$). FIG. 4 is a plot of a section of the grid for the parameters N=2, M=7 and θ=−a tan($2D_y/7D_x$).

Figure 5:
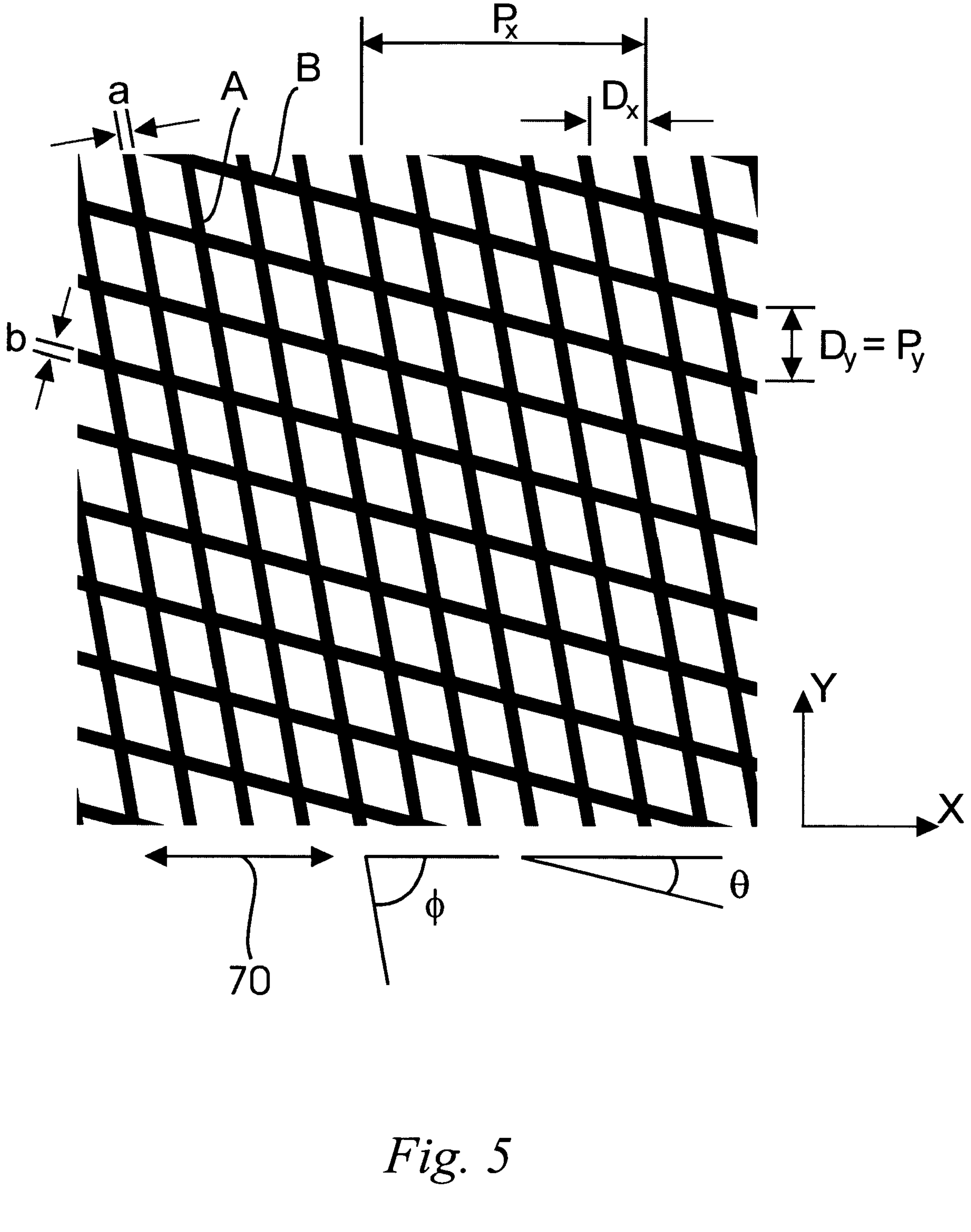
FIG. 5 is an example of a top view of a grid layout as shown in FIG. 1, modified so that the angle of the grid walls are neither parallel nor perpendicular to the direction of grid motion along the x-axis, thus forming a further parallelogram grid pattern applicable for linear grid motion.

A.1.b. Grid Design Variation I.2: Grid Walls Not Perpendicular to the Line of Motion FIG. 5 is the top view of a section of the grid layout where neither grid walls A nor B are perpendicular to the direction of linear motion. The thicknesses of grid walls A and B are a and b, respectively. The thicknesses a and b are equal in this figure, but they are not required to be equal. The angles between the grid walls A and B relative to the x-axis are ϕ and θ, respectively. Choosing $D_x$, (M or $P_x$), (N or $P_y$), and angles (θ or $D_y$) and ϕ, then $P_y=|\tan(\theta)|P_x$, $N=P_y/D_y$ and ($M=P_x/D_x$). The centers of grid intersections are separated by a distance $P_y/M$ in the y-direction. FIG. 5 shows an example where θ=−15°, ϕ=−80°, M=5 and N=1.

Figure 6:
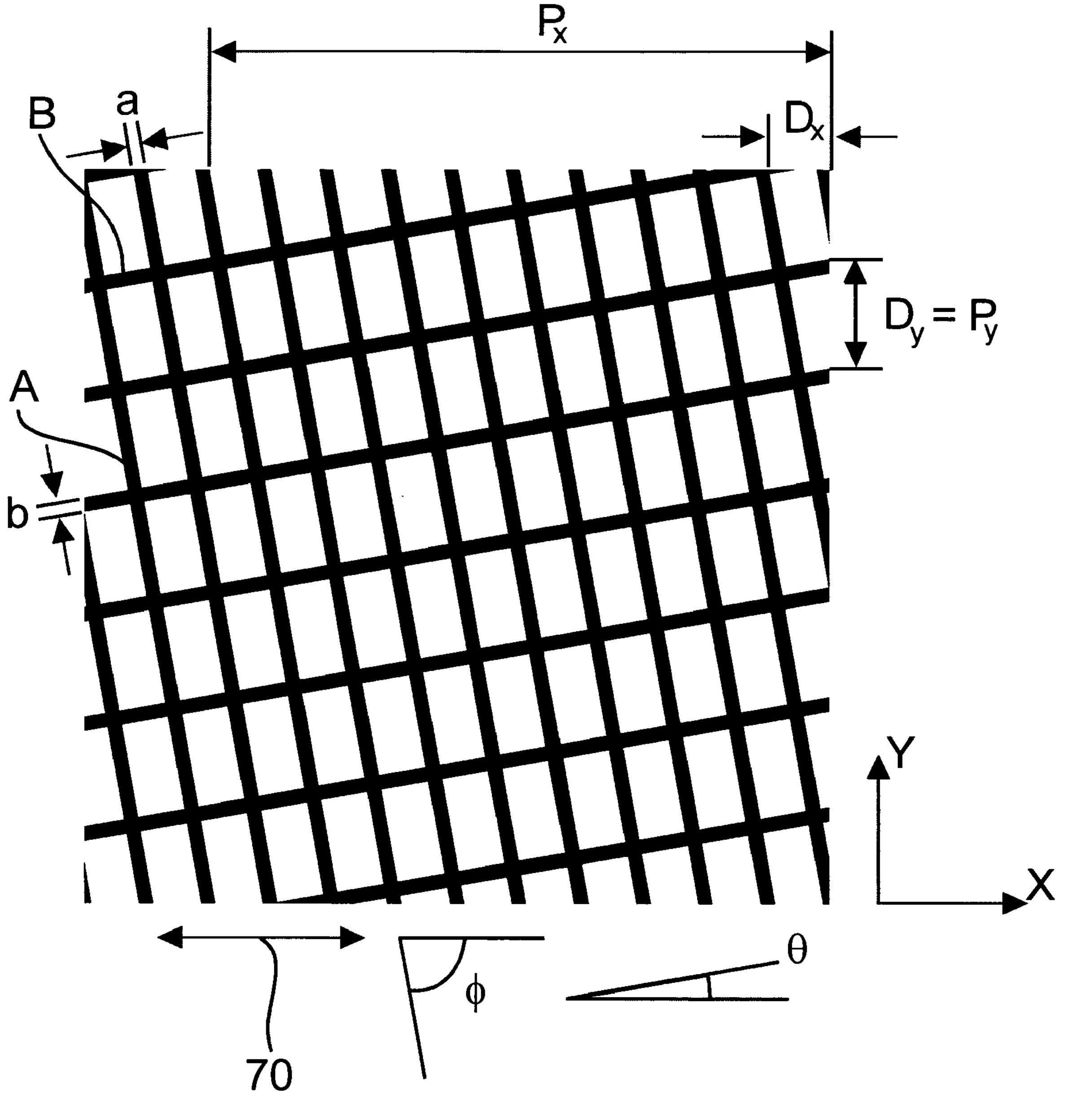
FIG. 6 is a variation of the grid pattern shown in FIG. 5, in which the grid openings are rectangular.

FIG. 6 is the top view of a section of the grid layout where neither grid walls A or B are perpendicular to the direction of motion, but grid wall A is perpendicular to grid wall B, thus a special case of FIG. 5, where the grid openings are rectangular. The thicknesses of grid walls A and B are a and b, respectively. The thicknesses are equal in this figure, but again, they are not required to be equal. The angles between the grid walls A and B relative to the x-axis are ϕ and θ, respectively. By choosing $D_x$, (M or $P_x$), (N or $D_y$), (θ or $P_y$) and ϕ, then $P_y=|\tan(\theta)|P_x$, $P_y==ND_y$, and $P_x=MD_x$. The centers of grid intersections are separated by a distance $P_y/M$ in the y-direction. FIG. 6 shows an example where θ=10°, ϕ=−80°, M=10 and N=1.

A.1.c. Comments on the Grid Motion Associated with Grid Design I

For all grid layout methods, the range of parameters for the grid can vary depending on many factors, such as whether film or digital detector is used, the type of phosphor used in film, the sensitivity and spatial resolution of the imager, the type of application, the radiation dose, and whether there is direct x-ray conversion or indirect x-ray conversion, etc. The ultimate criterion is that the overexposed strips caused by grid intersections are contiguous.

Some general conditions can be given for the range of parameters for Grid Design Type I and associated motion. It is better for grid openings to be greater than the grid wall thicknesses a and b. For film, $P_y/M$ should be smaller than the x-ray to optical radiation conversion blurring effect produced by the phosphor. For digital imagers with direct x-ray conversion, it is preferable that pixel pitch in the y-direction is an integer multiple of the spacing, $P_y/M$. Otherwise, the grid shadows will be unevenly distributed on all the pixels.

The distance of linear travel, L, of the grid during the exposure should be many times the distance $P_x$, where $kP_x>L>(kP_x-\delta L)$, $D_x>\delta L>a\ \sin(\phi)$, $D_x>\delta L>b/\sin(\theta)$, $\delta L/P_x<<1$, $k>>1$, and k is an integer. The ratio of $\delta L/L$ should be small to minimize the effect of shadows caused by the start and stop. The distance L can be traversed in a steady motion in one direction, if it is not too long to affect the transmission of primary radiation. Assuming that the x-ray beam is uniform over time, the speed with which the grid traverses the distance L should be constant, but the direction can change. In general, the speed at which the grid moves should be proportional to the power of the x-ray source. If the required distance L to be traveled in any one direction is too long, that can cause reduction of primary radiation, then the distance can be traversed by steady linear motion that reverses direction.

A.2. Grid Design Type II for Linear Motion

The present invention provides further two-dimensional grid designs and methods of moving the grid such that the x-ray image will have no overexposed strips at the intersection of the grid walls A and B. The principle is based on adding additional cross-sectional areas to the grid to adjust for the increase of the primary radiation caused by the overlapping of the grid walls. This grid design and construction provides uniform x-ray exposure.

Two illustrations of the concept are given below, followed by the generalized construction rules. This grid design is feasible for the SLIGA fabrication method described in U.S. Pat. No. 5,949,850 referenced above, because x-ray lithography is accurate to a fraction of a micron, even for a thick photoresist.

Figure 7:
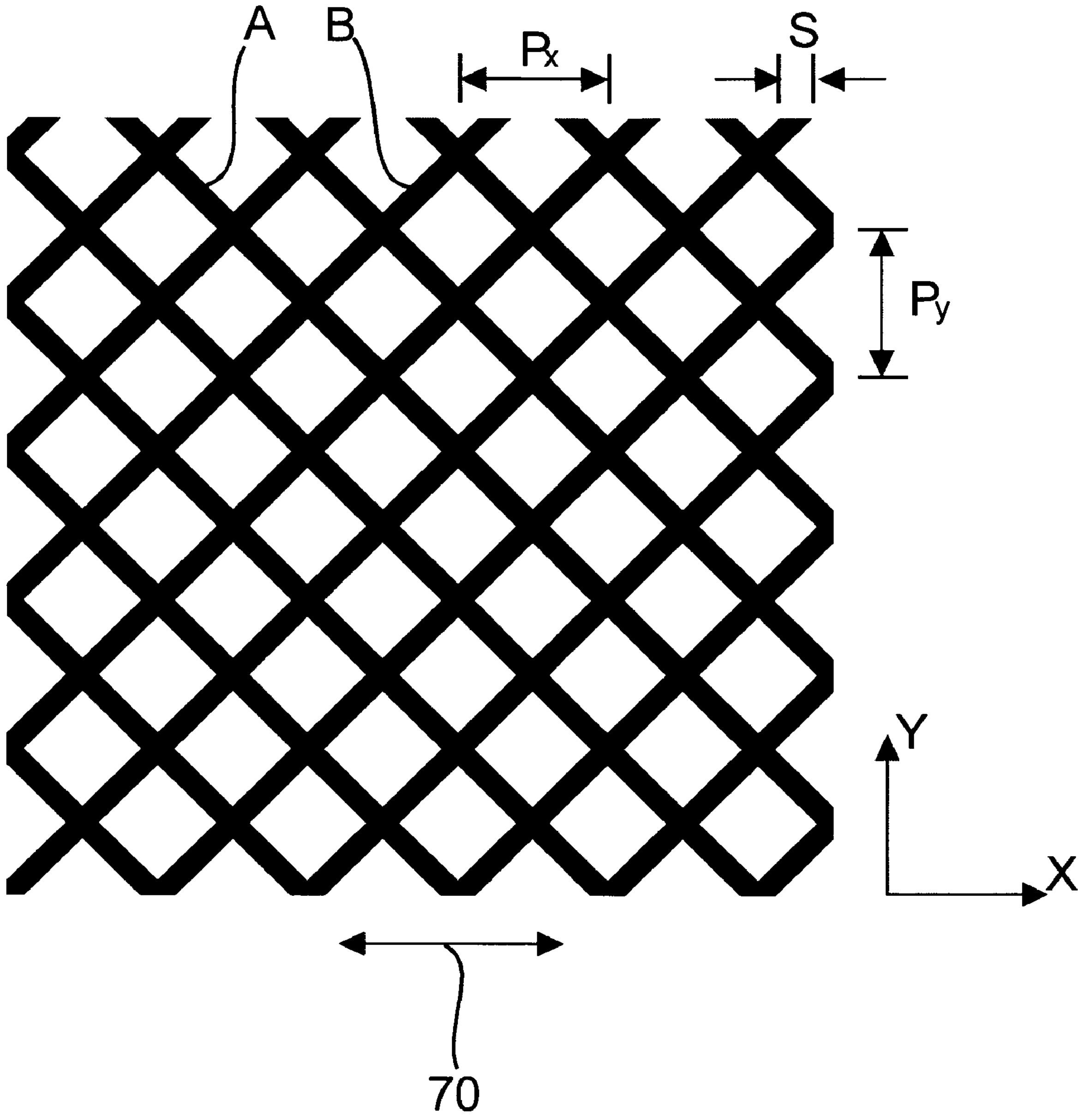
FIG. 7 is a variation of the grid pattern shown in FIG. 5 in which the grid openings are squares.
Figure 8:
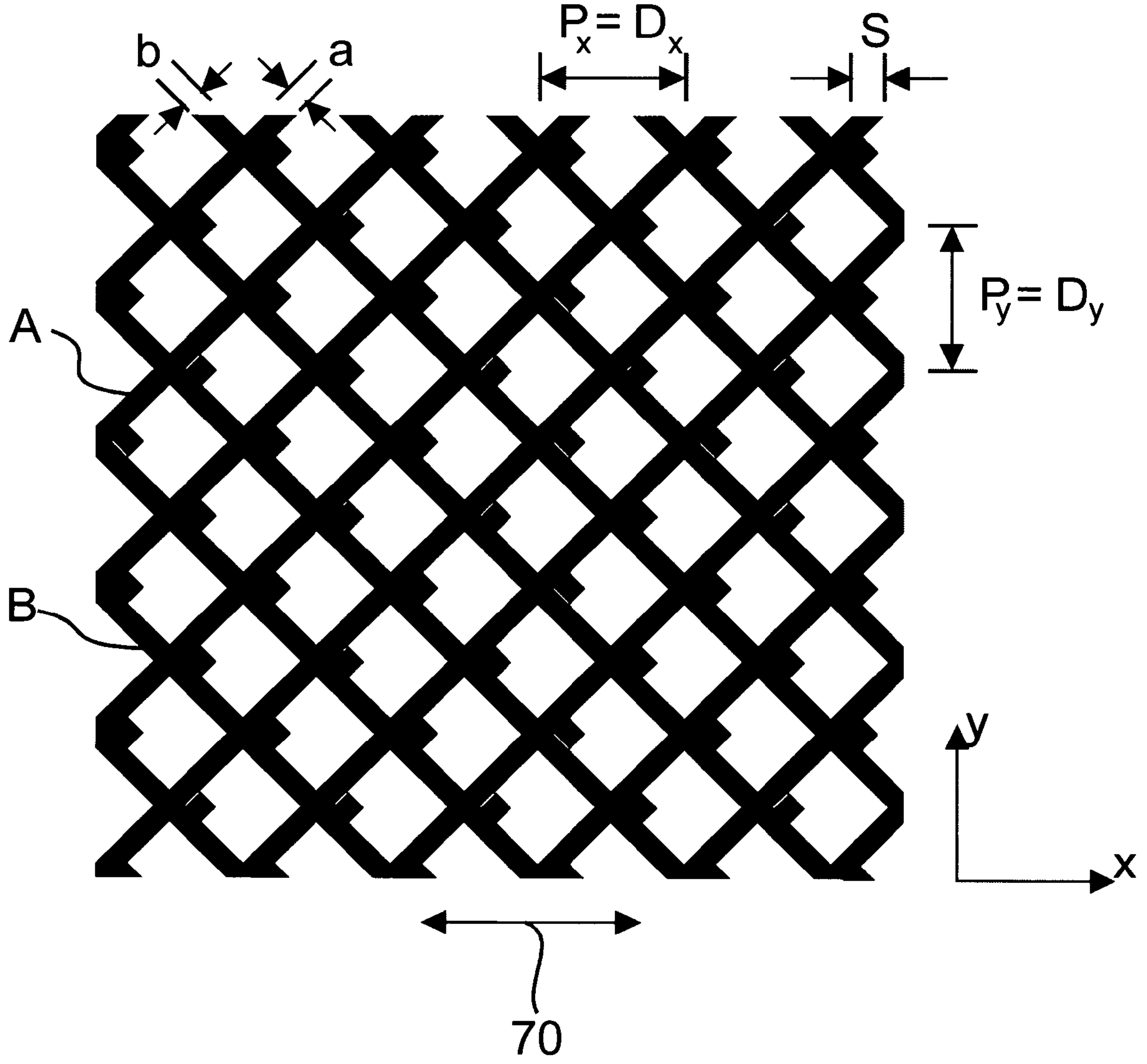
FIG. 8 is a variation of the grid pattern shown in FIG. 5 having modified corners at the wall intersections according to an embodiment of the present invention to eliminate artificial images and shadows on the imager along the direction of linear motion of the grid.

A.2.a. Grid Design Variation II.1: Square Grid Shape with an Additional Square Piece FIG. 7 shows a section of a square patterned grid with uniform grid wall thickness a and b rotated at a 45° angle with respect to the direction of motion. When square pieces in the shape of the septa intersection are added to the grid next to the intersection, with one per intersection as shown in FIG. 8, the grid walls leave no shadow for a grid moving with linear motion 70. In the FIG. 8, $D_x=D_y=P_x=P_y$ and $\theta=45°$. The additional grid area is shown alone in FIG. 9.

Figure 10:
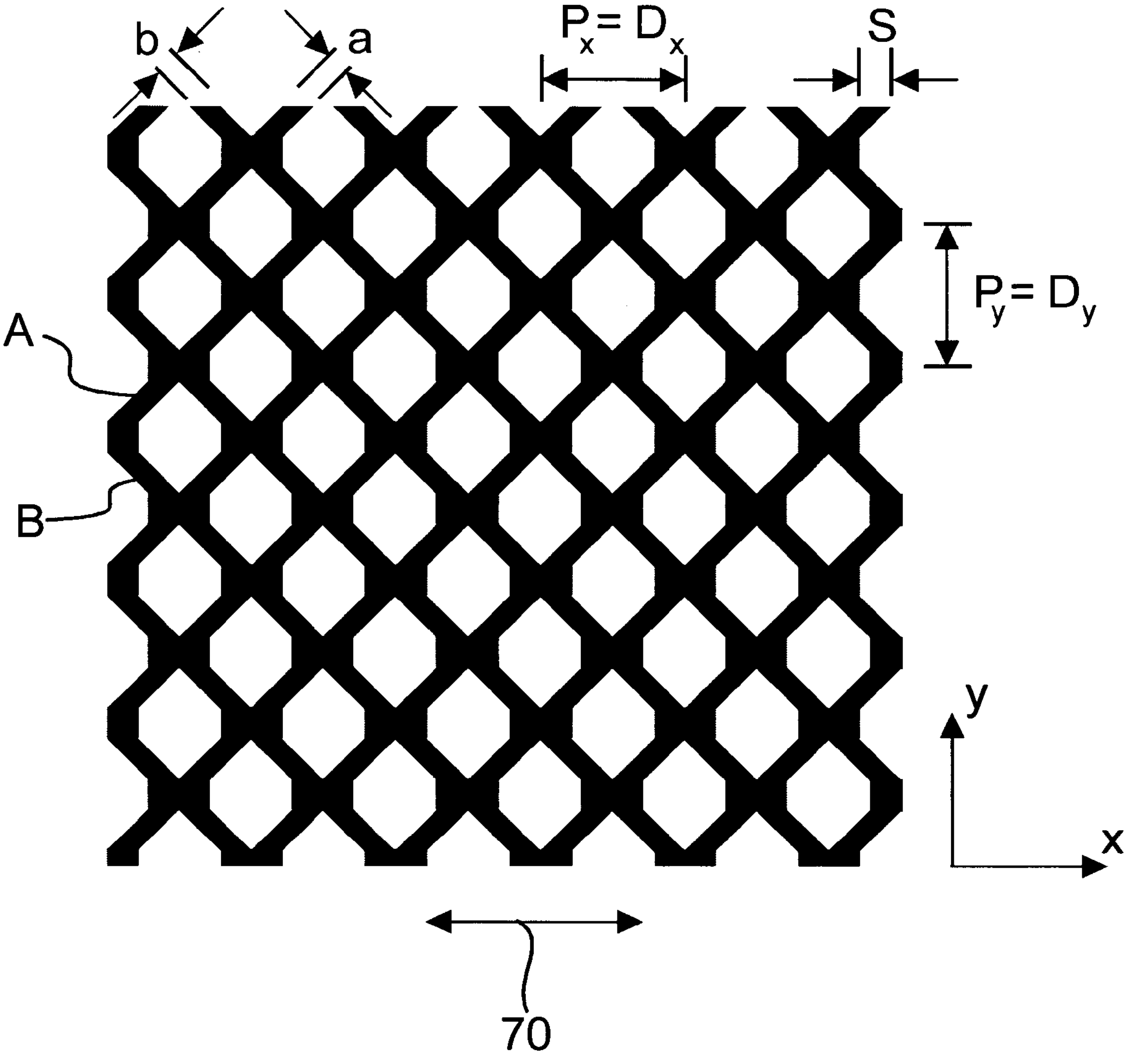
FIG. 10 is the top view of a grid with modified corners at the wall intersections according to another embodiment of the present invention to eliminate artificial images and shadows on the imager along the direction of linear motion of the grid.

A.2.b. Grid Design Variation II.2: Square Grid Shape with Two Additional Triangular Pieces FIG. 10 shows another grid pattern, which has the same or essentially the same effect as the grid pattern in FIG. 8, by placing two additional triangular pieces at opposite sides of intersecting grid walls. In this FIG. 10 example, $D_x=D_y=P_x=P_y$ and $\theta=45°$. The additional grid area is shown alone in FIG. 11.

With these modified corners added to the grid, there will not be any artificial patterns as the grid is moved in a straight line as indicated by 70 for a distance L, where $kD_x>L\geqq(kD_x-\delta L)$, $D_x>>\delta L>s$, $\delta L<<L$, $k>>1$ and k is an integer. Along the x-axis, the grid wall thickness is s and the periodicity of the grid is $P_x=D_x$. The distance of linear travel L should be as large as possible, while maintaining the maximum transmission of primary radiation. The condition for linear grid motion in just one direction is easier for grid Design Type II to achieve than grid Design Type I or the designs in U.S. patents by Pellegrino et al., because $P_x>D_x$ for grid Design Type I.

A.2.c. General Construction Methods for Quadrilateral Grid Design Type II for Linear Motion The exact technique for eliminating the effect of slight overexposure caused by the intersection of the grid walls with linear motion is to add additional grid area at each corner. Two special examples are shown in FIGS. 8 and 10 discussed above, and the general concept is described below and illustrated in FIGS. 12-16. The general rule is that the overlapping grid region C formed by grid walls A and B has to be "added back" to the grid intersecting region, so that the total amount of the wall material of the grid intersected by a line propagating along the x-direction remains constant at any point along the y axis. In other words, the total amount of wall material of the grid intersected by a line propagating in a direction parallel to the x-axis along the edge of a grid of the type shown, for example, in FIG. 8 or 10, is identical to the amount of wall material of the grid intersected by a line propagating in a direction parallel to the x-axis through any position, for example, the center of the grid.

This concept can be applied to any grid layout that is constructed with intersecting grid walls A and B. The widths of the intersecting grid walls do not need to be the same, and the intersections do not have to be at 90°, but grid lines cannot be parallel to the x-axis. The width of the parallel walls B do not need to be identical to each other, nor do they need to be equidistant from one another, but they do need to be periodic along the x-axis with period $P_x$. The widths of the parallel lines A do not need to be identical to each other, nor do they need to be equidistant from one another, but they do need to be periodic along the y-axis with period $P_y$.

The generalized construction rules are described using a single intersecting corner of walls A and B for illustration as shown in FIGS. 12-16. The top and bottom corners of parallelogram C are both designated as $\gamma$ and the right and left corners of the parallelogram C as $\beta$1 and $\beta$2, respectively. Dashed lines, f, parallel to the x-axis, the direction of motion, are placed through points $\gamma$. The points where the dashed lines f intersect the edges of the grid lines are designated as $\alpha$1, $\alpha$2, $\alpha$3 and $\alpha$4.

Figure 12:
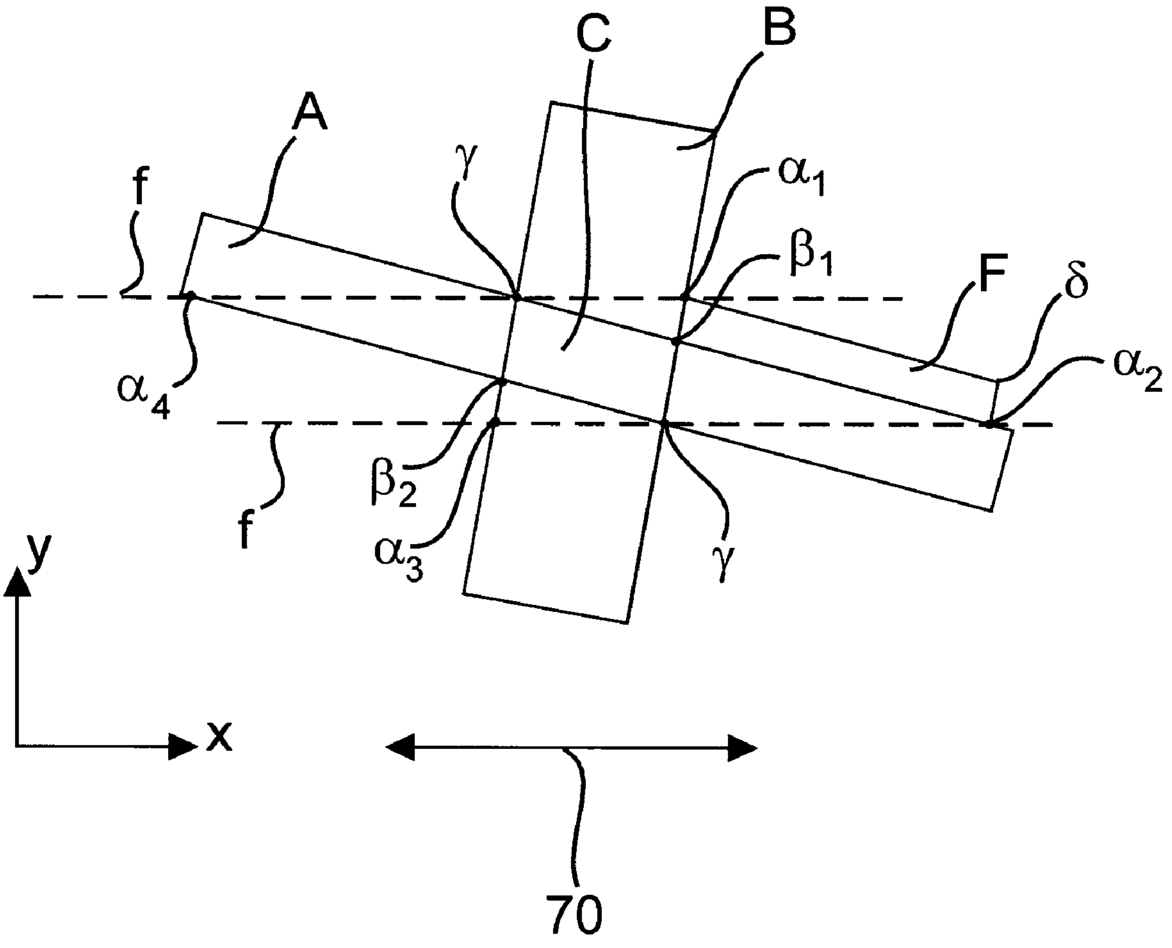
FIG. 12 is a detailed view of a wall intersection of the grid illustrating a general arrangement of an additional grid area that is added to the wall intersection of the grid.

FIG. 12 shows the addition to the grid in the form of a parallelogram F formed by three predefined points: $\alpha$1, $\alpha$2, $\beta$1, and $\delta$, where $\delta$ is the fourth corner. This is the construction method used for the grid pattern shown in FIG. 8.

Figure 13:
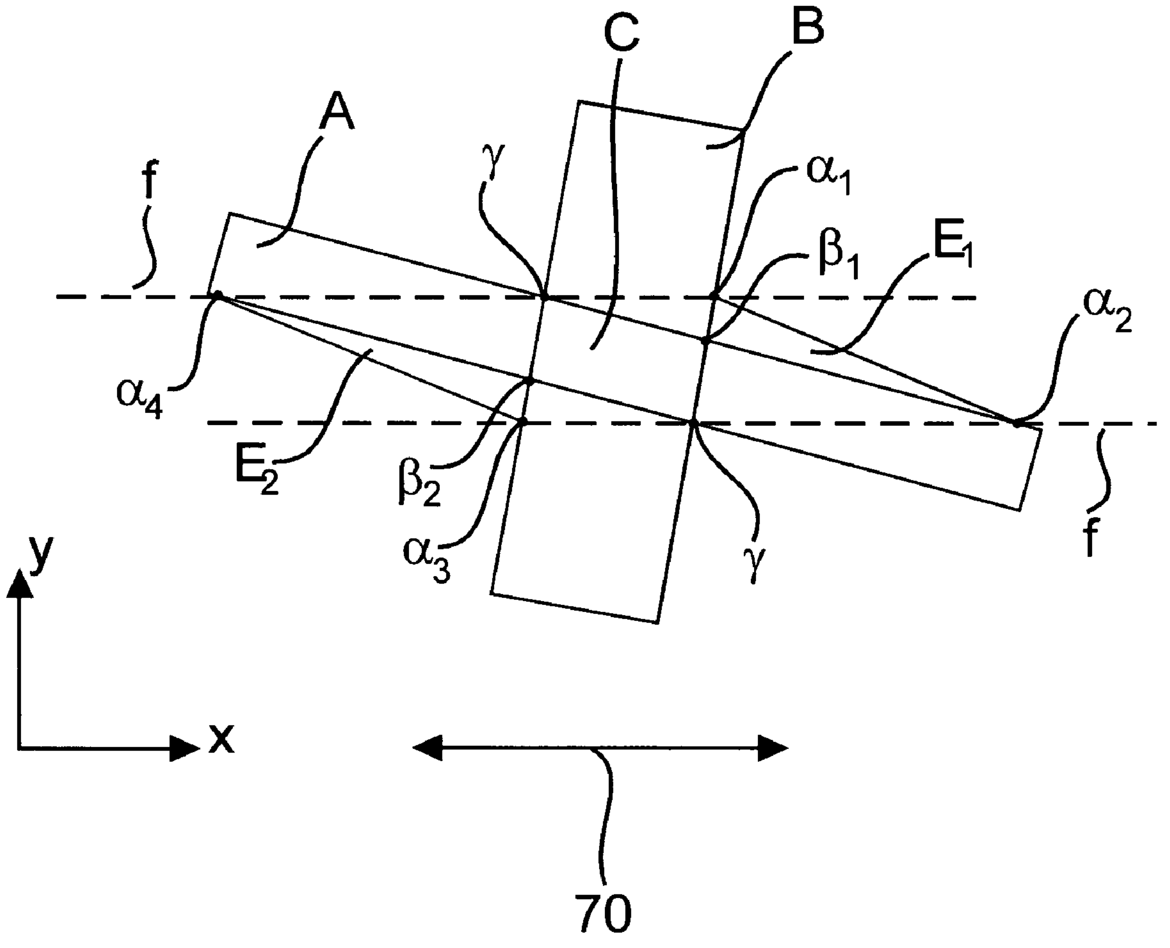
FIG. 13 is a detailed view of a wall intersection of the grid illustrating a general arrangement of an additional grid area that is added to the wall intersection of the grid.

FIG. 13 shows the addition of the grid area in the shape of two triangles, E1 and E2, formed by connecting the points $\alpha$1, $\alpha$2, $\beta$1 and $\alpha$3, $\alpha$4, $\beta$2, respectively. This is the construction method used to make the grid pattern shown in FIG. 10.

Figure 14:
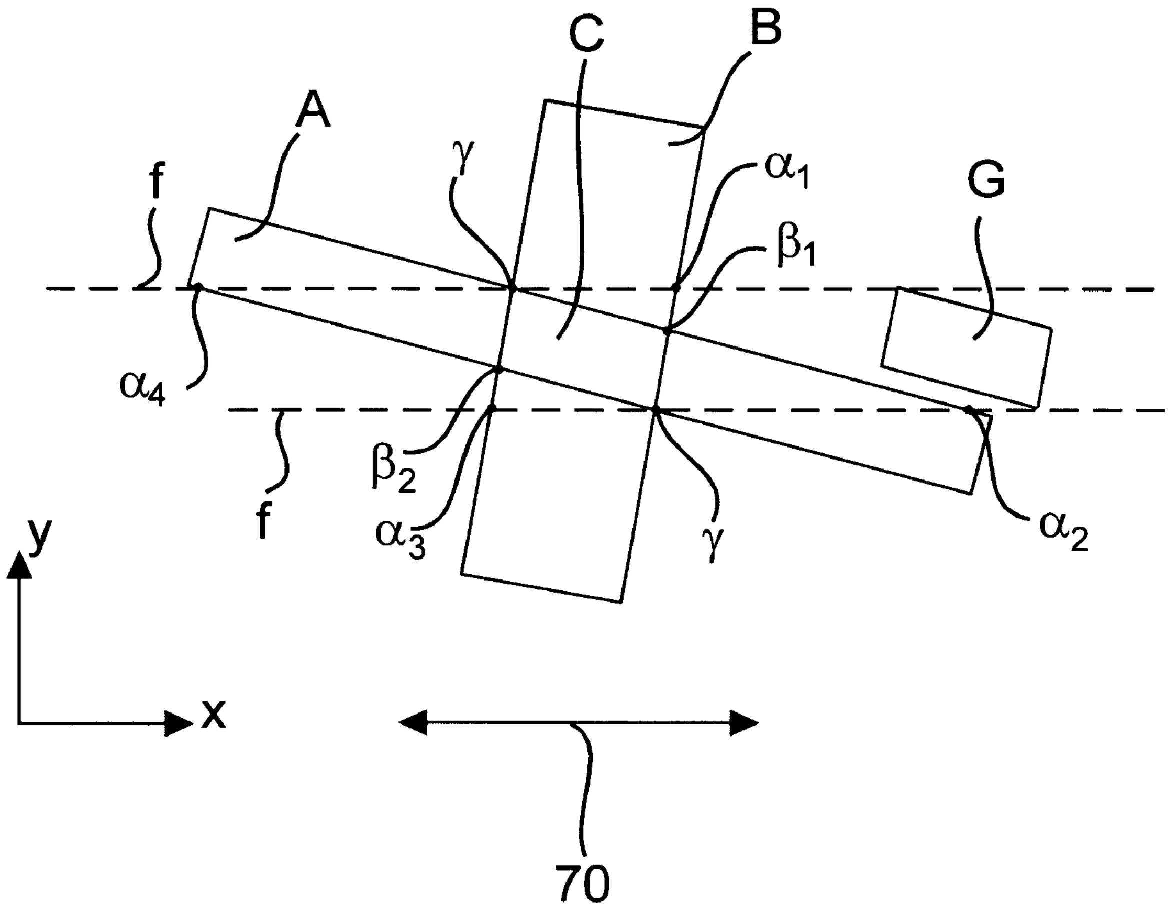
FIG. 14 is a detailed view of a wall intersection of another grid according to an embodiment of the present invention, illustrating a general arrangement of an additional grid area that is added proximate to the wall intersection and not connected to any of the grid walls.
Figure 15:
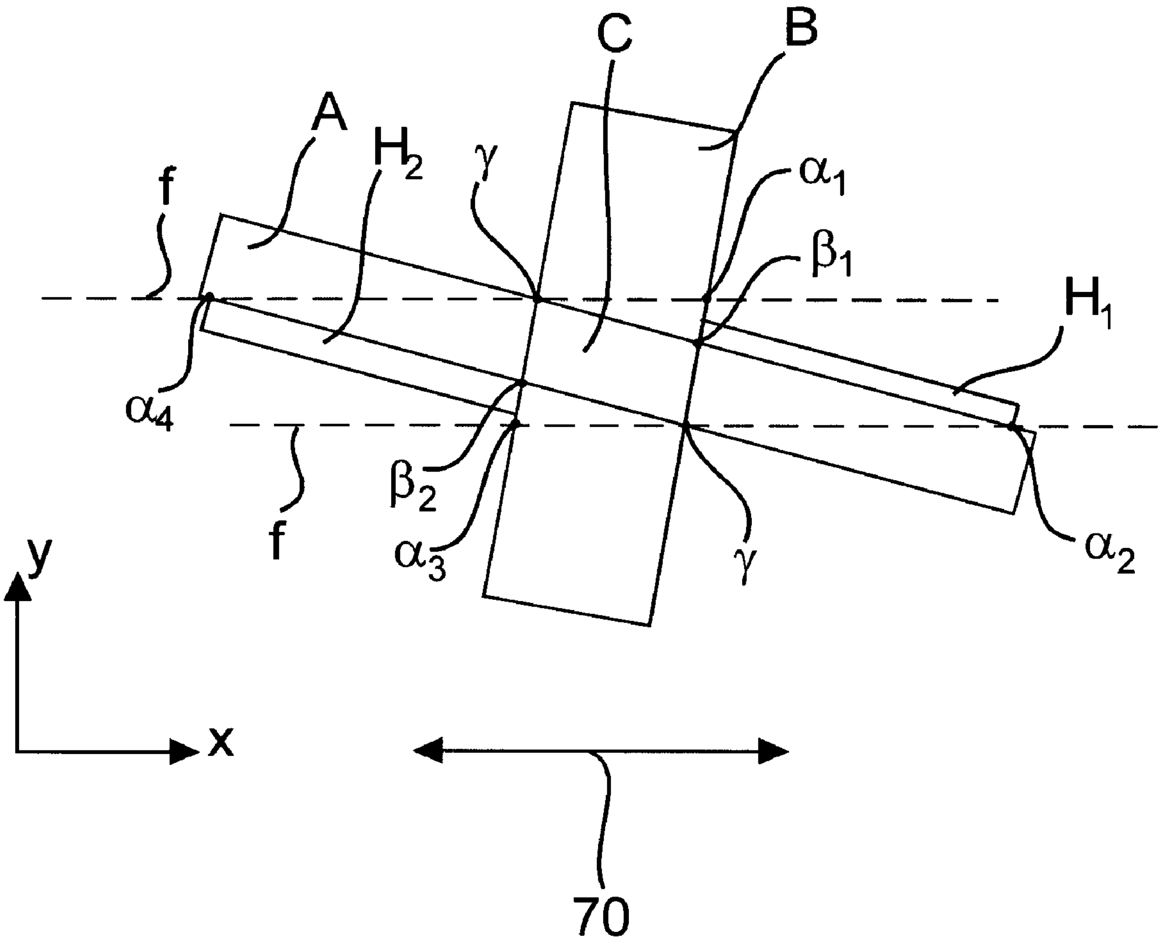
FIG. 15 is a detailed view of a wall intersection of another grid according to an embodiment of the present invention, illustrating a general arrangement of an additional grid area that is added to the wall intersection of the grid, such that two rectangular or substantially rectangular pieces are placed at opposing (non-adjacent) left and right corners of the wall intersection.
Figure 16:
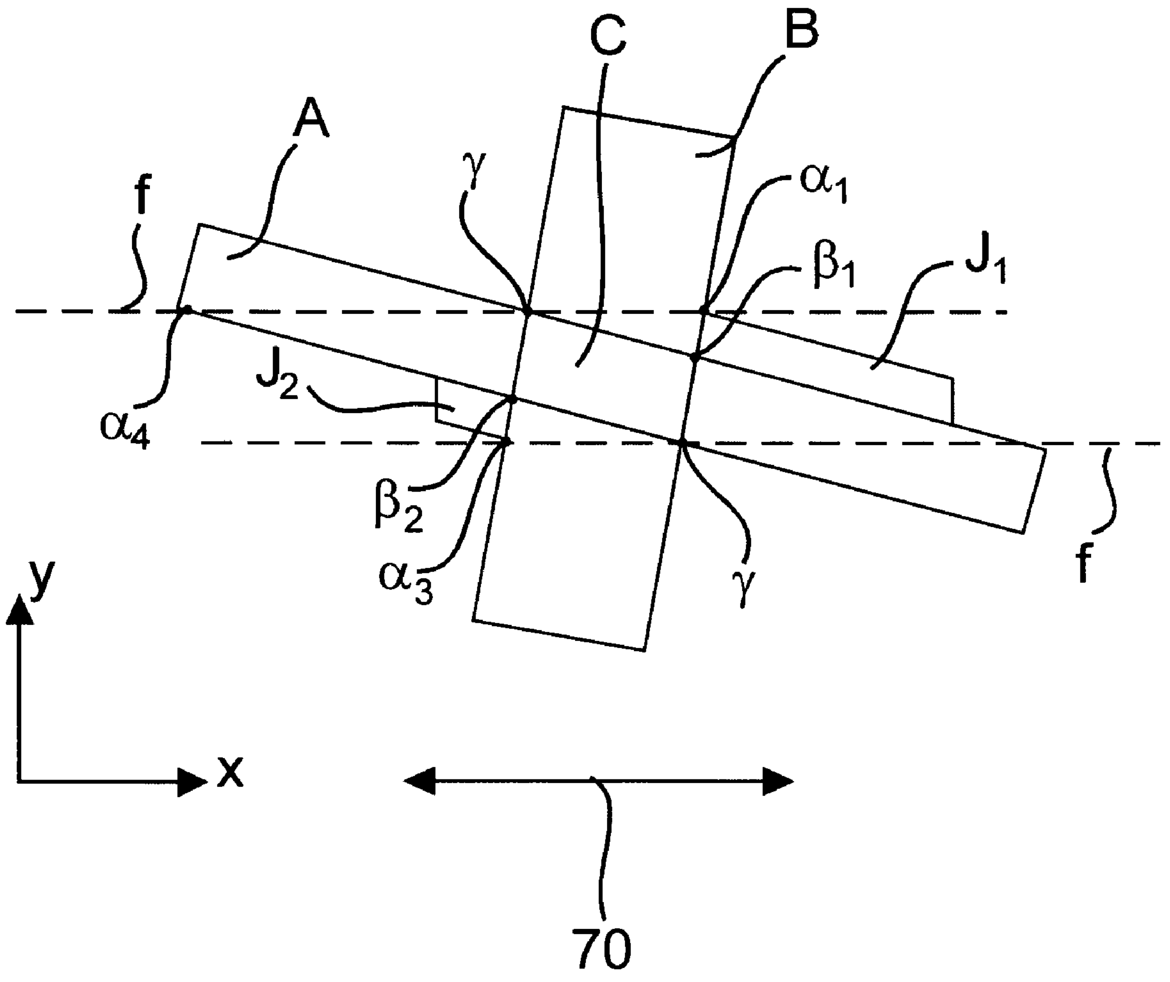
FIG. 16 is a detailed view of a wall intersection of another grid according to an embodiment of the present invention, illustrating a general arrangement of an additional grid area that is added to the wall intersection of the grid, such that two trapezoidal pieces are placed at opposing (non-adjacent) left and right corners of the wall intersection.
Figure 17:
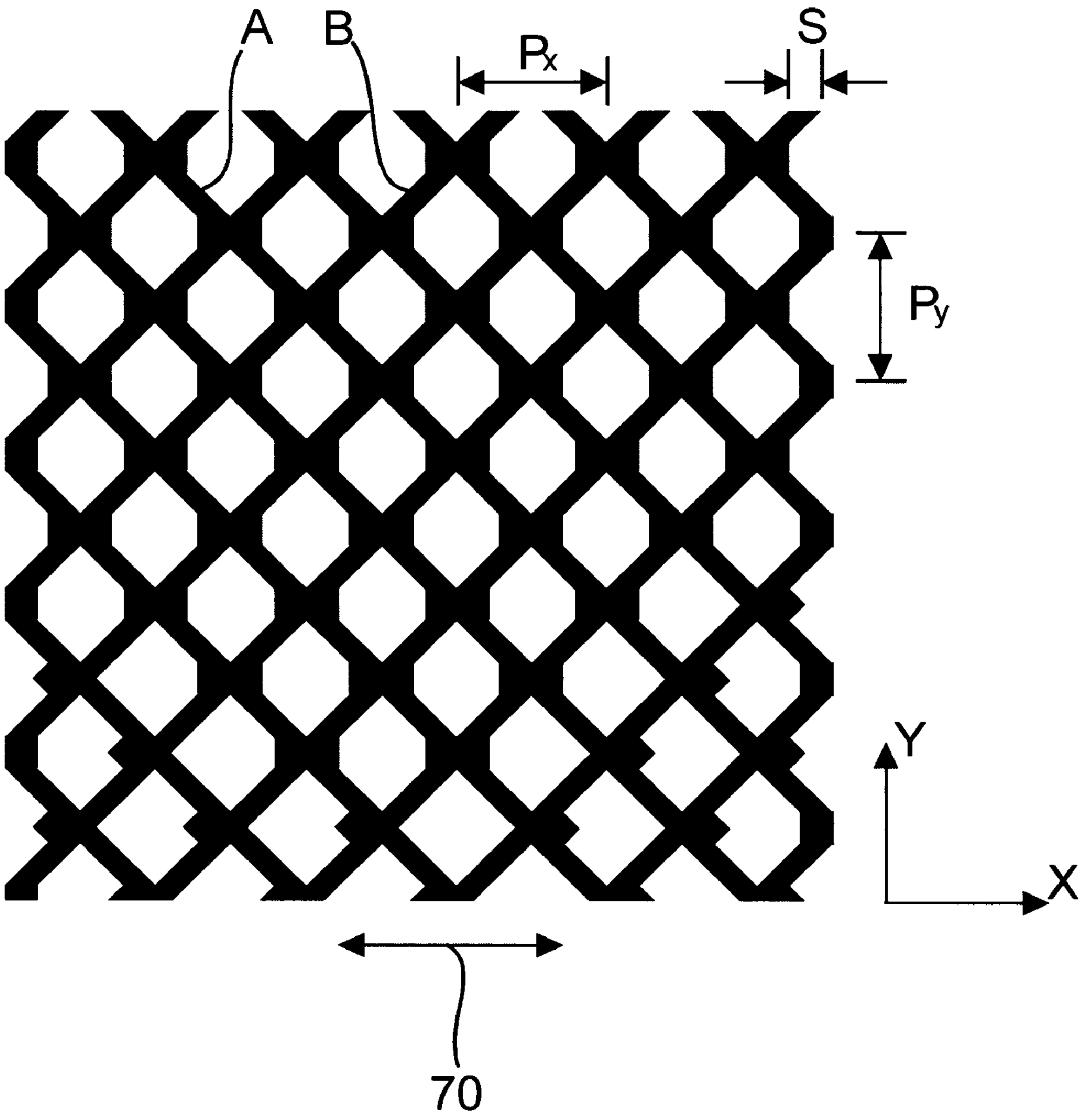
FIG. 17 shows a top view of a portion of a grid according to an embodiment of the present invention, having more than one type of modified corner as shown in FIGS. 12-16.

There are an unlimited variety of shapes that would produce uniform exposure for linear motion. Samples of three other alternatives are shown in FIGS. 14-16. They produce uniform exposure because they satisfy the criteria that the lengths through the grid in the x-direction for any value y are identical. There is no or essentially no difference in performance of the grids if motion is implemented correctly. Additional grid areas of different designs can be mixed on any one grid without visible effect when steady linear motion is implemented. FIG. 17, for example, illustrates and arrangement where different combinations of grid corners are implemented in one grid. However, the choice of grid corners depends on the ease of implementation and practicality. Also, since it is desirable for the transmission of primary radiation to be as large as possible, the grid walls occupy only a small percentage of the cross-sectional area.

A.2.d. General Construction Methods for Grid Design Type II for Linear Grid Motion It should be first noted that this concept does not limit grid openings to quadrilaterals. Rather, the grid opening shapes could be a wide range of shapes, as long as they are periodic in both x and y directions. The grid wall intercepts do not have to be defined by four straight line segments. Non-uniform shadow will not be introduced as long as the length of the lines through the grid in the x-direction is identical through any y coordinate. In addition to adding the corner pieces, the width of some sections of the grid walls would need to be adjusted for generalized grid openings.

However, not every grid shape that is combined with steady linear motion produces uniform exposure without artificial images. The desirable grid patterns that produce uniform exposure need to satisfy, at a minimum, the following criteria:

The grid pattern needs to be periodic in the direction of motion with periodicity $P_x$.

No segment of the grid wall is primarily along the direction of the grid motion.

The grid walls block the x-ray everywhere for the same fraction of the time per spatial period $P_x$ at any position perpendicular to the direction of motion.

The grid walls do not need to have the same thickness.

The grid patterns are not limited to quadrilaterals.

These grid patterns need to be coupled with a steady linear motion such that the distance of the grid motion, L, satisfies the condition described in Sections Grid Design Type I and Type II for Linear Motion.

If the walls are not continuous at the intersection or not identical in thickness through the intersection, the construction rule that must be maintained is that the length of the line through the grid in the x-direction is identical through any y-coordinate. Hexagons with modified corners are examples in this category.

A.2.e. Implementation of the Grid Design Type II for Linear Grid Motion

The additional grid area at the grid wall intersections can be implemented in a number of ways for focused or unfocused grids to obtain uniform exposure. The discussion will use FIGS. 8 and 10 as examples.

1. The grid patterns with the additional grid area, such as FIGS. 8, 10, 17, and so on, may have approximately the same cross-sectional pattern along the z-axis.
2. Since the additional pieces of the grid are for the adjustment of the primary radiation, these additional grid areas in FIGS. 8, 10, 17, and so on, only need to be high enough to block the primary radiation. This allows new alternatives in implementation.

A portion of the grid layer needs to have the additional grid area, while the rest of the grid layer does not. For example, a layer of the grid is made with pattern shown in FIG. 8, while the other layers can have the pattern shown in FIG. 7.

The portion of the grid with the shapes shown in FIGS. 8, 10, 17, and so on, can be released from the substrate for assembly or attached to a substrate composed of low atomic number material.

The portion of the grid with the pattern shown in FIGS. 8, 10, 17, and so on, can be made from materials different from the rest of the grid. For example, these layers can be made of higher atomic number materials, while the rest of the grid can be made from the same or different material. The high atomic number material allows these parts to be thinner than if nickel were used. For gold, the height of the grid can be 20 to 50 μm for mammographic applications. The height of the additional grid areas depends on the x-ray energy, the grid material, the application and the tolerances for the transmission of primary radiation.

The photoresist can be left in the grid openings to provide structure support, with little adverse impact on the transmission of primary radiation.

3. The additional grid areas shown in FIGS. 9, 11, and so on, can be fabricated separately from the rest of the grid.

These areas can be fabricated on a substrate composed of low atomic number material and remain attached to the substrate.

These areas can be fabricated along with the assembly posts, which are exemplified in FIGS. 16a and 16b of U.S. Pat. No. 5,949,850, referenced above.

Figure 9:
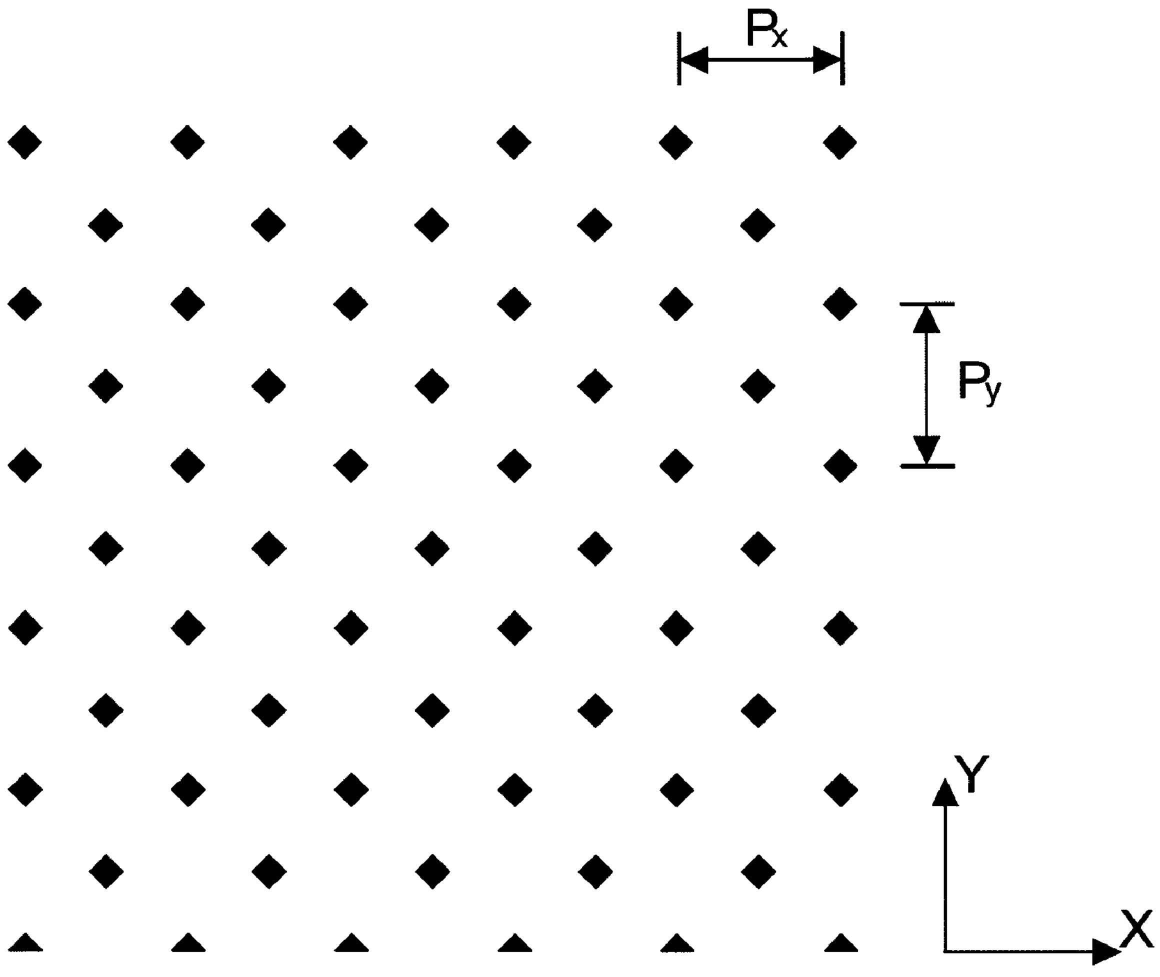
FIG. 9 is the top view of only the additional grid areas that were added to a square grid shown in FIG. 7 to form the grid pattern shown in FIG. 8.
Figure 11:
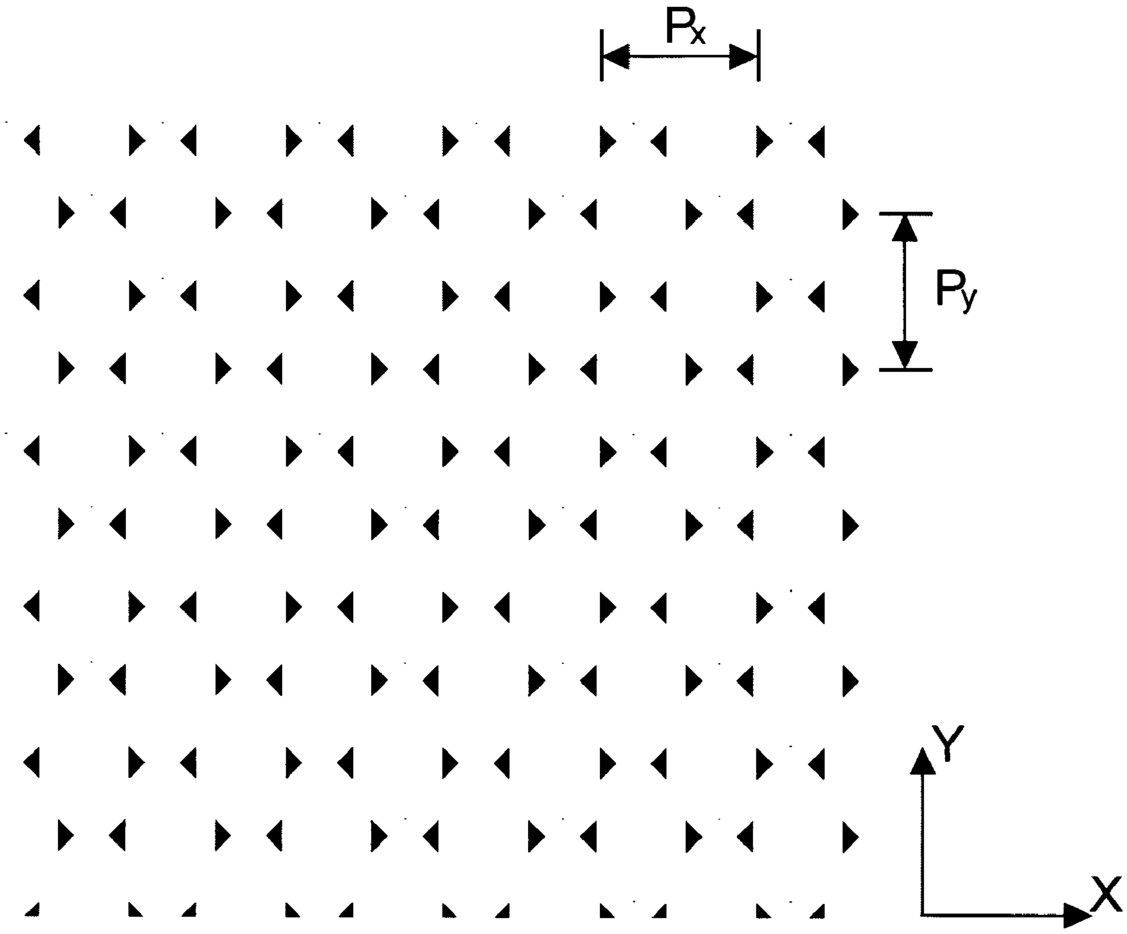
FIG. 11 is a top view of only the additional grid areas that were added to a square grid shown in FIG. 7 to form the grid pattern shown in FIG. 10.

Patterns shown in FIGS. 9, 11, and so on, can be made of a material different from the rest of the grid. For example, these layers can be made from materials with higher atomic weight, while the rest of the grid can be made of nickel. The high atomic weight material allows these parts to be thinner than if nickel were used. For gold, the height of the grid can be 20 to 100 μm for mammographic applications. The height of the additional grid areas depends on the x-ray energy, the grid material, the application and the tolerances for the transmission of primary radiation.

The photoresist can be removed from the fabricated grid or collimator or left in on substrate composed of low atomic number material to provide structural support.

A.2.f. Grid Parameters and Design for Type I or II

Examples of the parameter range for mammography application and definitions are given below. Grid Pitch is $P_x$. Aspect Ratio is the ratio between the height of the absorbing grid wall and the thickness of the absorbing grid wall. Grid Ratio is the ratio between the height of the absorbing wall including all layers and the distance between the absorbing walls.

| | Range | Best Case: for x-ray anti-scatter grid for mammography |
|---|---|---|
| Grid Type | Type I or II | Type II/FIG. 10 |
| Grid Opening Shape | Quadrilateral | Square |
| Thickness of Absorbing Wall on the top plane of the grid | 10 μm-200 μm | ≈20-30 μm |

-continued

| | Range | Best Case: for x-ray anti-scatter grid for mammography |
|---|---|---|
| Grid Pitch for Type I | 1000 μm-5000 μm | |
| Grid Pitch for Type II | 100 μm-2000 μm | ≈300-1000 μm |
| Aspect Ratio for a Layer | 1-100 | >15 |
| Number of Layers | 1-100 | 1-5 |
| Grid Ratio | 3-10 | 5-8 |

However, it should be noted that different parameter ranges are used for different applications, and for different radiation wavelengths.

A.3. Other Grid Designs and Applications

A.3.a. Stationary Grid

When the grid matches the digital detector pixel periodicity and appropriately aligned with the detector pixels, then the grid does not need to move to remove visible grid shadow in the image. Digital detector pixels are getting smaller and smaller. A common digital breast imaging detector has periodicity of 70 μm. The stationary grids will have the following characteristics: (i) grid geometry matching the detector layout requiring small periodicity, (ii) high primary transmission requiring very thin septa (for example, 5-9 μm septa for 70 μm periodicity), (iii) applications requiring focused septa and (iv) appropriate grid ratio to eliminate the scatter for the application. A new fabrication method utilizing energetic neutral atom beam lithography can fabricate grids that satisfy these stationary grid requirements.

A.3.b. Grid and Collimator Masters for Replication

Grids and collimators can also be replicated by casting from a blank or master. Microfabrication methods described below can make precision masters. Grid and collimator masters can be free-standing pieces or attached to a substrate.

B. Gamma-Ray Collimators

Imaging radioactive sources distributed throughout a volume requires collimators to localize the source by eliminating the γ-rays from undesirable locations. Gamma-ray imaging is utilized in nuclear medicine, basic research, national defense applications, etc.

Figure 18:
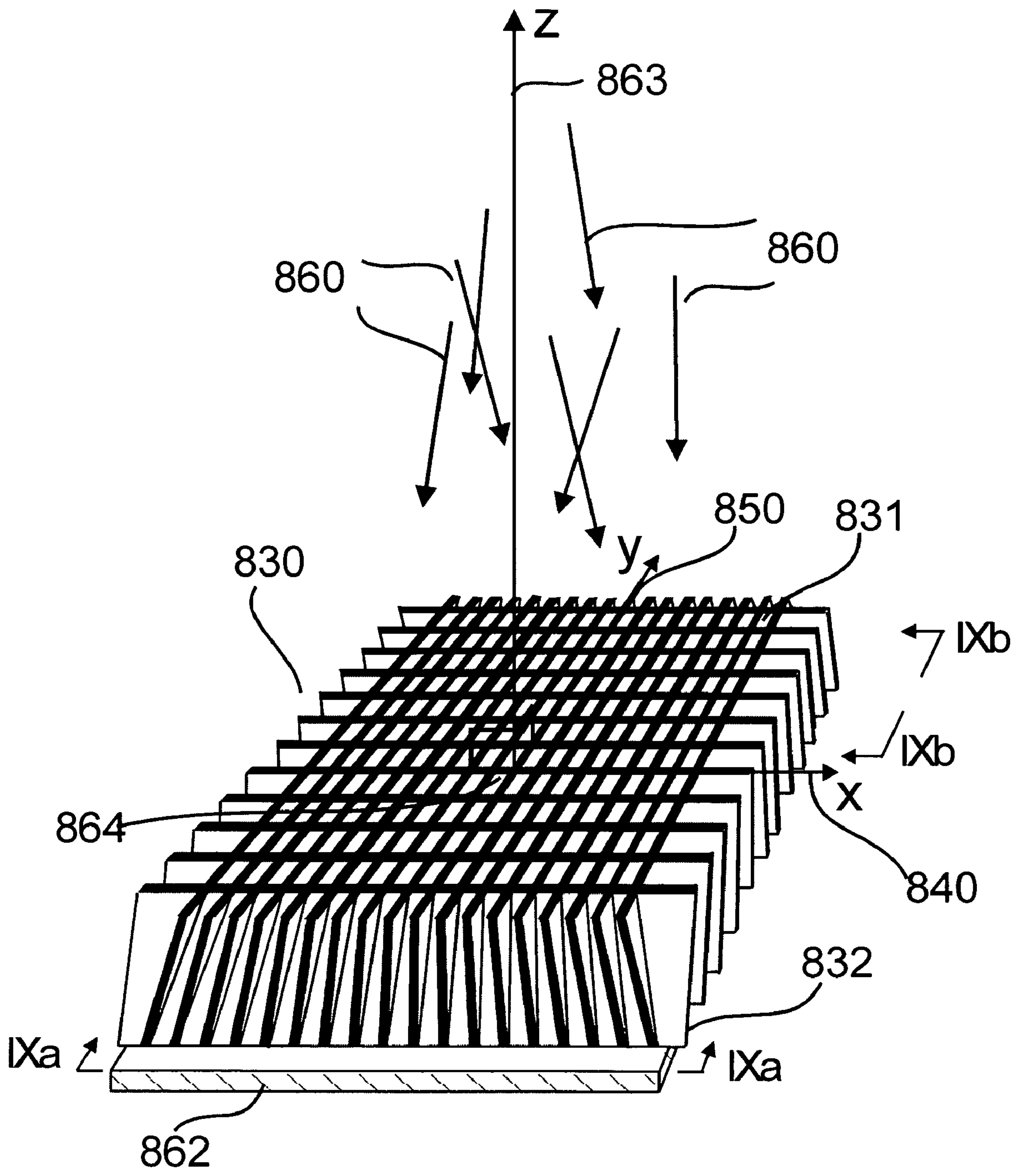
FIG. 18 shows a focused collimator, a gamma camera, and γ-rays.

Collimators design can have a wide variation depending on the application. The most common are pin holes, parallel holes or focused holes. FIG. 18 shows a focused collimator 832, a gamma camera 862, and γ-rays 860. The most commonly used radionuclides for planar scintigraphy and SPECT are iodine-123, $^{123}$I, (13 hr half time and photon energy of 160 keV), technetium-99m, $^{99m}$Tc, (6.0 hour half time, photon energy 140 keV), and indium-111, $^{111}$In, (2.8 days halftime, photon energy 173 keV (50%), 247 keV (50%)), as described in a book by R. E. Henkin, et al., *Nuclear Medicine*, Mosby, St. Louis, 1996, the entire contents of both being incorporated herein by reference. The desirable materials for collimators would be tungsten, gold, lead and materials with the highest possible atomic number and density. For some research and defense applications, the γ-ray energies can be higher than those cited above.

Typically, the periodicity, the wall thickness and the height of collimators are larger than that of the grid. The collimator parameters can vary widely depending on the radioactive material and the needs of a particular application. Table 1 gives the physical properties of tungsten, gold and lead at 140 keV and Table II gives a set of collimator design parameters.

TABLE I

Physical properties of tungsten, gold and lead at 140 keV.

| | Atomic Number | Density ρ (g/cm$^3$) | μ/ρ (cm$^2$/g) | Attenuation Coefficient μ(cm$^{-1}$) |
|---|---|---|---|---|
| Tungsten (W) | 74 | 19.25 | 1.882 | 36.23 |
| Gold (Au) | 79 | 19.3 | 2.209 | 42.63 |
| Lead (Pb) | 82 | 11.36 | 2.39 | 27.15 |

TABLE II

Comparison of optimized collimator designs optimized for different materials for 140 keV.

| Optimized | Hole Periodicity (μm) | Hole Diameter (μm) | Hole Side (μm) | Septa (μm) | Thickness (cm) |
|---|---|---|---|---|---|
| Tungsten (W) | 380 | 338 | 300 | 80 | 0.92 |
| Gold (Au) | 380 | 343 | 304 | 76 | 0.82 |
| Lead (Pb) | 380 | 329 | 291 | 88 | 1.13 |

The distance d that the 140 keV γ-ray travels in the material and its intensity decreases by a factor e is d=1/μ.

C. Grid and Collimator Structures

C.1. Grid and Collimator Joint Designs

Figure 19:
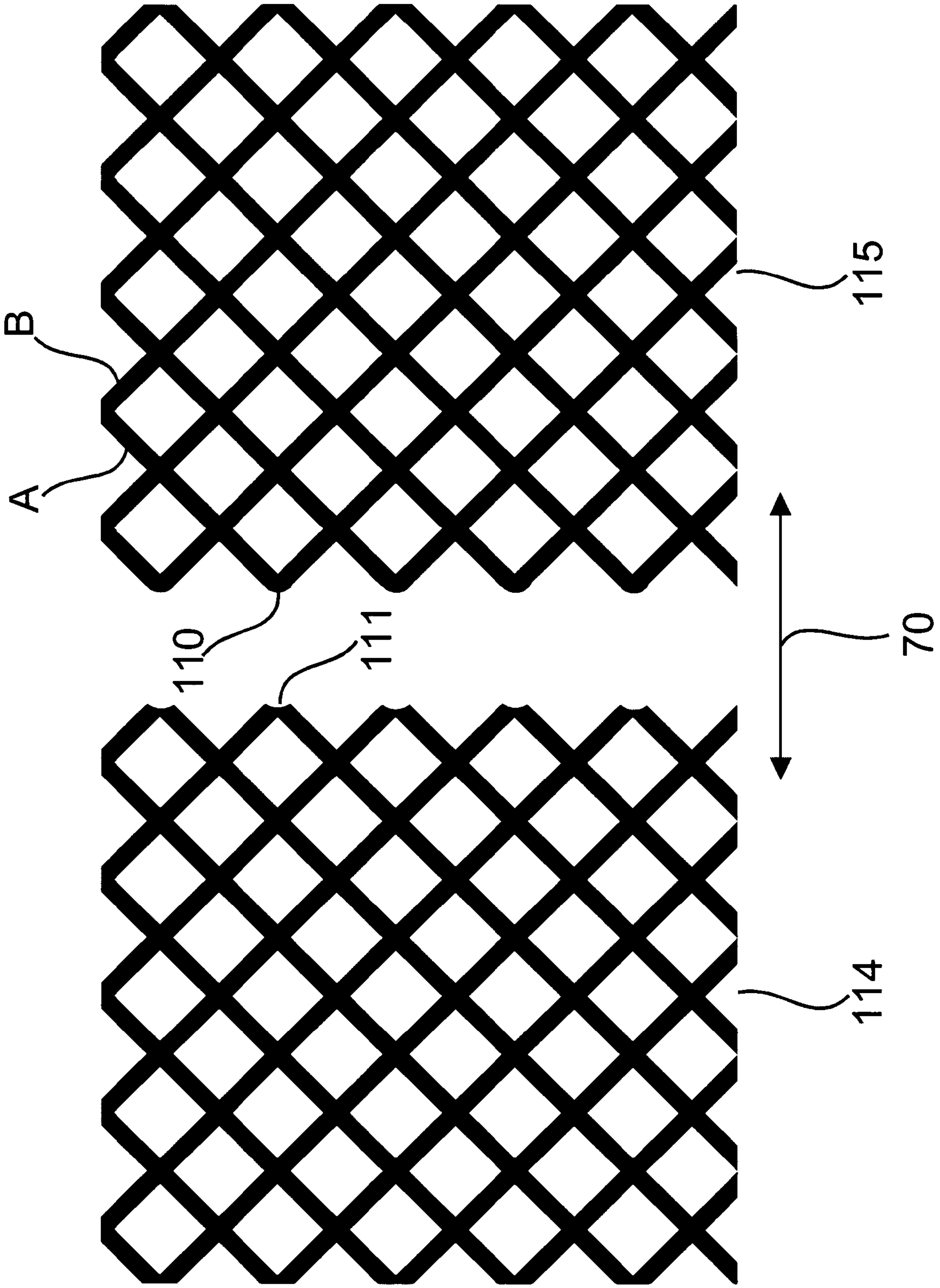
FIG. 19 shows one layer of grid or collimator to be assembled from two sections and their joints, using the pattern as shown in FIG. 7.

Designs of grid joints were described in U.S. Pat. Nos. 5,949,850 and 6,252,938 referenced. FIG. 19 shows a grid to be assembled from two sections, using the pattern of FIG. 7 as an example. The curved corner interlocks in the shape of 110 and 111 shown in FIG. 19 are found to be more desirable structurally than other joints. Straight line boundaries are also acceptable as long as they retain their relative alignments. The details of the corner can vary.

C.2 Grid and Collimator Wall Orientations

Figure 20A:
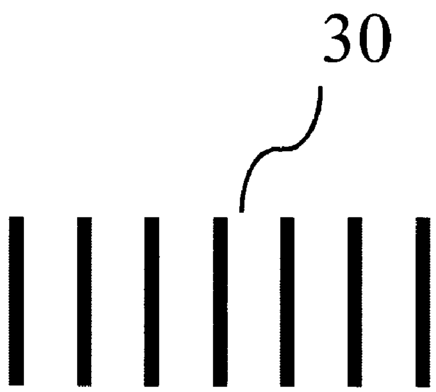
FIGS. 20*a*-20*e* are schematics of side view of walls: (a) parallel and perpendicular to the substrate (unfocused), (b) parallel and not perpendicular to the substrate (also unfocused), (c) focused to a point above the detector, (d) defocused (focused to a point below the detector) and (e) variable orientation.
Figure 20B:
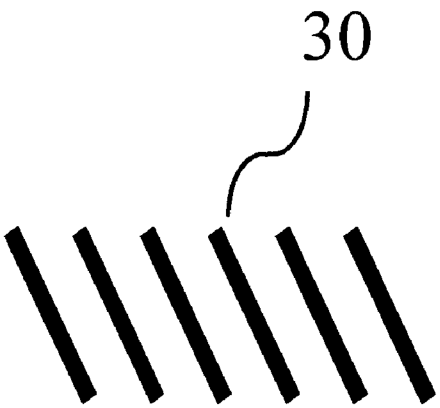
Figure 20C:
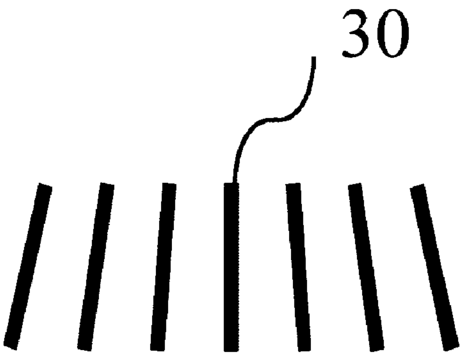
Figure 20D:
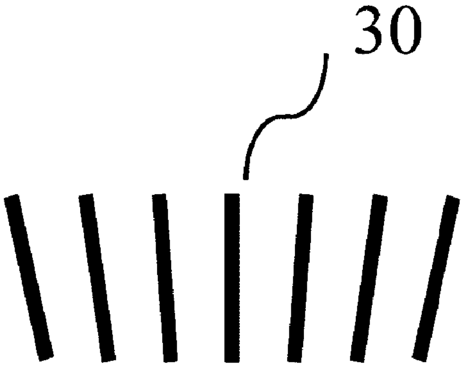
Figure 20E:
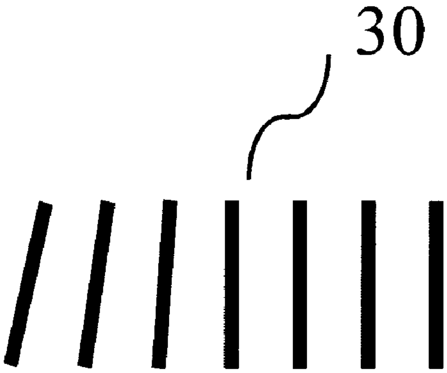

The are many possibilities for grid and collimator walls: (a) The walls can be all perpendicular to the substrate, FIG. 20*a*. (b) Only one set of walls is perpendicular to the substrate while the other set of walls is parallel to each other but are not perpendicular to the substrate, FIG. 20*b*. (c) Both set of walls are parallel to each other but are not perpendicular to the substrate. (d) One set of walls is focused to a line, FIG. 20*c*, and the other set of walls is parallel. (e) One set of walls is defocused from a line, FIG. 20*d*, and the other set of walls is parallel. (f) Both sets of walls are focused to a point, FIGS. 1 & 2. (g) Both set of walls are defocused to a point. (h) Walls do not have identical point focus or identical line focus, FIG. 20*e*.

C.3. Stacking

The manner in which tall grids are made in accordance with the present invention will now be discussed.

For many applications, it is possible to make a grid or collimator in one piece. When it is not possible to make it in one piece at the desirable height, two ore more thinner pieces can be assembled in a stack. Stacking of 10 layers of 210 μm high grids has been demonstrated in accordance with the present invention, but as many as 100 layers or more can be stacked, if necessary, when the individual pieces are all fabricated with correct dimensions and assembled with adequate precision.

Figure 21A:
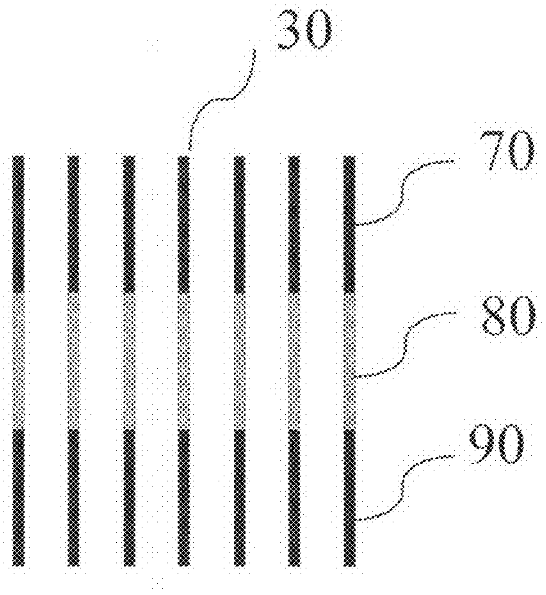
FIG. 21*a* is a schematic of a side view of stacks of three layers illustrated using parallel walls and FIG. 21*b* shows that different materials can be used within a single layer.

An advantage of stacking is that the layers can be made of the same or similar material or of different materials. In the stacking arrangement, illustrated with parallel walls in FIG. 21*a*, layer 70, 80 and 90 can be made of same material, or of different materials.

Figure 21B:
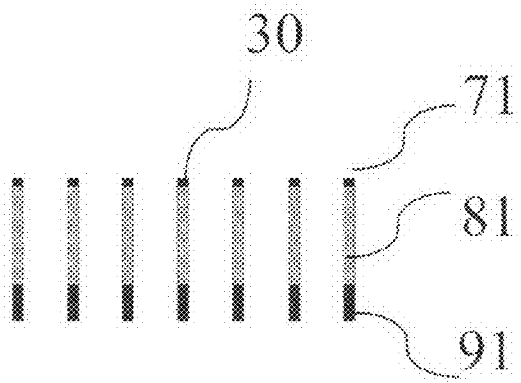

The materials within each layer do not have to be identical. For example, a grid that is fabricated by electroplating/electroforming can be composed of a layer of copper, followed by a layer of lead, and finished with a layer of copper, forming the structure shown in FIG. 21*b*. The advantages this structure is avoidance of planarizing lead surfaces, utilized the high absorption of x-rays and γ-rays, and stronger structure of copper than lead.

C.4. Grid/Scintillators and Collimator/Scintillators

If desired, the holes of one or more layers of the grid or collimator can be filled with scintillators, solid, liquid, glue or any other material required for research or a specific application.

Figure 22A:
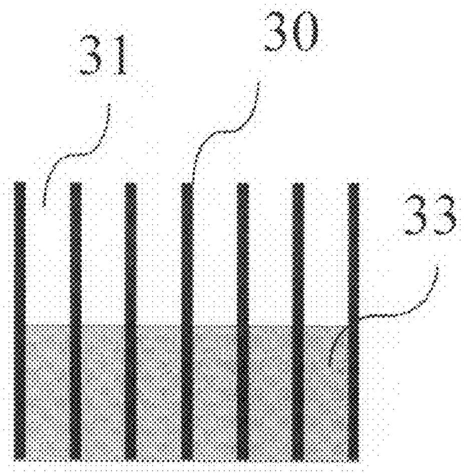
FIG. 22 shows a side view of a grid filled with scintillator.

Scintillators converts x-ray and γ-rays to optical or UF signal. Some examples of scintillators are phosphors, CsI, etc. In some applications, not all the holes need be filled. When the holes are filled with scintillator, the signal is confined to the hole avoiding blurring. The scintillator should only be in the lower portion of a layer or layers of the stack. FIG. 22*a* shows the side view of scintillator 33 filling the bottom of the holes for one layer of the grid or collimator.

Figure 22B:
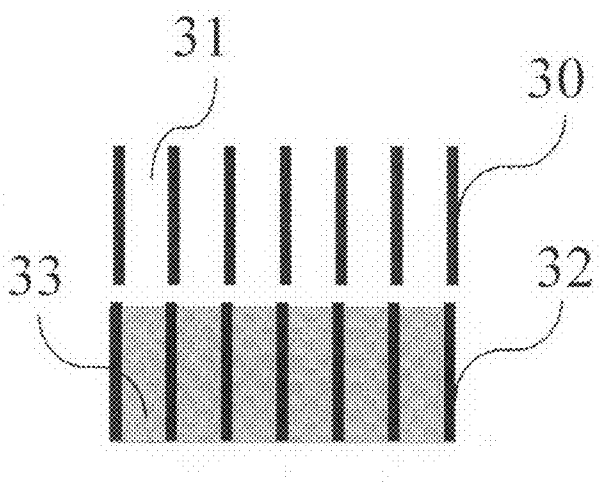

FIG. 22*b* shows the side view of two layers of anti-scatter grids with the scintillator 33 in all the holes of the bottom grid layer 32. The hole of the layer above 31 are not filled with scintillator.

When digital detector periodicity becomes small (for example 0.25 mm or smaller periodicity) for high energy x-ray imaging requiring few hundred micron thick scintillators, the image resolution can be degraded by the spread of photons produced by the scintillators. A common practice to minimize the optical cross-talk produced by the scintillator is by dicing the scintillator and filling the gap with white powders. When the gap is thin, cross-talk still exists; when the gap is thicker, the primary x-ray is reduced. A grid with thin septa made by opaque material that is reflective or coated with optically reflective materials can be used to separate the scintillator pixels to eliminate optical cross-talk. Grids for this application can utilize either parallel or focused septa.

C.5. Attachment to Substrate

Grids and collimators can be free-standing pieces or attached to a substrate.

D. Fabrication

The methods according to the present invention for manufacturing the grids and grid pieces discussed above (as shown, for example, in FIGS. 1, 2, 17, 18, and 19) will now be discussed. There are four general photoresist/substrate combinations for fabrication: (a) positive photoresist and silicon or similar substrate, (b) positive photoresist and graphite substrate, (c) negative photoresist and silicon or similar like substrate and (d) negative photoresist and graphite substrate. For positive photoresist, the part of the resist that is exposed to the x-rays or ultraviolet or other radiation is the part that is removed during development. The opposite is true for negative photoresist.

D.1. Fabrication Using Positive Photoresist and Not Graphite Substrates

The first fabrication method, using positive photoresist and silicon substrates, is based on the techniques developed by Prof. Henry Guckel at University of Wisconsin at Madison called SLIGA. The details of fabrication are shown in FIGS. 23*a*-23*h*. This method can make free standing nickel grids, but it cannot make free standing copper or lead grids and collimators, because the etch used to release the electroformed parts also dissolves the copper and lead parts.

(a) A substrate 720, such as a silicon wafer, is prepared by sputtering the plating base and releasing metal (titanium/copper/titanium) 721 onto it. Copper (Cu) is used as the electroplating/electroforming electrode, while titanium (Ti) is used to adhere copper with the photoresist 710, and to connect copper with the substrate.

(b) A thin layer of the photoresist 710 is spun on the substrate 720 followed by gluing on a thicker layer of the photoresist. The photoresist 710 of choice for the LIGA process is polymethyl-methacrylate (PMMA) because of the highly prismatic structures, with low run-outs, that can be fabricated from it.

(c) The x-ray mask 730 is aligned onto the photoresist 710 attached to the substrate 720. This assembly is then exposed to an x-ray source 700, which transfers the pattern on the mask 730 to the photoresist 710. Synchrotron radiation is usually used, because of its very high collimation, high flux, and short wavelength. Within the irradiated sections of the resist layer, the polymer chains are destroyed, reducing the molecular weight. The unexposed regions of the resist were covered by the gold absorbers on the mask during irradiation.

(d) The exposed photoresist is then developed; the exposed resist is selectively dissolved by a solvent, while the unexposed resist 710 remains unchanged. The top layer of the Ti plating 721 has to be removed by wet etch before electroplating/electroforming, because Ti is not a good electroplating/electroforming contact.

(e) Metal 740 is electroplated into the pattern.

(f) The electroplated metal 740 is lapped and polished to the desired metal height with an accuracy of ±1 μm.

(g) The photoresist mold 710 is then removed by dissolving it chemically.

(h) The device is released from the substrate 720 by etching away the copper on the substrate.

D.2 Fabrication using Positive Photoresist with Graphite Substrate

The fabrication method using positive photoresist and graphite substrate is shown in FIGS. 24*a*-24*f*.

Figure 23A:
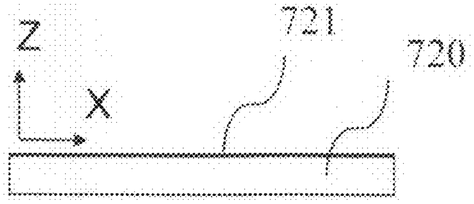
FIGS. 23*a*-23*h* show an example of a method for fabricating a grid or collimator using a positive photoresist and silicon substrate in accordance with the present invention demonstrated using a parallel, sheet x-ray source.
Figure 23B:
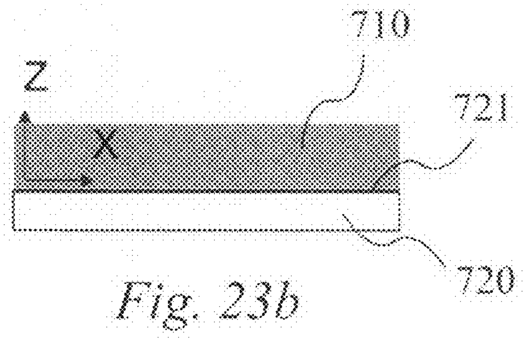
Figure 23C:
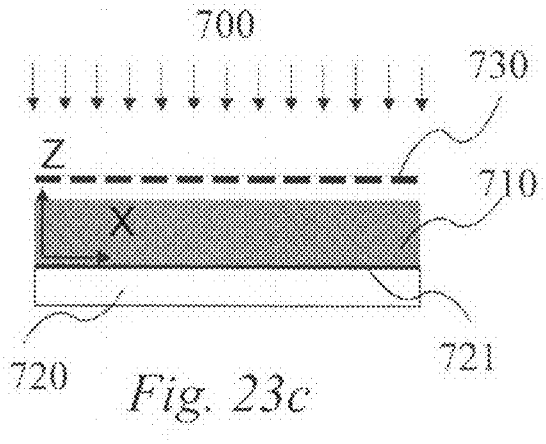
Figure 23D:
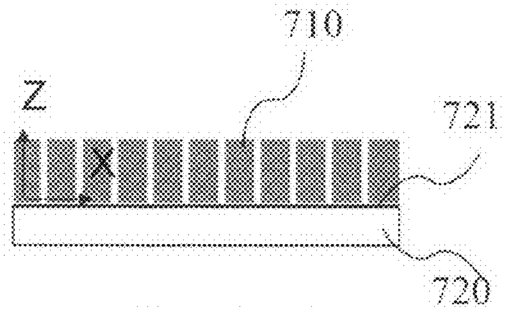
Figure 23E:
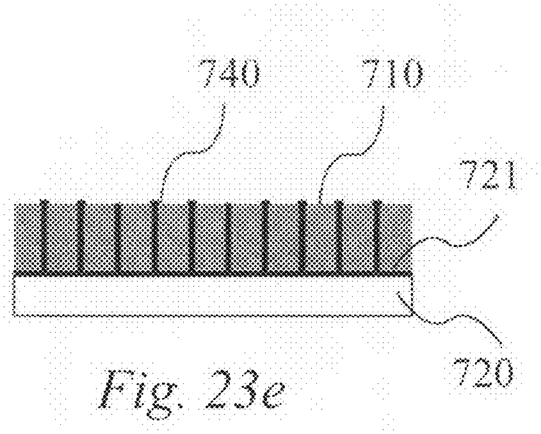
Figure 23F:
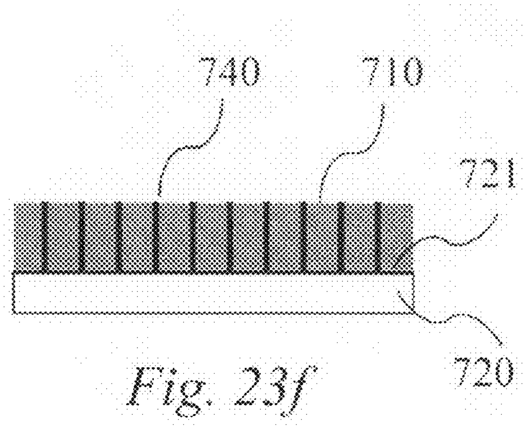
Figure 23G:
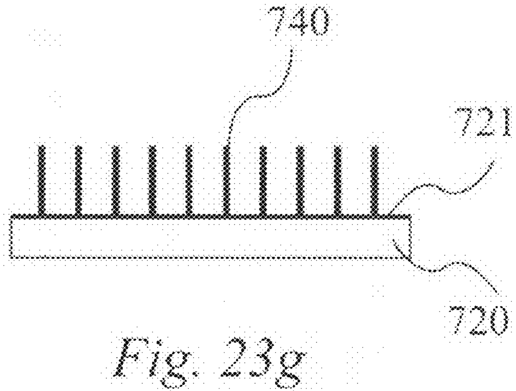
Figure 23H:
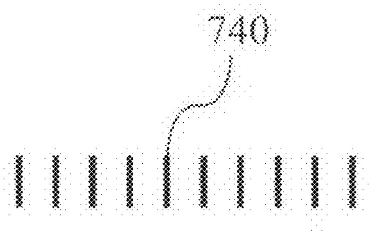

(a) A thin layer of the photoresist 710 is spun on the graphite substrate 725 followed by gluing on a thicker layer of the photoresist. The sacrificial layer (Ti/Cu/Ti), needed for FIG. 23*a*, is no longer required.

(b) The x-ray mask 730 is aligned onto the substrate with the photoresist 710. This setup is then exposed by an x-ray source 700, which transfers the pattern on the mask 730 to the photoresist 710. Within the irradiated sections of the resist layer the polymer chains are destroyed, reducing the molecular weight. The unexposed regions of the resist were covered by the gold absorbers on the x-ray mask during irradiation.

(c) The exposed photoresist 710 is then developed, the exposed resist is selectively dissolved while the unexposed resist remain unchanged.

(d) Metal 740 is electroplated into the patterned photoresist 710.

(e) Graphite substrate 725 is removed by abrasion. The grid or collimator is polished on both sides.

(f) The remaining photoresist can then be left in place or removed leaving the metal 740.

D.3. Fabrication Using Negative Photoresist and Not Graphite Substrate

The fabrication method using negative photoresist and silicon substrate is similar to that shown in FIGS. 23*a*-23*h*, except that the mask has the reverse pattern from the positive photoresist. An example of negative photoresist is SU-8. SU-8 can be exposed by x-rays or by ultraviolet radiation in the 350-400 nm wavelength regime. A separate release layer is required on the substrate and the releasing material is evolving.

D.4. Fabrication Using Negative Photoresist and Graphite Substrate

Figure 24A:
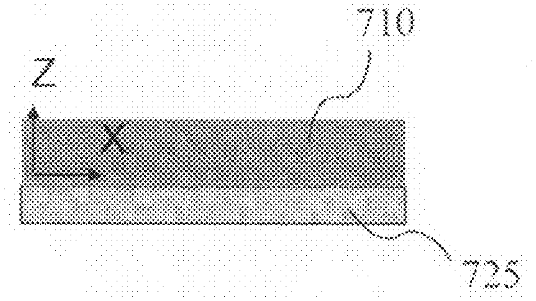
FIGS. 24*a*-24*f* show an example of a method for fabricating a grid or collimator using a positive photoresist and graphite substrate in accordance with the present invention demonstrated using a parallel, sheet x-ray source.
Figure 24B:
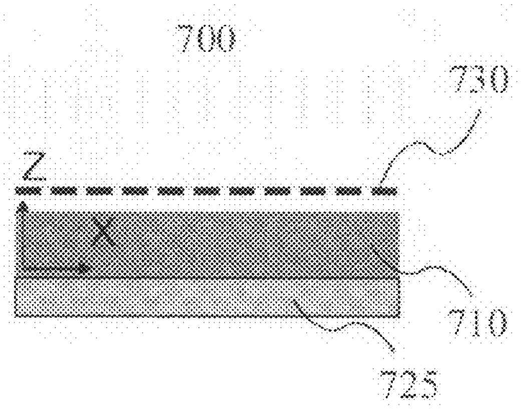
Figure 24C:
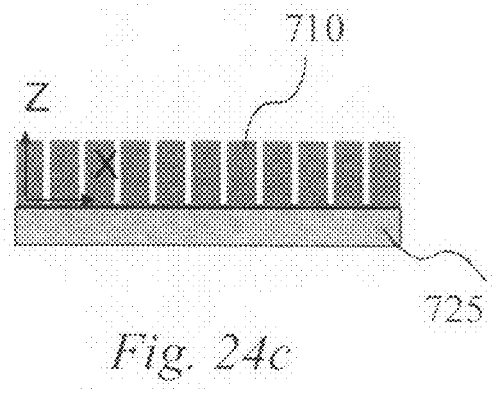
Figure 24D:
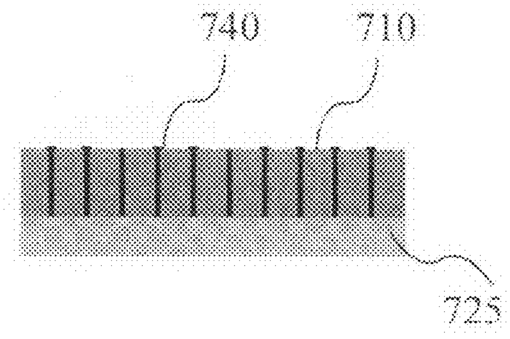
Figure 24E:
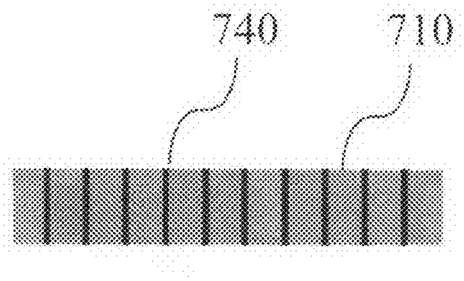
Figure 24F:
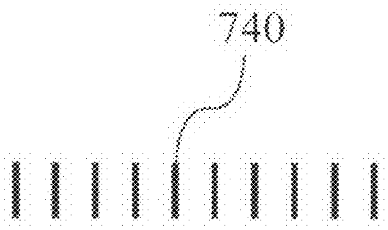

The fabrication method using negative photoresist and graphite substrate is similar to that shown in FIGS. 24*a*-24*f*, except that the mask has the reverse pattern from the positive photoresist. The method to remove the negative photoresist, the step from FIG. 24*e* to FIG. 24*f*, is dependent on the material. Using SU-8 as an example of negative photoresist, the grid with the SU-8 has to be baked at a temperature of 500° C. after polishing on both sides. The SU-8 shrinks and releases the grid or collimator. Other SU-8 removal methods use salts or plasma etching.

D.5 Energetic Neutral Atom Beam Lithography Without Graphite Substrates

Directional energetic neutral atom beams can be used to directly activate surface chemical reactions, forming the basis of a specialized tool for etching. (E. A. Akhadov, D. E. Read, A. H. Mueller, J. Murray, and M. A. Hoffbauer, "Innovative approach to nanoscale device fabrication and low-temperature nitride film growth," J. Vac. Sci. Technol. B 23 (6), 3116-3119 (2005). A. H. Mueller, M. A. Petruska, M. Achermann, D. J. Werder, E. A. Akhadov, D. D. Koleske, M. A. Hoffbauer, and V. I. Klimov, "Multicolor Light-Emitting Diodes Based on Semiconductor Nanocrystals Encapsulated in GaN Charge Injection Layers," NanoLetters 5 (6) 1039-1044 (2006). A. H. Mueller, E. A. Akhadov, and M. A. Hoffbauer, "Low-temperature growth of crystalline GaN films using energetic neutral atomic-beam lithography/epitaxy," Applied Physics Letters 88, 041907-1-3 (2006).) For the fabrication of grids and collimators, polymer etching will be utilized to form the spaces that will be filled by septa material.

Appropriate energetic neutral atoms selectively break chemical bonds at relatively low temperatures in a clean, well-controlled, charge-free environment. The kinetic energies of the neutral-atom beam encompass the range of most chemical bond strengths but are too low to induce structural damage. It is important to note that these high kinetic energies represent the chemical equivalent of heating materials to temperatures of >10,000 K, while allowing the actual materials to remain near ambient temperature (about 300 K).

Energetic neutral atom beam lithography allows the modification of thin film materials without the need to heat substrates to activate chemical reactions, induce surface diffusion, or stimulate other chemical or physical processes. The absence of charged species, interfering contaminants and toxic chemicals makes energetic neutral atom beam lithography ideally suited for nanofabrication involving materials such as polymers, biomaterials, or self-assembled structures that would otherwise suffer from thermal degradation, ion-induced damage, or thermal stability problems.

Energetic neutral atom beam lithography, such as a neutral oxygen atomic beam with kinetic energies between 0.5 and 5 eV, can etch polymers. Highly anisotropic etching occurs when energetic oxygen atoms impinge upon polymer surfaces to form volatile reaction products (CO, $CO_2$, $H_2O$, etc.). The reaction products are removed by the vacuum system.

Because the chemistry involving the interaction of directional energetic neutral atoms, such as oxygen, with polymer surfaces, the reproduction of mask features into polymeric films takes place without significant undercutting or tapering effects that are characteristic of other polymer etching techniques.

To be suitable for energetic neutral atom lithography, polymer surfaces must first be patterned with a mask material that does not react with energetic neutral atoms. Typical metallic thin films, such as Cr, Al, Au/Pd, can be used for oxygen atoms. A variety of techniques including photo or e-beam lithographies have been successfully implemented for patterning the metallic thin films to form the mask. When the sample is exposed to the incident collimated beam of atomic oxygen, the unprotected areas are anisotropically etched leaving the underlying masked polymer intact. Examples of polymers used are photoresists (PMMA and SU-8), polyimide, polycarbonate, polyethylene, perflourinated cyclobutane, glassy carbon, and amorphous diamond. In all cases, highly anisotropic etching is observed with some variability in feature fidelity due to specific polymer characteristics such as density, hardness, and other chemical and/or structural properties. For example, the mechanical stability of certain polymers limits the aspect ratios that can be reproducibly attained. We note that energetic neutral atom lithography, using oxygen atoms, does not effectively etch polymers containing elements that react with energetic oxygen atoms to form nonvolatile compounds. For example, a polymer containing Si (such as polydimethyl-siloxane) would form a layer of $SiO_2$ that then effectively serves as an etch stop, limiting further erosion of the organic constituents in the polymer.

The energetic neutral atom beam can be collimated to form parallel grid or collimators, or uncollimated cone beam to form focused grids and collimators.

The detail fabrication steps using energetic neutral atom lithography are shown in FIGS. 38*a*-38*h* not using graphite substrates.

(a) A substrate 820, such as a silicon wafer, is prepared by sputtering the plating base and releasing metal (titanium/copper/titanium) 821 onto it. Copper (Cu) is used as the electroplating/electroforming electrode, while titanium (Ti) is used to adhere copper with the photoresist 810, and to connect copper with the substrate. Other metals can also be used such as Cr.

(b) Polymer 810 is glued on the substrate 820. The polymer 810 of choice for the energetic neutral atom beam lithography process is PMMA because of the availability of standard protocol.

(c) Metal grid mask 830 is directly placed on the surface of the polymer. There are various conventional methods to accomplish this including optical lithography or e-beam lithography. If optical lithography is used, it consists of the following steps:
   Metal mask material is deposit on the polymer.
   Photoresist is spun on the metal mask material.
   UV lithography is performed using optical mask to transfer the pattern on to the photoresist.
   The photoresist is developed.
   The metal not covered by photoresist is etched away.
   The photoresist is removed and the metal grid mask 830 on the polymer is obtained.
(d) This mask/polymer/substrate assembly is then exposed to the energetic neutral atom beam source 800, which etches the polymer 810 not masked by 830. The etching is stopped by the metal on the substrate.
(e) The metal grid mask 830 on top of the polymer is removed. The metal grid mask material should be different than the metal that is used between the polymer and the substrate, so that the removal of the grid mask 830 will not remove the plating substrate 821.

After removing 830, metal 840 is electroplated into the patterned polymer.

(f) The electroplated metal 840 is planarized to the desired metal height.
(g) The photoresist mold 810 is then removed by dissolving it chemically.
(h) The device is released from the substrate 820 by etching.

D.6 Energetic Neutral Atom Beam Lithography with Graphite Substrates

The fabrication method using polymers and graphite substrates is shown in FIGS. 39*a*-39*f*.

(a) Polymer 810 is attached directly to the graphite substrate 825, or the graphite substrate is coated with a thin layer of metal 821 as a stopper for the energetic neutral atom beams and the polymer 810 is attached above the metal. Commonly available metals are Al and Cr.
(b) Grid pattern is directly placed on the surface of the polymer. There are various conventional methods to accomplish this including optical lithography or e-beam lithography. The details for optical lithography are described in Section D.5.
(c) This mask/polymer/substrate assembly is then exposed to the energetic neutral atom beam source 800, which etches the pattern on the mask 830 to the polymer 810. Etching is stopped at the metal layer or the slightly into the graphite.
(d) The metal grid mask 830 on top of the polymer is removed. The metal grid mask material should be different than the metal that is used between the polymer and the graphite substrate, so that the removal of the grid mask 830 will not remove the substrate 821.

After removing 830, metal 840 Metal 840 is electroplated into the patterned polymer 810.

(e) The access metal above the grid and the graphite substrate 820 are removed and planarized. Alternatively, only the access metal above the grid is removed leaving the grid attached to the graphite substrate.
(f) The remaining photoresist can then be left in place or removed leaving the metal 840.

D.7 Additional Advantages of Graphite as Substrates

Beside the fact that graphite can be used to fabricate free-standing grids and collimators using copper, lead, or any material that can be electroplated/electroformed or cast, it has three other advantages for use as a substrate. Graphite has a low atomic number, so that it is transparent to x-ray radiation. Graphite is conducting, so that no electroplating/electroforming layer of Ti/Cu/Ti is required, simplifying the fabrication process. In addition, the graphite surface is rougher than silicon, so that attachment of photoresist to the substrate is stronger than to the silicon substrate with the Ti/Cu/Ti layer.

E. Exposure of the Photoresist

E.1. Exposure of Positive Photoresist Using Sheet X-Ray Beam

Figure 27A:
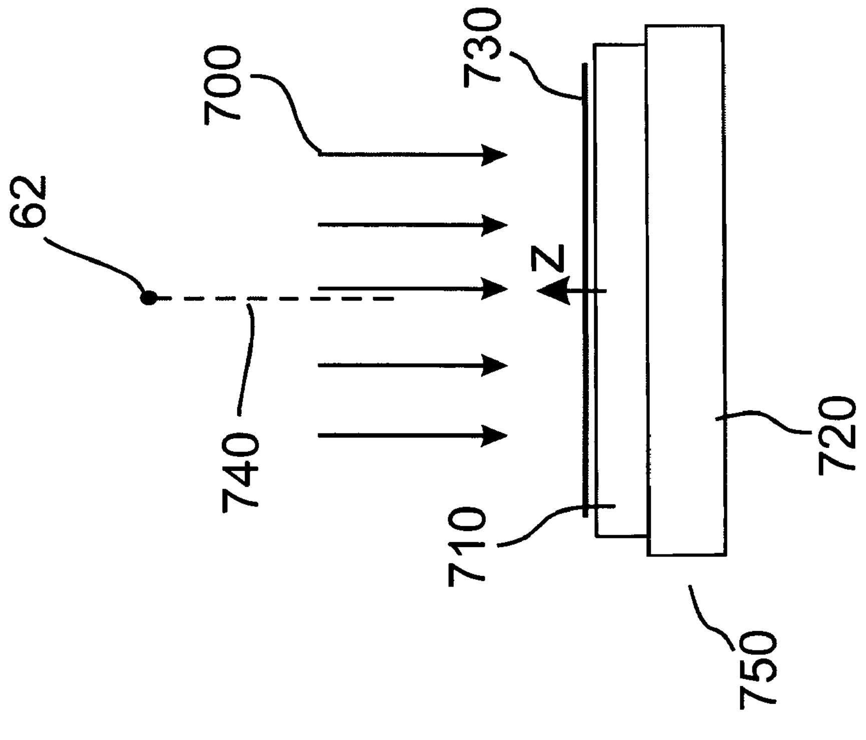
FIGS. 27*a* and 27*b* show an exposure method according to an embodiment of the present invention which uses sheet x-ray beams.

Unfocused grids and collimators, with two sets of parallel walls and at lease one set of parallel walls is perpendicular to the substrate of any design and orientation, can be easily fabricated with one mask using a sheet x-ray beam. Photoresist/substrate is to be oriented at the appropriate angle α as the x-ray beam sweeps across the mask as shown in FIGS. 27*a* and 27*d*.

Figure 27B:
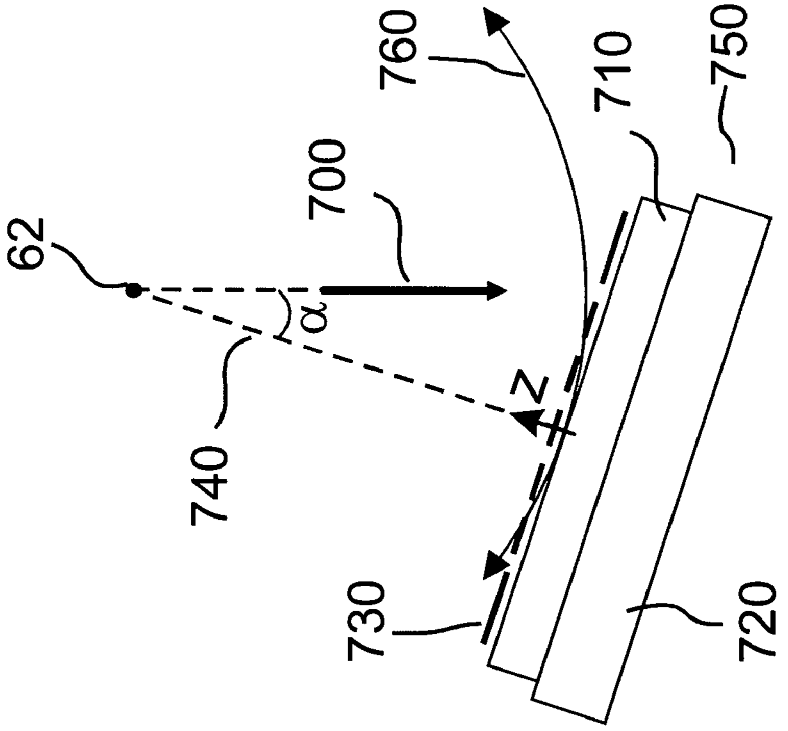
Figure 27D:
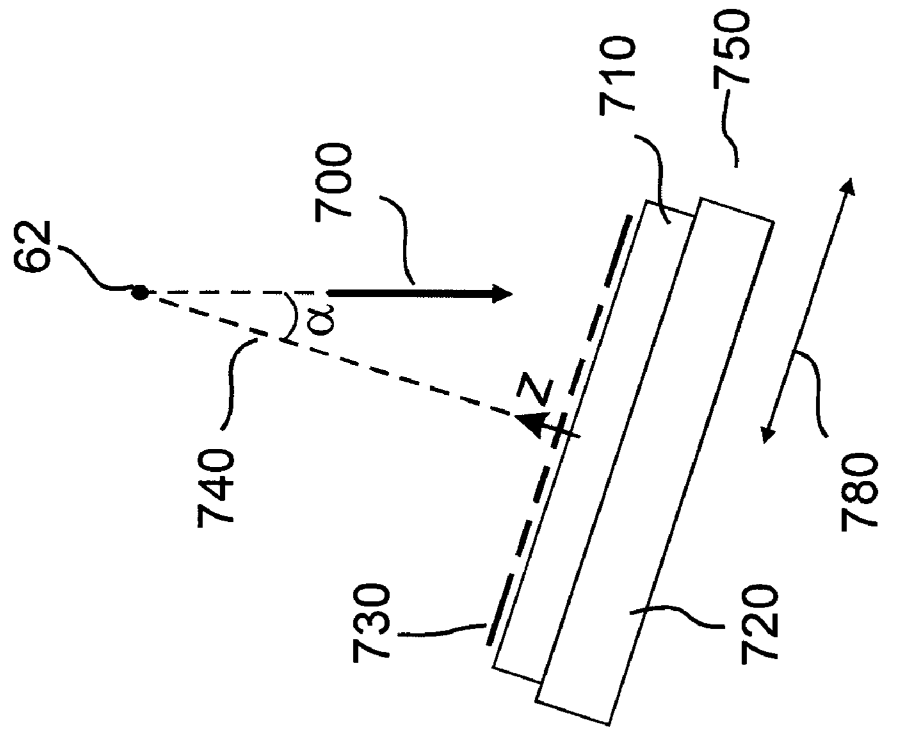
FIG. 27*d* shows another exposure method according to an embodiment of the present invention that uses sheet x-ray beams to form the unfocused grid or collimators.

Unfocused grids and collimators with both sets of parallel walls not perpendicular to the substrate will require double exposure with two masks consisting of lines, exposing as shown in FIG. 27*d* with one mask and repeat the step shown in FIG. 27*d* with the second mask.

When grid size is too large to be made in one piece, sections of grid parts can be made and assembled from a collection of grid pieces.

Focused grids and collimators of any pattern can be fabricated by the method described in U.S. Pat. No. 5,949,850, referenced above. For all grids or collimators that do not have parallel walls, methods for exposing the photoresist using a sheet of parallel x-ray beams and positive photoresist are described below.

E.2. Exposure of Focused Grid Design Type I For Linear Motion or Focused Collimator in a Single Piece If the pattern of the focused grid or collimator in the x-y plane, consisting of quadrilateral shaped openings formed by two intersecting sets of parallel lines, can be made in one piece (not including the border and other assembly parts), the easiest method is to expose the photoresist twice with two masks. The pattern of FIG. 4 is used as an example to assist in the explanation below.

Figure 25:
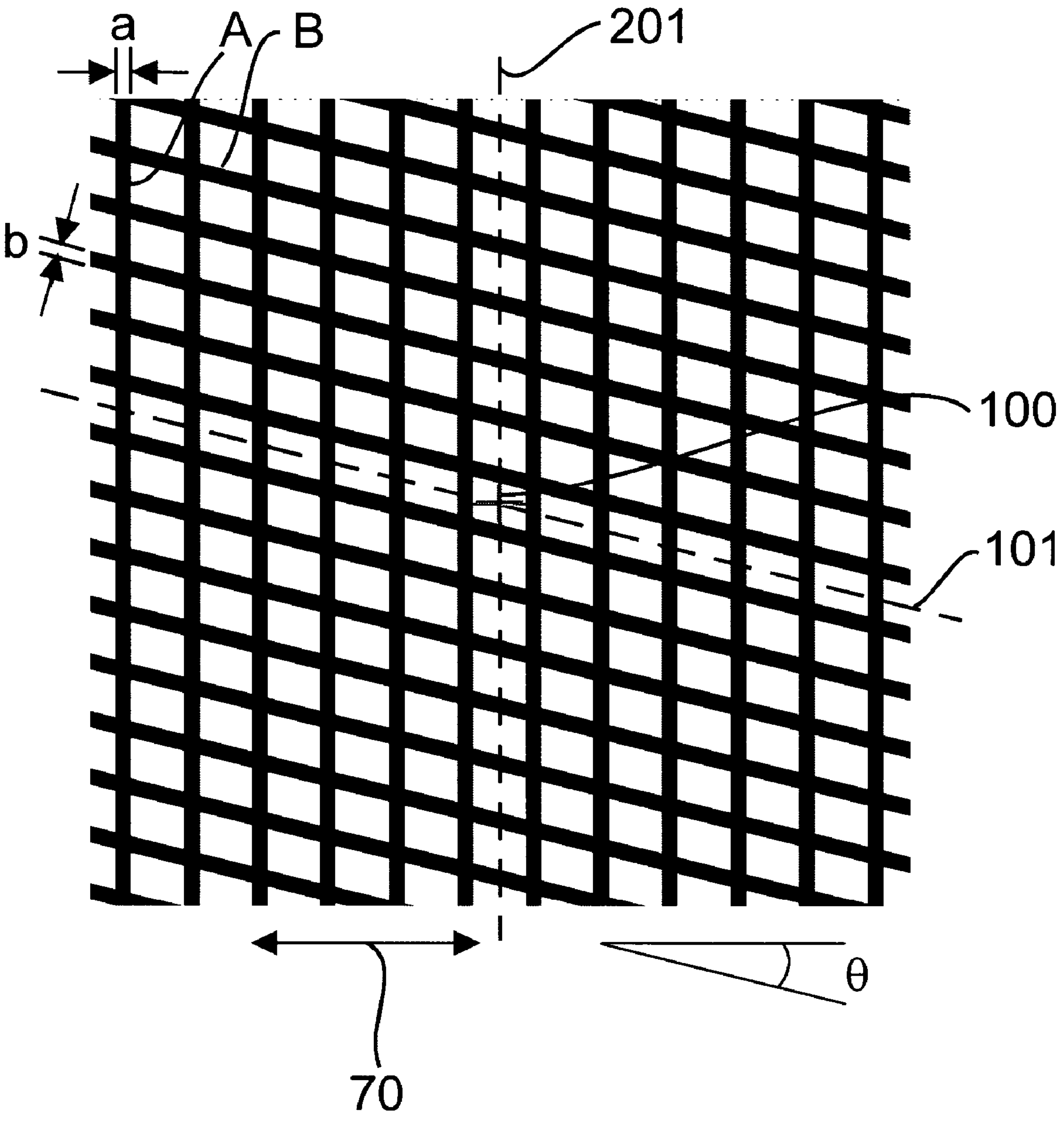
FIG. 25 shows the location of the imaginary central rays (dashed lines) and reference lines for photoresist exposures using the mask shape of FIG. 4.
Figure 26A:
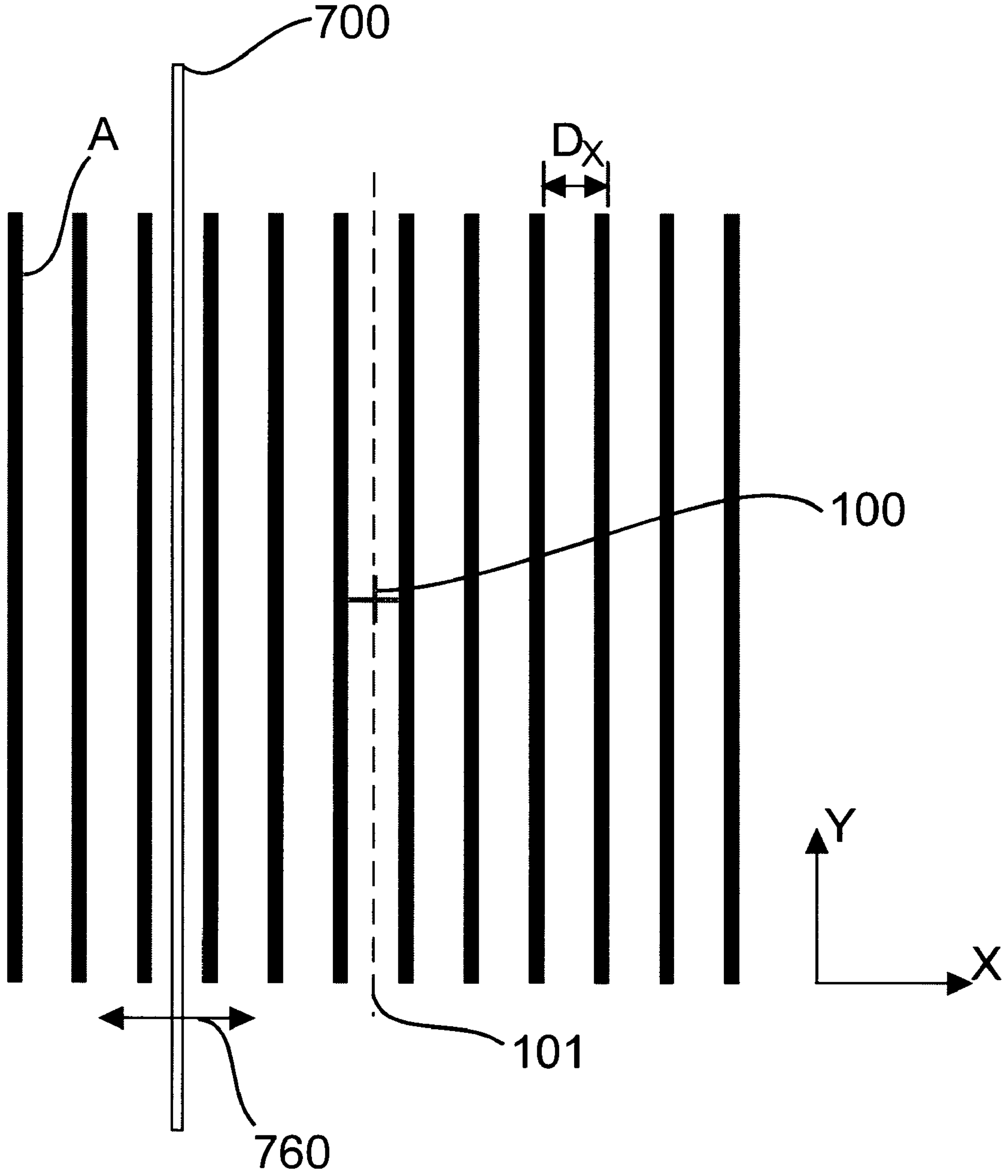
FIGS. 26*a* and 26*b* illustrate exemplary patterns of x-ray masks used to form the pattern shown in FIG. 25 according to an embodiment of the present invention.
Figure 26B:
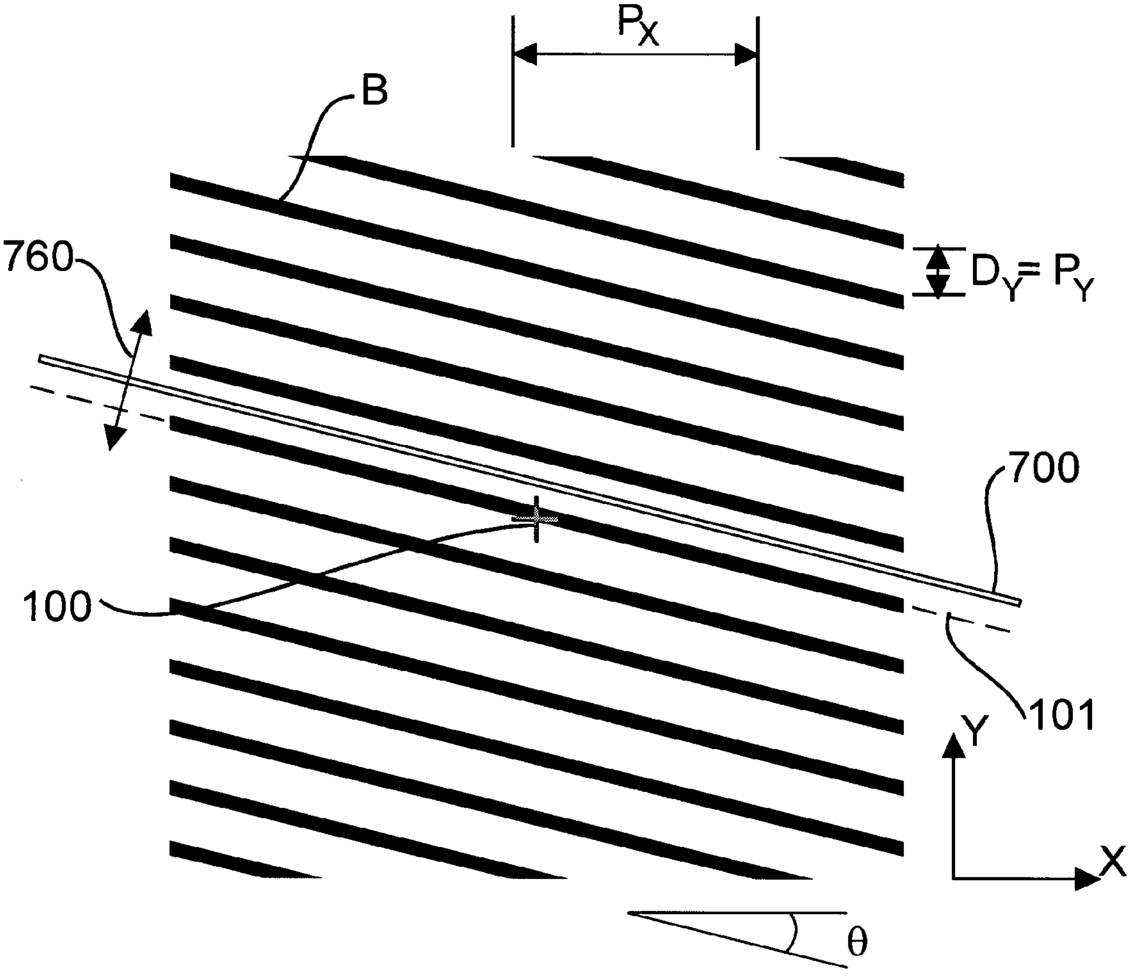

1. For illustration purposes, the case where the central ray is located at the center of the grid or collimator, as shown in FIG. 25, which is marked by a virtual "+" sign 100, will be considered. Two imaginary reference lines 201 and 101 are drawn running through the "+" sign, parallel to grid walls A and B, respectively.
2. The grid or collimator pattern requires double exposure using two separate masks. The desired patterns for the two masks are shown in FIGS. 26*a* and 26*b*.
3. The photoresist exposure procedure by the sheet x-ray beam is shown in FIGS. 27*a* and 27*b*. For the first exposure, an x-ray mask 730, with pattern shown in FIG. 26*a* or 26*b*, is placed on top of the photoresist 710 and properly aligned, as follows. In FIG. 27*a*, the sheet x-ray beam 700 is oriented in the same plane as the paper, and the reference lines 101 in FIG. 26*a* or 26*b* of the x-ray masks 730 are parallel to the sheet x-ray beam 700. In FIG. 27*b*, the sheet x-ray beam 700 is oriented perpendicular to the plane of the paper, as are the reference lines of x-ray mask 730. The x-ray mask 730, photoresist 710, and substrate 720 form an assembly 750. The assembly 750 is positioned in such a way that the line 740 connecting the virtual "+" sign 100 with the virtual point x-ray source 62 is perpendicular to the photoresist 710. The angle α is 0° when the reference line 101 is in the plane of the x-ray source 700. To obtain the focusing effect in the photoresist 710 by the sheet x-ray beam 700, the assembly 750 rotates around the virtual point x-ray source 62 in a circular arc 760. This method will produce focused grids with opening that are focused to a virtual point above the substrate.

Figure 27C:
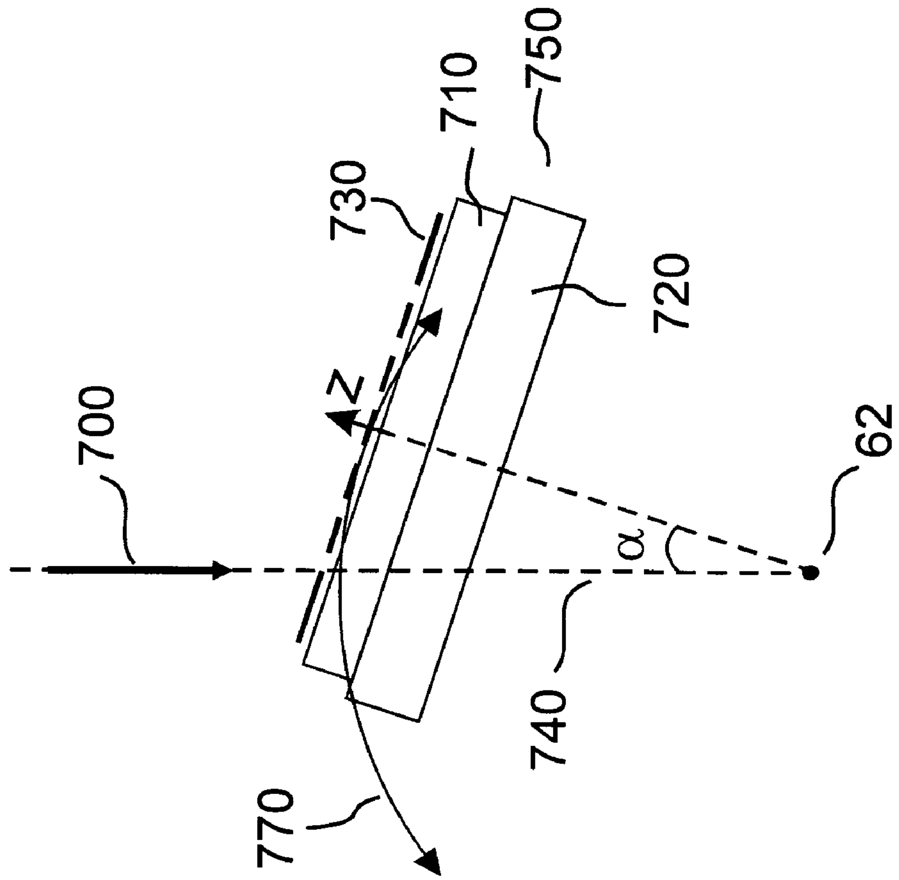
FIG. 27*c* shows another exposure method according to an embodiment of the present invention that uses sheet x-ray beams to form the defocusing effect of the grid or collimator.
Figure 28:
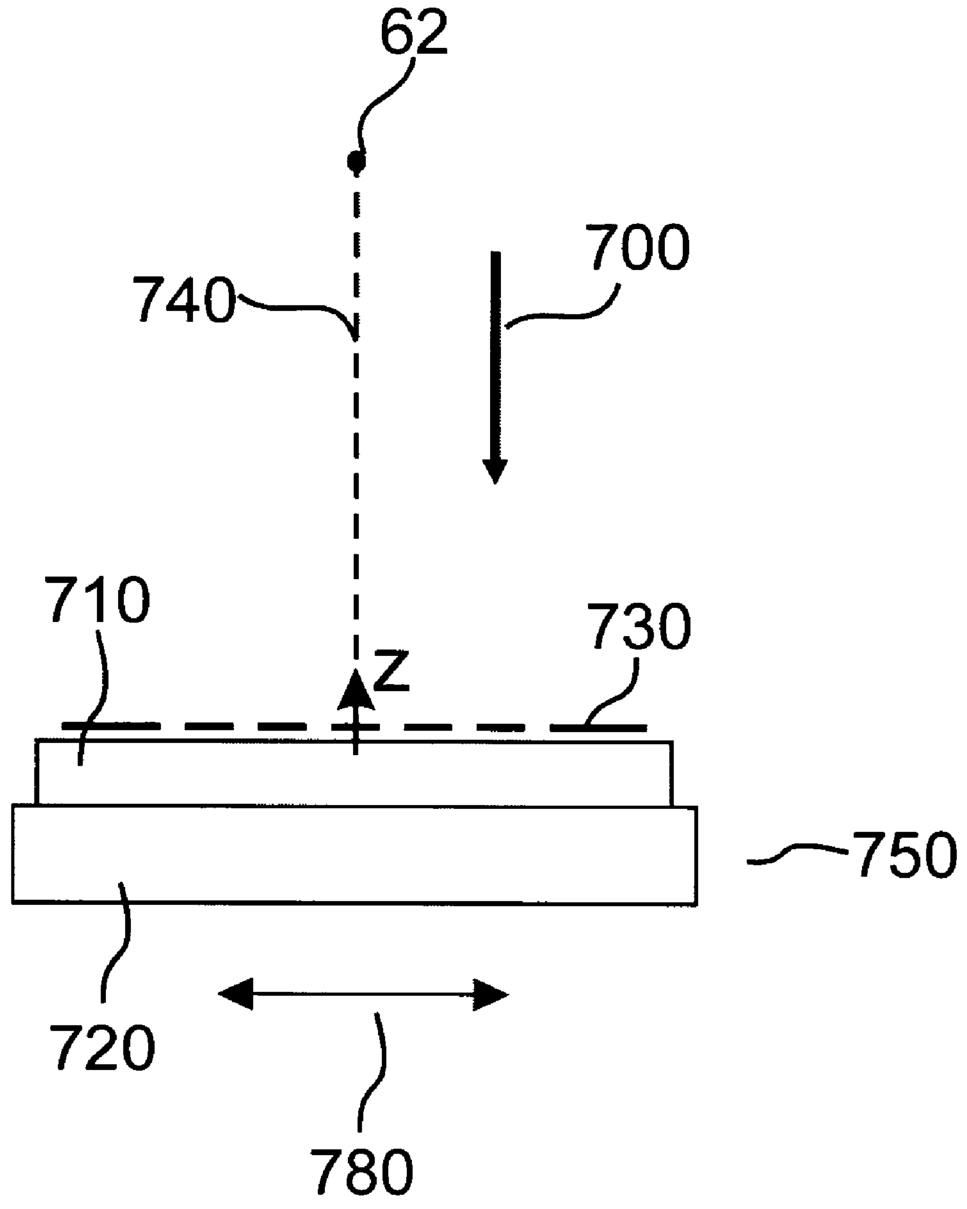
FIG. 28 shows an exposure method according to an embodiment of the present invention that is used in place of the method shown in FIG. 27*b* for fabricating grids or portions of grids where the walls, joints or holes are not focused.

There are situations when one would like to produce a defocused grid or collimator, with walls focused to a virtual point below the substrate as shown in FIG. 27*c*. In FIG. 27*c*, the sheet x-ray beam 700 is oriented perpendicular to the plane of the paper, as are the reference lines of x-ray mask 730. The assembly 750 is positioned in such a way that the line 740 connecting the virtual "+" sign 100 with the virtual point x-ray source 62 is perpendicular to the photoresist 710. The angle α is 0° when the reference line 101 is in the plane of the x-ray source 700. To obtain the defocusing effect in the photoresist 710 by the sheet x-ray beam 700, the assembly 750 rotates around the virtual point x-ray source 62 in a circular arc 770.

4. For the second exposure, the second x-ray mask is properly aligned with the photoresist 710 and the substrate 720. The exposure method is the same as in FIGS. 27*a* and 27*b* or 27*c*.

Figure 30:
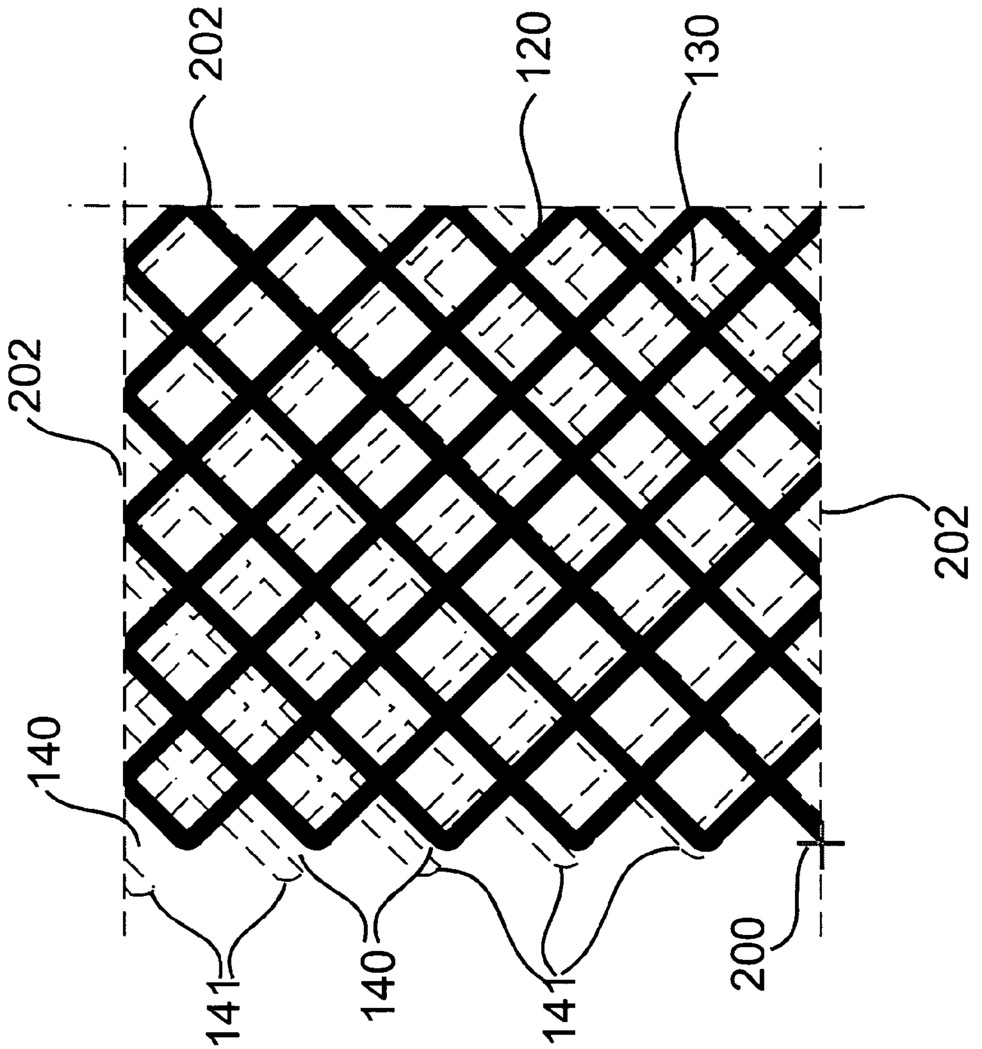
FIG. 30 shows an example of the top and bottom patterns of an incorrectly exposed photoresist that was exposed using only two masks and a sheet x-ray beam.

5. To facilitate assembly and handling of a grid, a border is desirable. The border can be part of FIG. 20*a* or 20*b*; or it can use a third mask. The grid border mask should be aligned with the photoresist 710 and its exposure consists of moving the assembly 750 such that the sheet x-ray beam 700 always remains perpendicular to the photoresist 710, as shown in FIG. 30. The assembly 750 moves along a direction 780.

6. The rest of the fabrication steps are the same as in described in U.S. Pat. No. 5,949,850, referenced above.

E.3. Exposure of Focused Grid Design Type I for Linear Motion or Focused Collimator and Each Layer of the Grid or Collimator is Assembled from Two or More Pieces If two or more pieces of the grid or collimator are required to make a large device, the exposure is more complicated. In this case, at least three masks are required to obtain precise alignment of the pieces.

Figure 29:
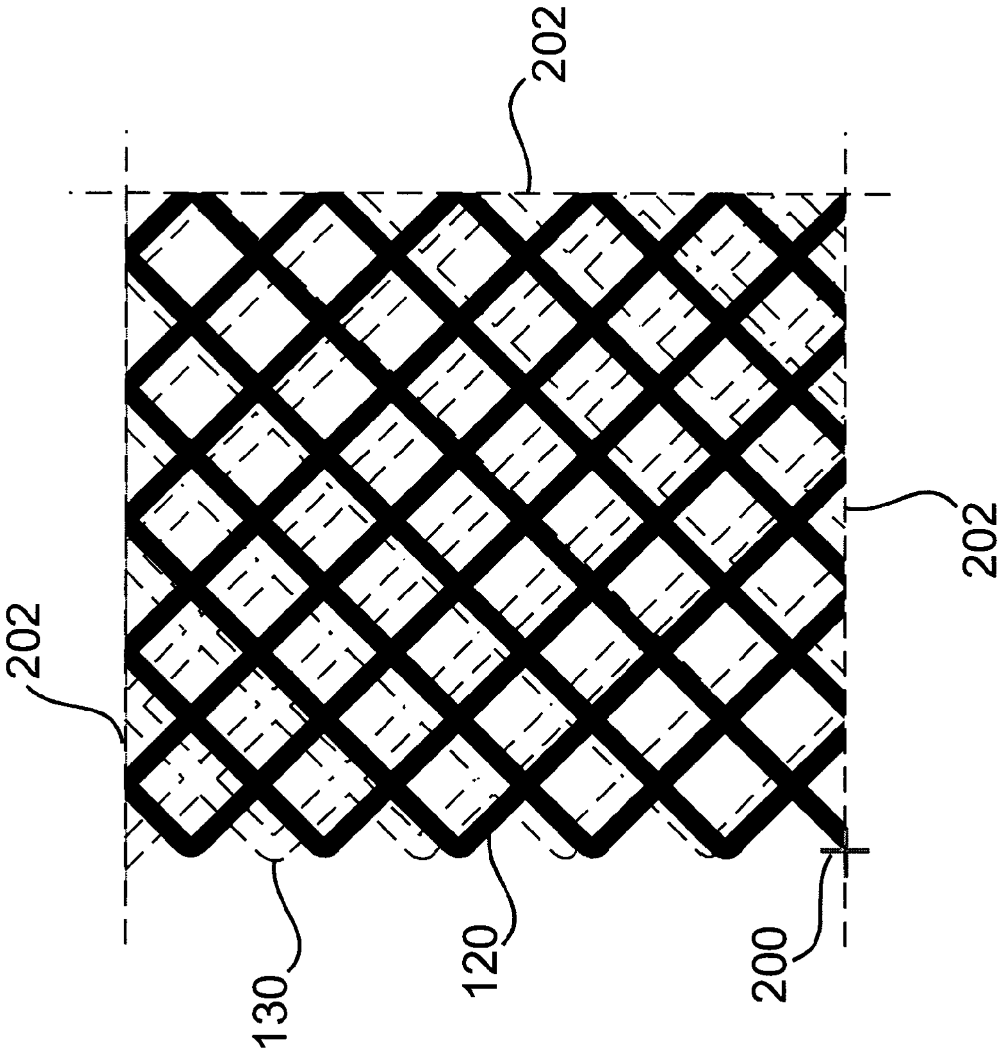
FIG. 29 shows an example of the top and bottom patterns of photoresist exposed according to the methods shown in FIGS. 27*a* and 27*b;*

The desired exposure of the photoresist is shown in FIG. 29, using pattern 115 shown on the right-hand-side of FIG. 19 as an example. The effect of the exposure on the photoresist outside the dashed lines 202 is not shown. The desirable exposure patterns are the black lines 120 for one surface of the photoresist, and are the dotted lines 130 for the other surface. The location of the central x-ray is marked by the virtual "+" sign at 200. The shape of the left border is preserved and all locations of the grid or collimator wall are exposed.

Although the procedures discussed above with regard to FIGS. 29*a* and 29*b* are generally sufficient to obtain the correct exposure near the grid or collimator joint using two masks, one for wall A and one for wall B, incorrect exposure may occur from time to time. This problem is illustrated in FIG. 30. The masks are made so as to obtain correct photoresist exposure at the surface of the photoresist next to the mask. The dotted lines 130 denote the pattern of the exposure on the other surface of the photoresist. Some portions of the photoresist will not be exposed 140, but other portions that are exposed 141 should not be. The effect of the exposure on the photoresist outside the dashed lines 202 is not shown.

Figure 31A:
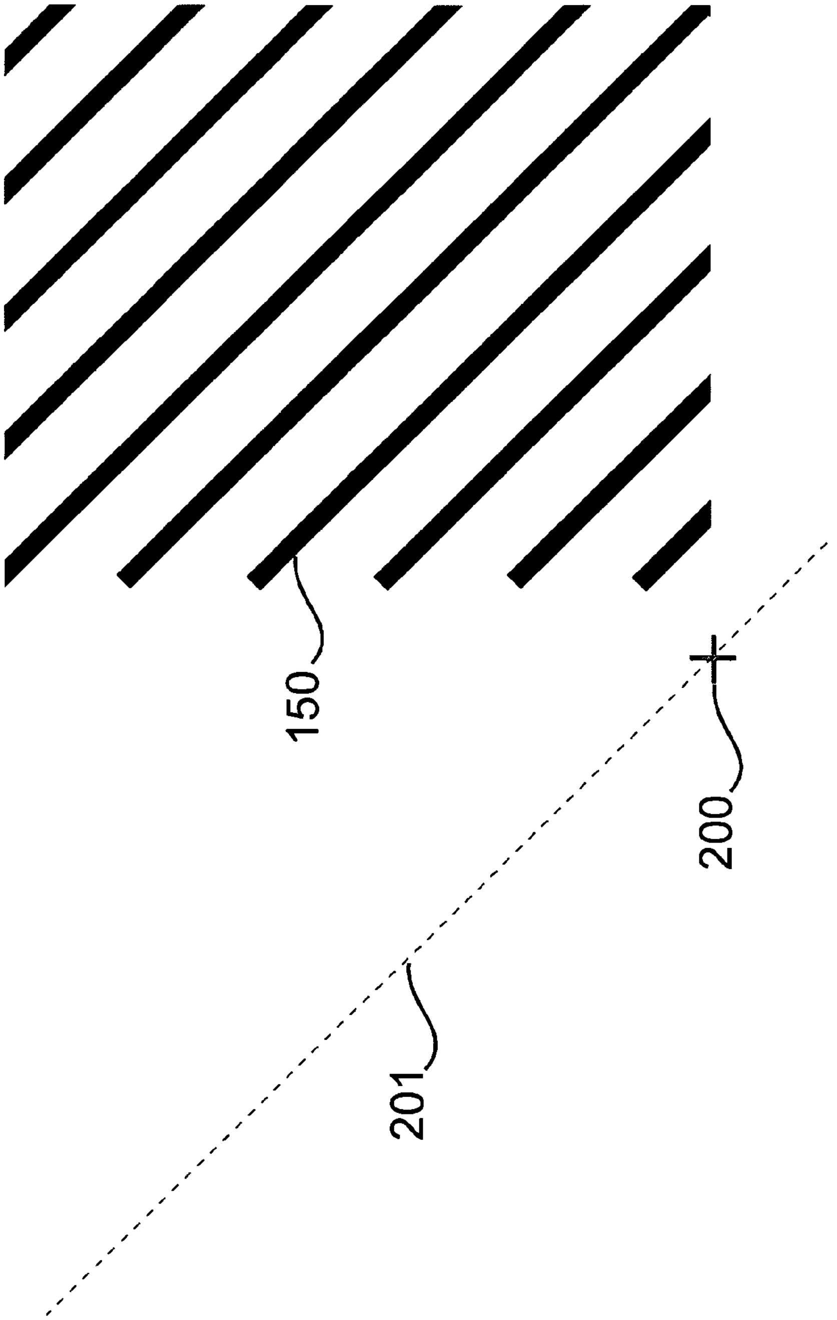
FIGS. 31*a* and 31*b* show an example of x-ray masks used to expose the central portion of right-hand-side of a focused grid or collimator shown in FIG. 19 using a sheet x-ray beam according to an embodiment of the present invention.
Figure 31B:
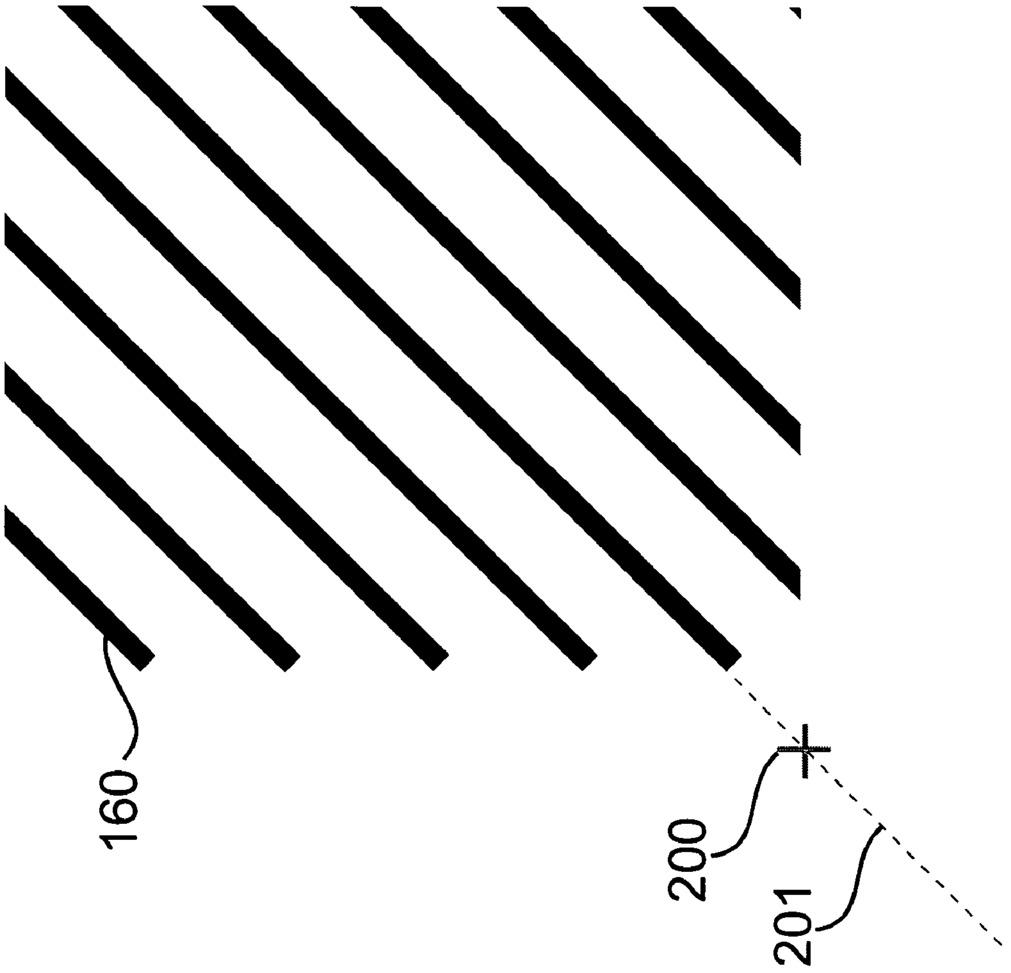
Figure 31C:
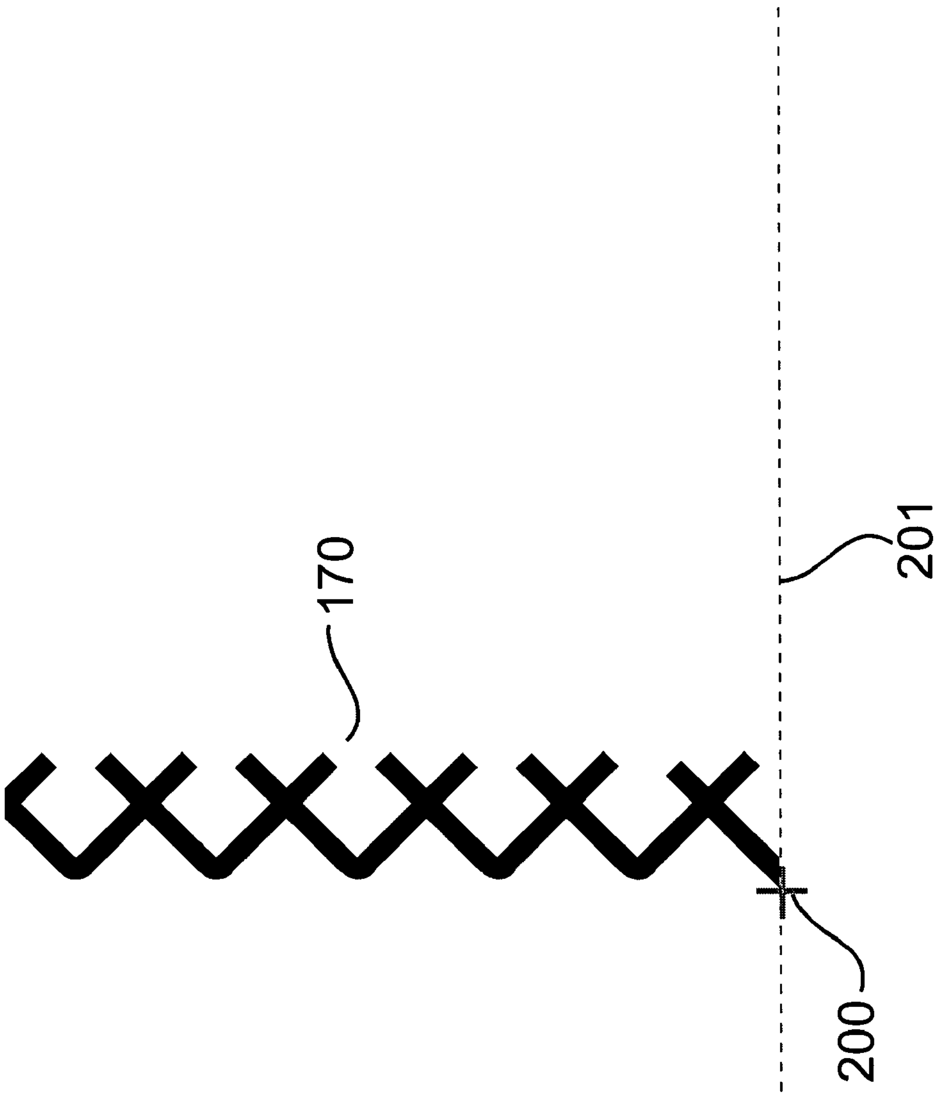
FIG. 31*c* shows an example of an x-ray mask used to expose the grid edge joints of the right-hand-side of a focused grid for a point source shown in FIG. 19 using a sheet x-ray beam according to an embodiment of the present invention.

At least three x-ray masks are required to alleviate this problem and obtain the correct exposure. Each edge joint boundary requires a separate mask. These are shown in FIGS. 31*a*-31*c*. FIG. 31*a* shows a portion of the grid lines B as lines 150, which do not extend all the way to the grid or collimator joint boundary on the left. FIG. 31*b* shows a portion of the grid lines A as items 160, which do not extend all the way to the grid joint boundary on the left. FIG. 31*c* shows the mask for the grid joint boundary on the left. The virtual "+" 200 shows the location of the central ray 63 in FIGS. 31*a*-31*c*. The distances from the joint border to be covered by each mask depend on the grid dimensions, the intended grid height, and the angle.

The exposures of the photoresist 710 by all three masks shown in FIGS. 31*a*-31*c* follow the method described above with regard to FIGS. 29*a* and 29*b* or FIGS. 29*a* and 29*c*. The three masks have to be exposed sequentially after aligning each mask with the photoresist.

Figure 32:
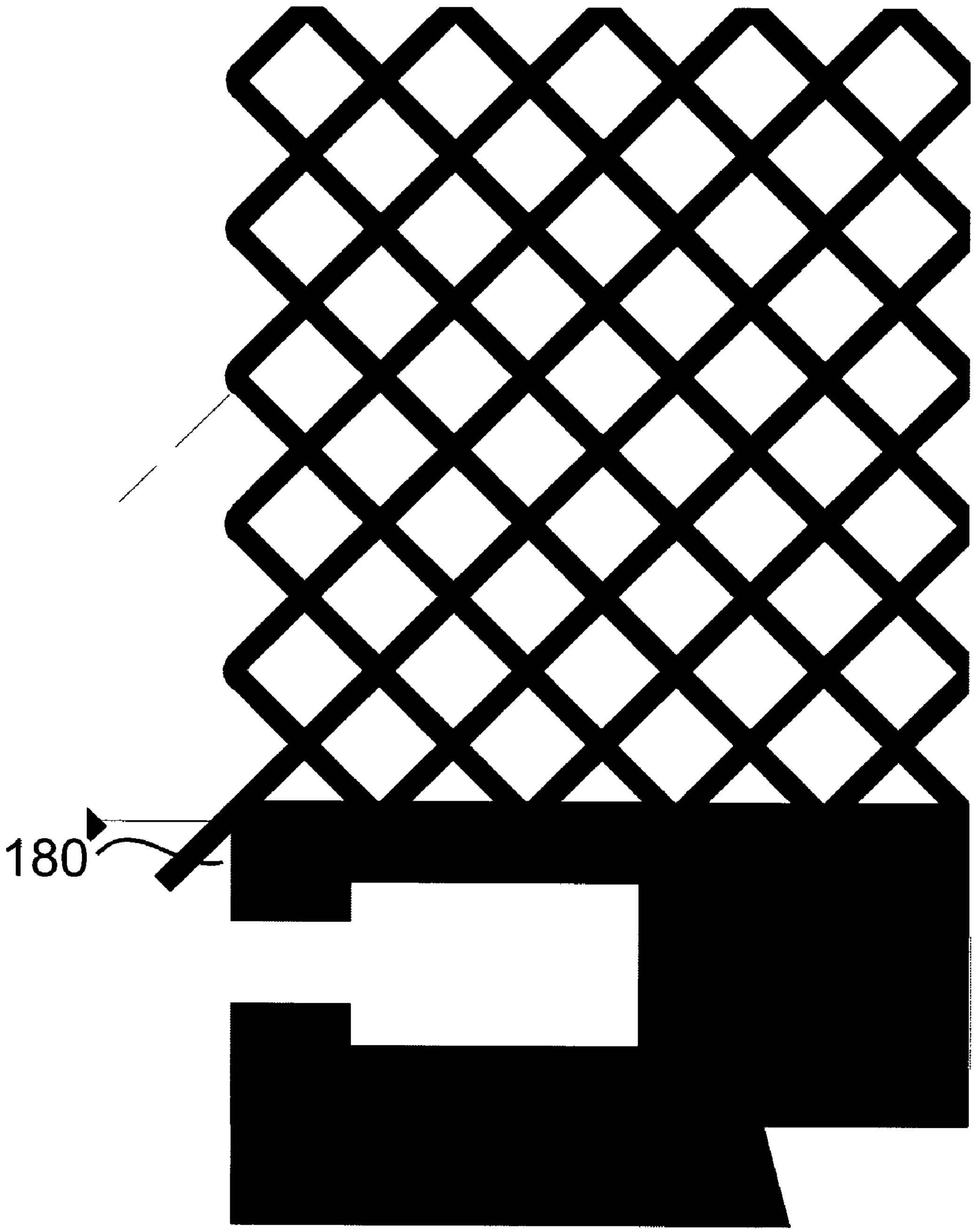
FIG. 32 shows a portion of the grid including the left joining edge and a wide border.
Figure 33:
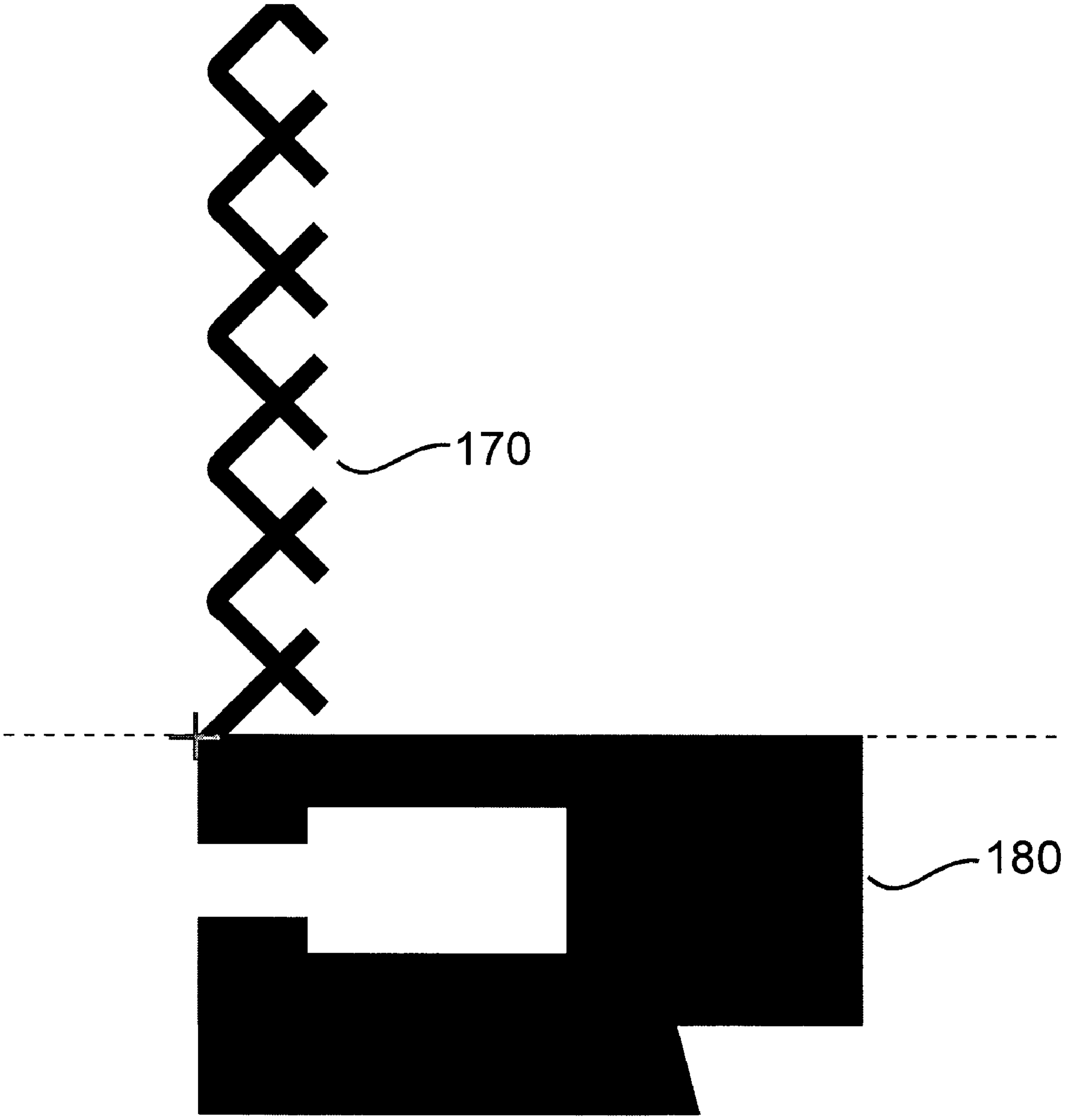
FIG. 33 shows an example of an x-ray mask used to expose the grid edge joint and the border of FIG. 32, which is in addition to the masks already shown in FIGS. 31*a* and 31*b*, according to an embodiment of the present invention.

If this pattern is next to the border of the grid or collimator as shown in FIG. 32, then the grid boundary 180 can be part of the mask of the grid joint boundary on the left, as shown in FIG. 33. At a minimum, the grid border 180 consists of a wide grid border for structural support, may also include patterned outside edge for packaging, interlocks and peg holes for assembly and stacking. The procedure would be to expose the photoresist 710 by masks shown in FIGS. 31*a* and 31*b* following the method described in FIGS. 29*a* and 29*b* or FIGS. 29*a* and 29*c*. The exposure of the joint boundary section 170 in FIG. 33 follows the method described in FIGS. 29*a* and 29*b* or FIGS. 29*a* and 29*c* while the exposure of the grid border section 180 in FIG. 33 follows the method described in FIG. 30.

The location of the joint of the two pieces can have many variation other than that is shown in FIG. 19. The masks, boarders and exposure methods have to be adjusted accordingly, but the concept remains the same.

E.4. Exposure of Focused Grid Design Type II for Linear Motion

Figure 34A:
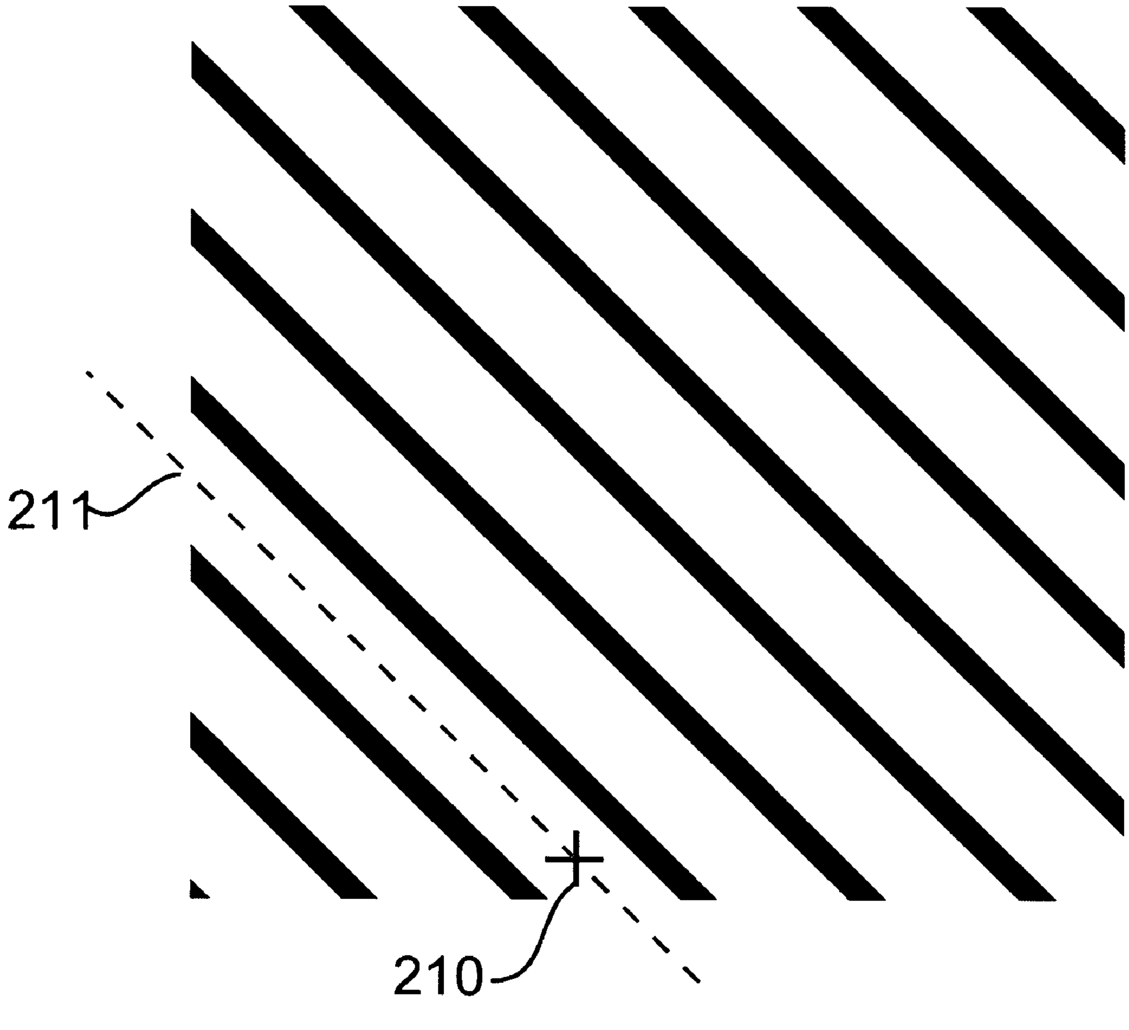
FIGS. 34*a* and 34*b* show an example of an x-ray masks used to expose the photoresist for the focused grids for a point source shown in FIG. 7, 8, 10 or 17 using a sheet x-ray beam according to an embodiment of the present invention.
Figure 34B:
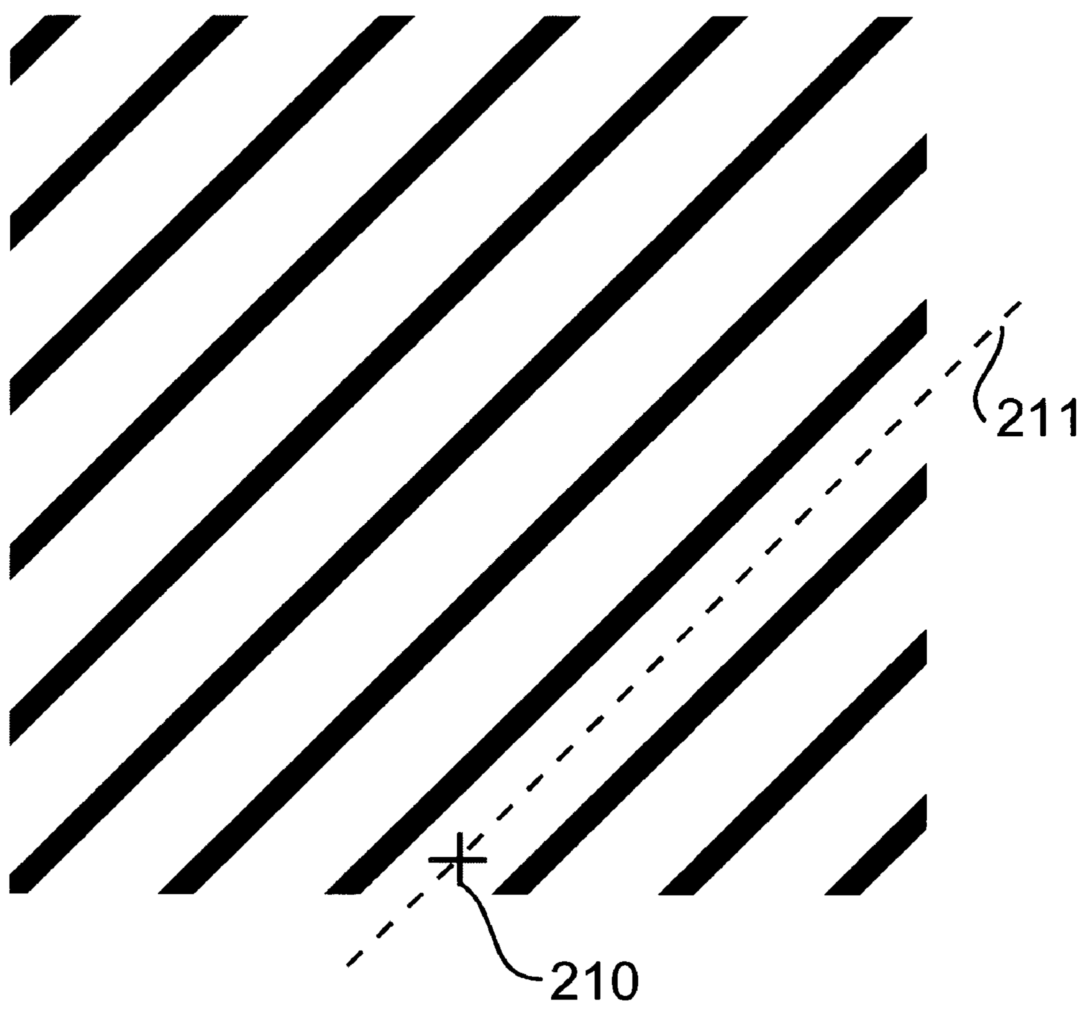
Figure 34C:
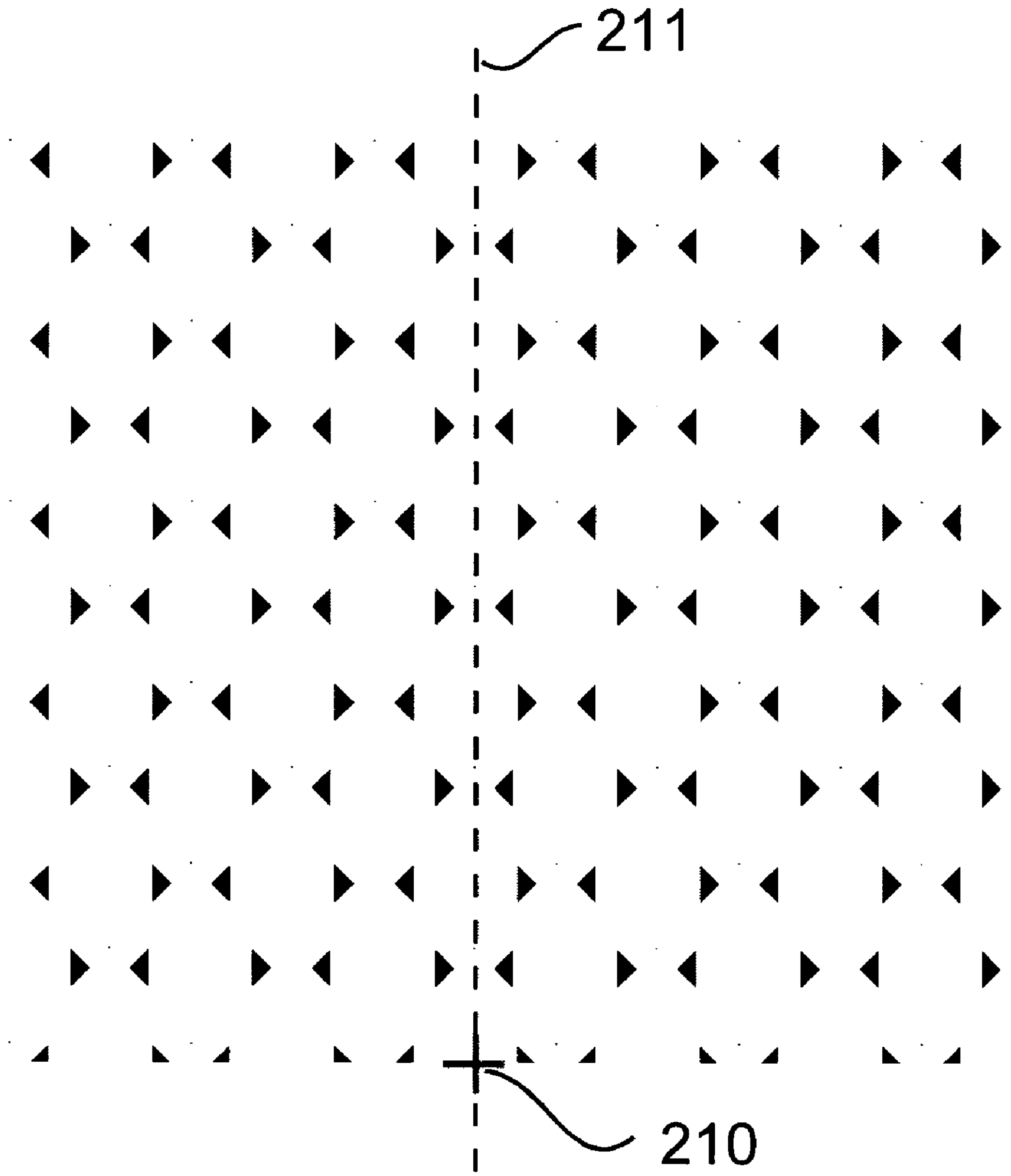
FIG. 34*c* shows an example of an x-ray mask required to expose the additional grid structure for linear motion according to an embodiment of the present invention.

The exposure of the photoresist for a "tall" type II grid pattern design for linear grid motion, such as those grid patterns illustrated in FIGS. 8, 10, 17, and so on, can be implemented based on the methods described in U.S. Pat. No. 5,949,850, referenced above. The grid is considered "tall" when $$H \sin(\Phi_{max}) >> s,$$

where H is the height of a single layer of the grid, $\Phi_{max}$ is the maximum angle for a grid as shown in FIGS. 2 and 3, and s is related to the thickness of the grid wall as shown in FIGS. 7, 8, 10 and 17. "High" grids are not easy to expose using long sheet x-ray beams when the same grid pattern is implement from top to bottom on the grid. As described in an earlier section, the grid shape shown in FIGS. 8, 10, 17, and so on, need only be just high enough to block the primary radiation without causing undesirable exposure. Using the grid pattern shown in FIG. 10 as an example, three x-ray masks, FIGS. 34*a*, 34*b* and 34*c* can be used for the exposure. Additional x-ray masks might be required for edge joints and borders. The exposure of the photoresist for the joints and borders would be the same as for that describing FIG. 33. The virtual "+" 210 shows the location of the central ray 63 in FIGS. 34*a*, 34*b* and 34*c*. The dashed lines 211 denote the reference line used in the exposure of the photoresist by sheet x-ray beam as described in FIGS. 29*a* and 29*b* or FIGS. 29*a* and 29*c*. The three masks have to be exposed sequentially after aligning each mask with the photoresist.

Figure 35A:
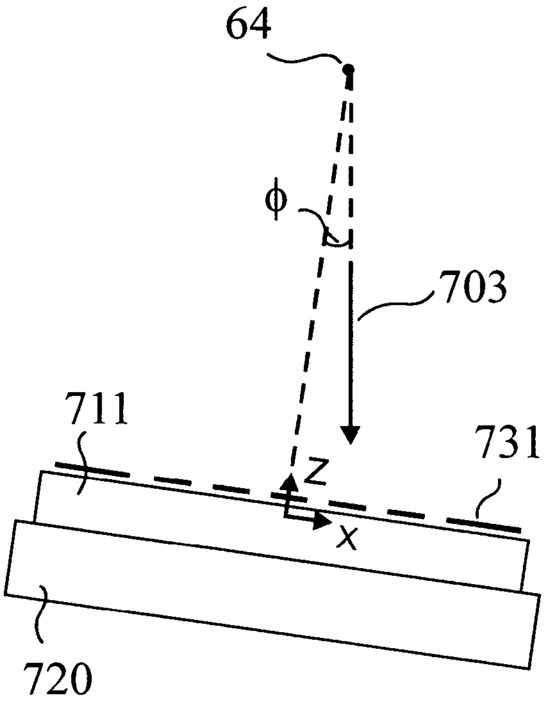
FIG. 35 shows a fabrication method according to the present invention which uses a small, parallel ultraviolet light or laser source to produce a grid that is focused in the (a) x-z plane and (b) y-z plane, respectively.
Figure 35B:
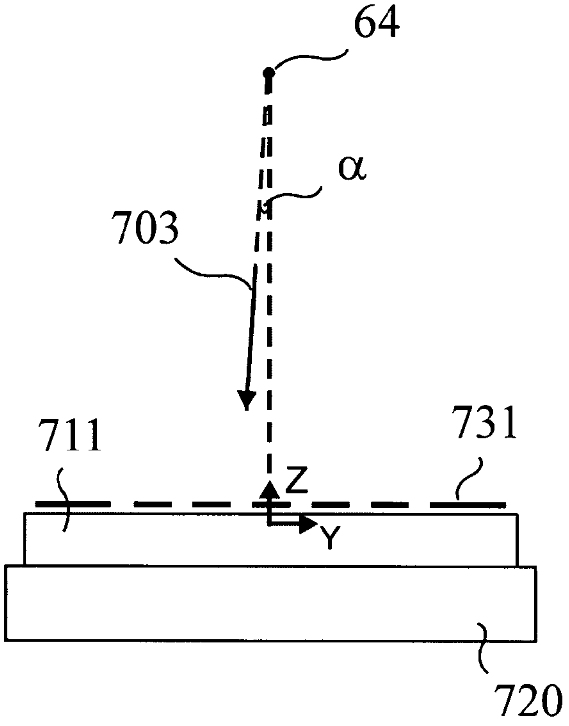

E.5. Exposure of the Focused or Unfocused Grids and Collimators using a Point Source The method to expose photoresist to obtain a focused or unfocused grid or collimator can be achieved using point, parallel UV or x-ray source. To obtain the correct exposure at each location on the photoresist, the photoresist/substrate has to be properly oriented with respect to the source by moving the photoresist/substrate. A description to obtain focused grid or collimator using point, parallel UV or x-ray source 703 is shown in FIGS. 35*a* and 35*b*. An optical mask can be used for UV exposure. An x-ray mask is needed for x-ray exposure. The layout of the mask can be the pattern needed for the grid or collimator, and the assembly of mask 731 and the photoresist/substrate has to be moved appropriately during the exposure. For unfocused grids and collimators, the orientation of the UV or x-ray source respect to the photoresist/substrate remains the same as the source sweeps across its surface. For focused grids and collimators, the assembly of mask and photoresist/substrate are moved in an arc to simulate the cone shape of the source located at a fixed imaginary point 64.

E.6. Exposure of the Focused Grids and Collimators using a Cone Beam Source

Figure 36:
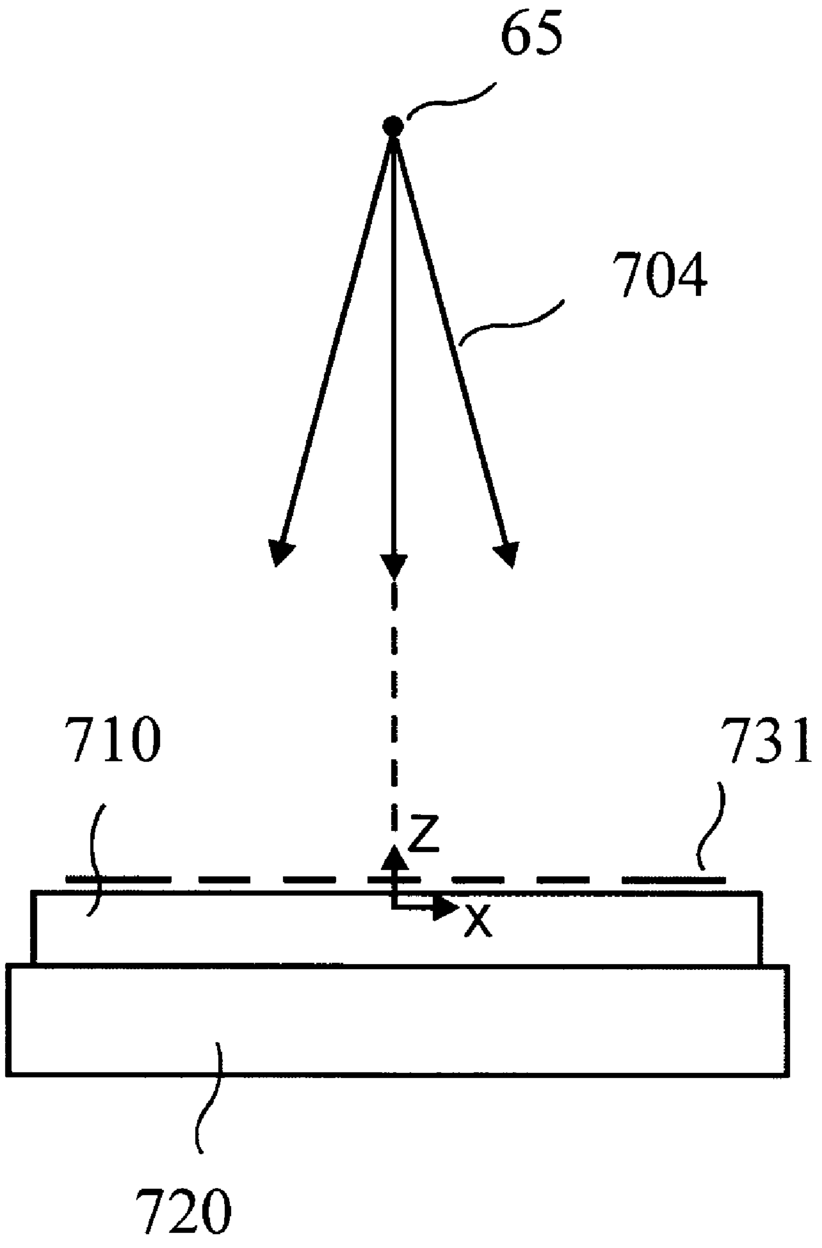
FIG. 36 shows an example of a fabrication method according to the present invention which uses a focused cone beam from an ultraviolet radiation source to produce a focused grid or collimator.

The UV photoresist exposure method to obtain a focused grid or collimator with a cone beam UV source or a point parallel UV source that sweeps across the optical/resist simulating a cone beam is shown in FIG. 36. The assembly of the mask and the photoresist/substrate do not need to be moved during the exposure.

F. Fabrication of the Molds on Graphite

F.1. Other Methods of Fabrication of Mold on Graphite for Electroplating/Electroforming for General Applications, as well as for Grids and Collimators For some grid and collimator applications the mold structure shown in FIG. 24*c* can be achieved by means other than lithography. The trenches, shown in FIG. 24*c* can sometimes be produced by mechanical machining, laser ablation, reactive ion etching, or other means. All the fabrication steps are the same as FIGS. 24*a*-24*f*, except step 24*b*. The mold material can be a photoresist or any other material that can be attached to the graphite.

When the trenches are cut all the way through to the graphite looking like FIG. 24*c*, then the grid, collimator, or any other device can be fabricated by electroplating/electroforming following the same procedures as FIGS. 24*d*-24*f*. This is made possible by the conducting property of graphite substrate.

F.2. Fabrication of Molds on Graphite for Casting

With the appropriate choice of the mold material on graphite substrate and any appropriate methods to fabricate the trenches, the mold can be used to cast structures for general applications as well as for grids and collimators. This would be possible for low melting temperature metals such as lead. The graphite substrate can be removed abrasively to release the grid or collimator.

For positive photoresist PMMA, the grid or collimator material can be powder composite held together by glue. The step shown in FIG. 23*e* to fill the developed mold 720 with powder composites will need to be forced in by vacuum gravity, pressure or centrifuge. There will be excess grid materials left above the polymer material 710. All other fabrication steps are the same. Powder composites can be one or mixture of powders, ceramic, highly reflective powder materials. An example of powders is tungsten powder.

PMMA's glass transition temperature is around 108° C., thus the low melts has to have lower melting temperature. There is limited number of choices of low melt metals for using PMMA. Some examples are LOW 117 (47° C.) (Bismuth 44.7%, Lead 22.6%, Tin 8.3%, Cadmium 5.3% Indium 19.1%), 8.57 g/cc;

LOW 136 (58° C.) (Bismuth 49%, Lead 16%, Tin 12%, Indium 21%), 8.71 g/cc

LOW 158 (70° C.) (Bismuth 50%, Lead 26.7%, Tin 13.3%, Cadmium 10%), 9.08 g/cc SU-8's glass transition temperature is above 250° C. Thus, SU-8 allows more low melt choices for casting.

For negative photoresist SU-8, the step shown in FIG. 24*d* to fill the developed mold with low melt by vacuum and gravity, pressure or centrifuge. All other fabrication steps are the same. Low melts can be a mixture of metals. Some examples of low melts are lead, bismuth and tin. Low melts metals can also be mixed with metal powders.

SU-8 is not suitable for use for air-core grids or collimators using powder composite with glue binders because the removal of SU-8 will disintegrate the grid into powder.

The cast grids and collimators can have parallel septa or focused septa depending on the application.

Figure 37:
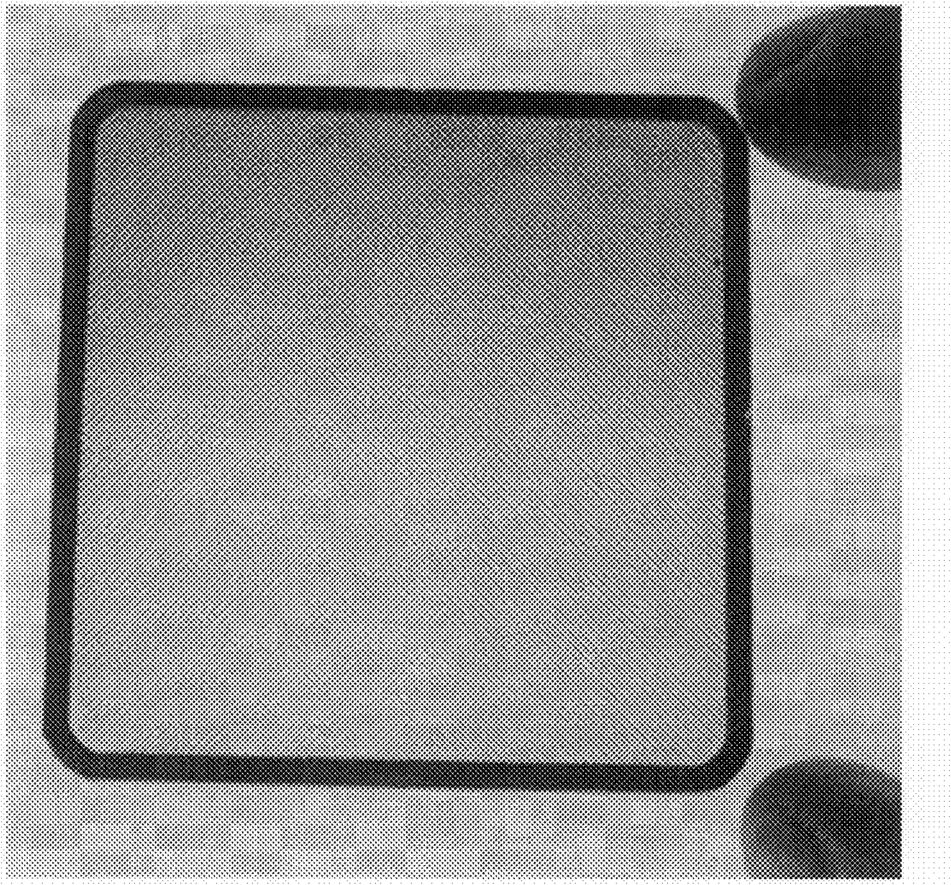
FIG. 37 illustrates is an scanning electron microgram of a freestanding copper grid with 25 μm lamellae and 550 μm period, with an area of 60×60 $mm^2$ including a 2.5 mm boarder and height of 1 mm polished on both sides.
Figure 38A:
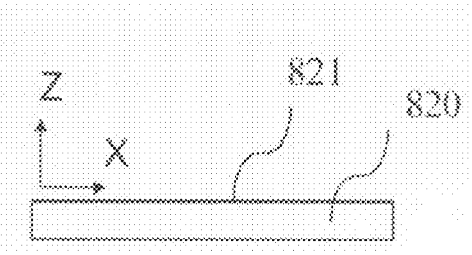
FIGS. 38*a*-38*h* show an example of a method for fabricating a grid or collimator using a polymer without a graphite substrate in accordance with an embodiment of the present invention demonstrated using energetic neutral atom beam lithography.
Figure 38B:
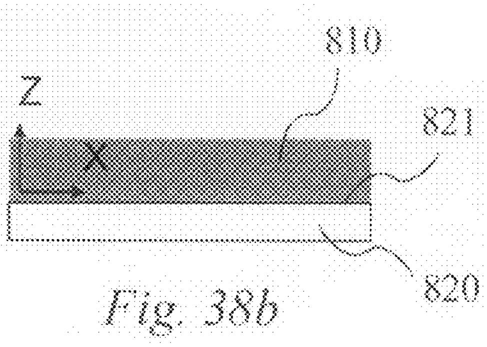
Figure 38C:
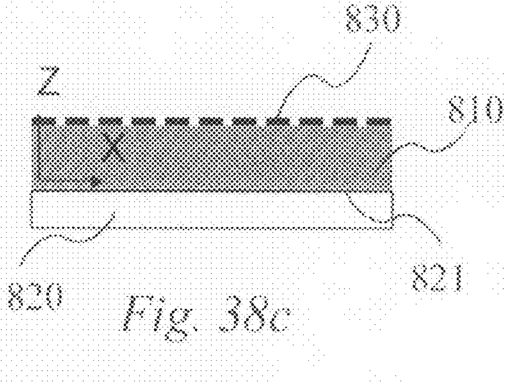
Figure 38D:
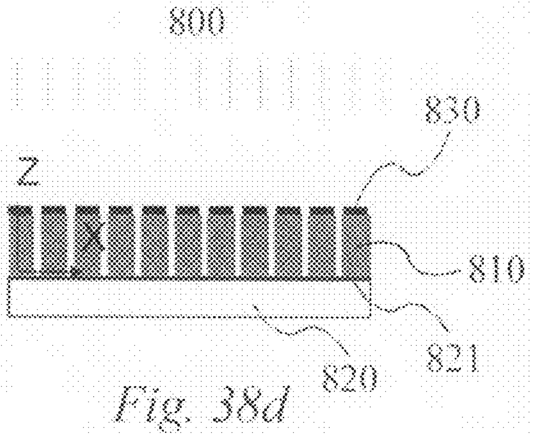
Figure 38E:
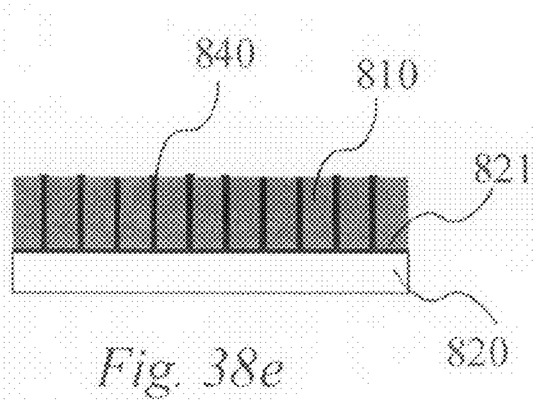
Figure 38F:
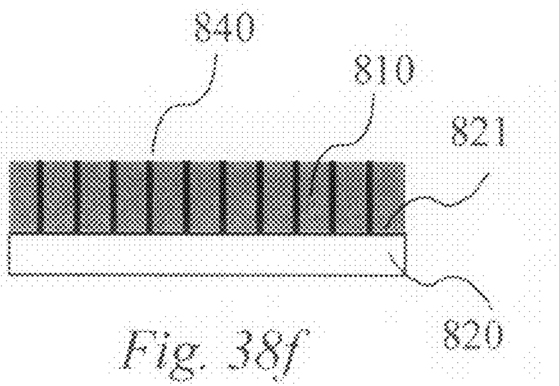
Figure 38G:
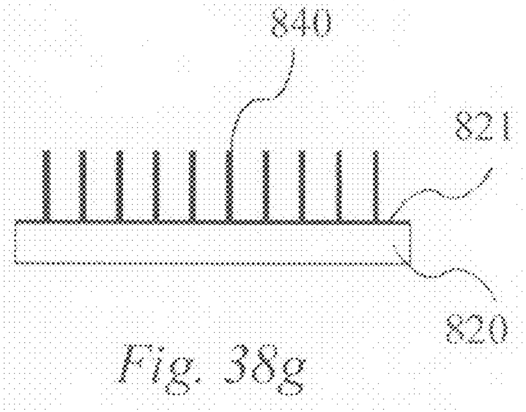
Figure 38H:
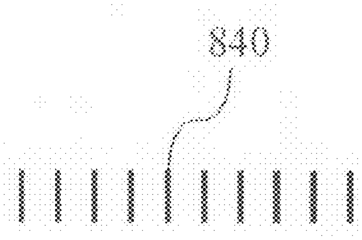
Figure 39A:
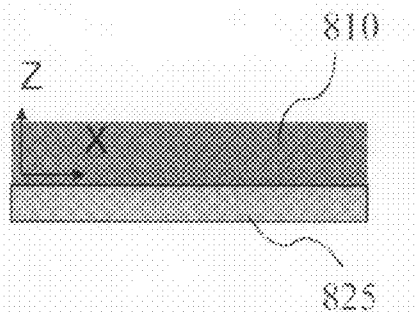
FIGS. 39*a*-39*f* show an example of a method for fabricating a grid or collimator using a polymer on graphite substrate in accordance with an embodiment of the present invention demonstrated using energetic neutral atom beam lithography.
Figure 39B:
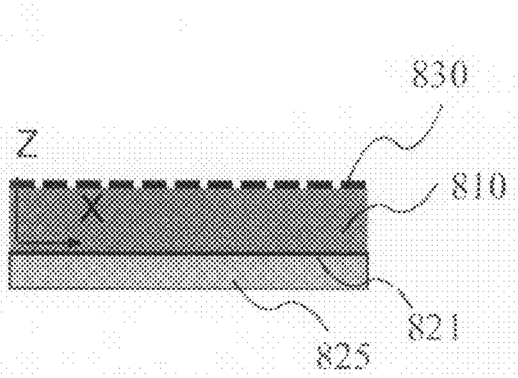
Figure 39C:
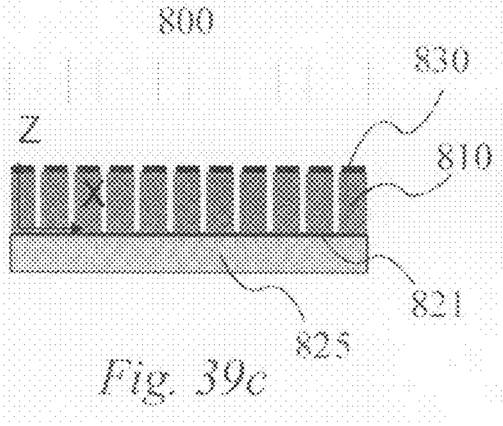
Figure 39D:
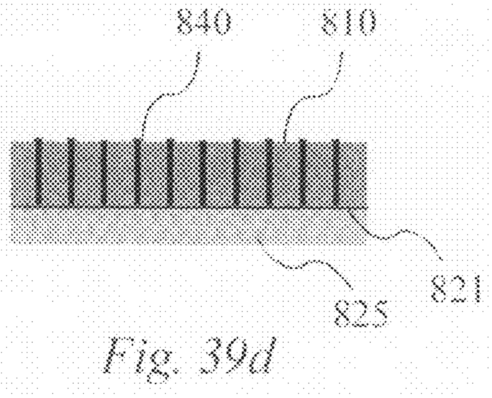
Figure 39E:
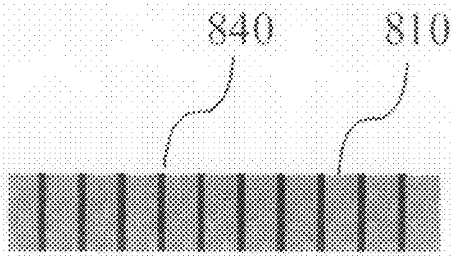
Figure 39F:
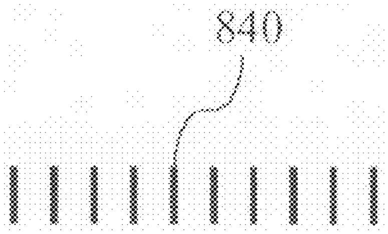

G. Example of Micro Fabricated Copper Grid using Deep X-Ray Lithography and Electroplating/electroforming A freestanding copper grid appropriate for mammography x-ray energies with parallel wall was made using deep x-ray lithography and copper electroplating/electroforming on graphite substrate. The exposure is performed using x-rays from the bending magnet beamline 2BM at the Advanced Photon Source of Argonne National Laboratory. A scanning electron microgram (SEM) of the copper grid is shown in FIG. 37. The parameters of the grid are: 25 μm lamellae, 550 μm period, 1 mm high and 60×60 $mm^2$ area including a 2.5 mm boarder. The results are described in the paper: O. V. Makarova, C.-M. Tang, D. C. Mancini, N. Moldovan, R. Divan, D. G. Ryding, and R. H. Lee, "Micorfabrication of Freestanding Metal Structures Released from Graphite Substrates," Technical Digest of The Fifteenth IEEE International Conference on Micro Electro Mechanical Systems, Las Vegas, Nev., USA, Jan. 20-24, 2002, IEEE Catalog Number 02CH37266, ISBN: 0-7803-7185-2, pp. 400-402, and the entire contents is incorporated herein by reference.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of manufacturing at least a portion of a grid or collimator, having at least one layer comprising a plurality of walls defining openings therein, and being adaptable for use with an electromagnetic energy emitting device, the method comprising:

placing a mold material onto a substrate base;

creating openings in the mold material; and placing a septa wall material by casting in the openings in the mold material for forming septal walls of the grid or collimator.

2. The method as claimed in claim 1, wherein the mold material comprises a positive photoresist material and the placing of the septa wall material comprises casting of powder composites and low melts.

3. The method as claimed in claim 1, wherein said mold material comprises a negative photoresist material and the placing of the septa wall material comprises casting of low melts.

4. The method as claimed in claim 1, further comprising removing the substrate base.

5. The method as claimed in claim 1, wherein the substrate base comprises graphite.

6. The method as claimed in claim 1, further comprising removing the mold material from the grid or collimator.

7. The method as claimed in claim 1, where the mold material comprises a photoresist material and the creating of the openings comprises creating a pattern comprising the openings by ultra-violet or x-ray lithography.

8. The method as claimed in claim 1, further comprising:
forming a plurality of layers of the walls by performing the steps of claim 1; and
stacking the layers to form the grid or collimator.

9. The method as claimed in claim 1, further comprising:
forming a plurality of pieces of the walls by performing the steps of claim 1; and
assembling the pieces to form the grid or collimator.

10. The method as claimed in claim 1, further comprising repeating the creating of the openings in said mold material and the placing of the septa wall material in said openings.

11. The method as claimed in claim 1, wherein the creating of the openings in the mold material comprises at least one of:
creating the openings whereby orientation of at least some of the walls is focused to a line; and
creating the openings whereby a focal distance of parts of the walls is different than the focal distance at other parts of the walls.

12. The method as claimed in claim 1, wherein the placing of the septa wall material comprises forcing the septa wall material into the openings in the mold material by at least one of vacuum, gravity, pressure and centrifuge.

13. The method as claimed in claim 1, further comprising removing excess of the septa wall material.

14. A method of manufacturing at least a portion of a grid or collimator, having at least one layer comprising a plurality of walls defining openings therein, and being adaptable for use with an electromagnetic energy emitting device, the method comprising:
attaching a polymer mold material onto a substrate base;
creating openings in the mold material by ablating at least a portions of the mold material by energetic neutral atom lithography; and
placing a septa wall material in the openings in the mold material for forming septal walls of the grid or collimator.

15. The method as claimed in claim 14, wherein the creating of the openings in the mold material comprises forming a grid mask material on the polymer mold material prior to the ablating.

16. The method as claimed in claim 14, wherein the substrate base comprises a silicon material and the attaching comprises gluing the polymer mold material to the substrate base.

17. The method as claimed in claim 14, wherein the substrate base comprises a graphite material and the attaching comprises:
attaching the polymer mold material to the substrate base; or
coating the substrate base with a metal layer and attaching the polymer mold material to the metal layer.

18. The method as claimed in claim 14, wherein the placing of the wall material comprises electroforming the wall material on areas of the substrate base exposed by the openings.

19. The method as claimed in claim 14, wherein the placing of the wall material comprises electroplating the wall material on areas of the substrate base exposed by the openings.

20. The method as claimed in claim 14, wherein the placing of the wall material comprises casting of at least one of powder composites and low melts in the openings.

21. The method as claimed in claim 20, wherein the placing of the septa wall material comprises forcing the septa wall material into the openings by at least one of vacuum, gravity, pressure and centrifuge.

22. The method as claimed in claim 14, further comprising removing the substrate base.

23. The method as claimed in claim 14, further comprising removing the mold material from the grid or collimator.

24. The method as claimed in claim 14, further comprising:
forming a plurality of layers of the walls by performing the steps of claim 14; and
stacking the layers to form the grid or collimator.

25. The method as claimed in claim 14, further comprising:
forming a plurality of pieces of the walls by performing the steps of claim 14; and
assembling the pieces to form the grid or collimator.

26. The method as claimed in claim 14, wherein the creating of the openings in the mold material comprises at least one of:
creating the openings whereby orientation of some of the walls is focused to a line; and
creating the openings whereby a focal distance of parts of the walls is different than the focal distance at other parts of the walls.

27. The method as claimed in claim 14, further comprising removing excess of the septa wall material.

* * * * *